United States Patent
Dunki-Jacobs et al.

(10) Patent No.: US 9,657,464 B2
(45) Date of Patent: *May 23, 2017

(54) FLOW CONTROL SYSTEM

(71) Applicants: Kerry Dunki-Jacobs, Mason, OH (US); Robert Dunki-Jacobs, Mason, OH (US)

(72) Inventors: Kerry Dunki-Jacobs, Mason, OH (US); Robert Dunki-Jacobs, Mason, OH (US)

(*) Notice: Subject to any disclaimer, the term of this patent is extended or adjusted under 35 U.S.C. 154(b) by 79 days.

This patent is subject to a terminal disclaimer.

(21) Appl. No.: 14/089,684

(22) Filed: Nov. 25, 2013

(65) Prior Publication Data

US 2014/0076415 A1    Mar. 20, 2014

Related U.S. Application Data

(63) Continuation-in-part of application No. PCT/US2012/039722, filed on May 25, 2012, which
(Continued)

(51) Int. Cl.
*F16K 3/08* (2006.01)
*F16K 27/04* (2006.01)
(Continued)

(52) U.S. Cl.
CPC ............ *E03C 1/02* (2013.01); *E03C 1/0408* (2013.01); *E03C 1/057* (2013.01); *F16K 3/08* (2013.01);
(Continued)

(58) Field of Classification Search
CPC ..... F16K 3/04; F16K 3/06; F16K 3/08; F16K 3/085; F16K 11/074; F16K 11/0743;
(Continued)

(56) References Cited

U.S. PATENT DOCUMENTS 3,827,538 A * 8/1974 Morgan ............... 188/319.1
3,987,819 A * 10/1976 Scheuermann ......... 137/637.3
(Continued)

FOREIGN PATENT DOCUMENTS

JP          05015466         1/1993

OTHER PUBLICATIONS

English abstract of JP05015466, published Jan. 26, 1993.

*Primary Examiner* — Craig Schneider
*Assistant Examiner* — David Colon Morales
(74) *Attorney, Agent, or Firm* — Porter Wright Morris & Arthur LLP

(57) ABSTRACT

A fluid flow control system having a fluid inlet configured to be operatively coupled to a fluid source, a fluid outlet in fluid communication with the fluid inlet such that fluid may exit the system therethrough, a proximity sensor for detecting the position of an object within a region adjacent the sensor, and a flow control device configured to regulate fluid flow between the inlet and outlet in response to object detection by the sensor, wherein the flow control device varies the fluid flow proportional to the detected distance of an object from the sensor. A water flow control system for use in a shower environment is also provided, as well as a shower control system, methods for controlling water flow based on sensing of the presence and location of an object, and methods for reducing water consumption.

15 Claims, 33 Drawing Sheets

Related U.S. Application Data is a continuation-in-part of application No. 13/115,971, filed on May 21, 2011, now Pat. No. 8,807,521.

(60) Provisional application No. 61/348,000, filed on May 25, 2010, provisional application No. 61/732,276, filed on Nov. 30, 2012.

(51) Int. Cl.
| | |
|---|---|
| *E03C 1/02* | (2006.01) |
| *G05D 7/06* | (2006.01) |
| *F16K 11/074* | (2006.01) |
| *E03C 1/05* | (2006.01) |
| *E03C 1/04* | (2006.01) |
| *G05D 23/13* | (2006.01) |
| *G05D 23/185* | (2006.01) |

(52) U.S. Cl.
CPC ........ *F16K 11/0743* (2013.01); *F16K 27/045* (2013.01); *G05D 7/0617* (2013.01); *G05D 23/1393* (2013.01); *G05D 23/1858* (2013.01); *Y10T 137/1842* (2015.04); *Y10T 137/86743* (2015.04); *Y10T 137/86823* (2015.04)

(58) Field of Classification Search
CPC ...... F16K 27/045; F16K 27/044; F16K 31/02; F16K 31/04; F16K 31/061; F16K 31/0617; G05D 7/0617; G05D 23/13; G05D 23/132; G05D 23/134; G05D 23/1393; G05D 23/1858; E03C 1/02; E03C 1/0408; E03C 1/057; E03C 1/05; Y10T 137/86823; Y10T 137/86743; Y10T 137/87692; Y10T 137/1842
USPC ....... 251/208, 129.11, 304, 352; 137/625.41, 137/625.31, 607, 78.1
See application file for complete search history.

(56) References Cited

U.S. PATENT DOCUMENTS

| | | | | |
|---|---|---|---|---|
| 4,205,822 | A | * | 6/1980 | Bernat .......................... 251/208 |
| 4,224,700 | A | | 9/1980 | Bloys |
| 4,282,899 | A | | 8/1981 | Dunckhorst |
| 4,328,831 | A | * | 5/1982 | Wolff ....................... 137/625.31 |
| 4,520,516 | A | | 6/1985 | Parsons |
| 4,563,780 | A | | 1/1986 | Pollack |
| 4,696,428 | A | * | 9/1987 | Shakalis ................... 236/12.12 |
| 4,756,030 | A | | 7/1988 | Juliver |
| 4,788,998 | A | | 12/1988 | Pepper et al. |
| 4,839,039 | A | | 6/1989 | Parsons et al. |
| 4,856,348 | A | | 8/1989 | Hall |
| 4,934,000 | A | | 6/1990 | Freedman |
| 4,936,151 | A | * | 6/1990 | Tokio ......................... 73/861.77 |
| 4,936,508 | A | | 6/1990 | Ingalz |
| 4,946,134 | A | * | 8/1990 | Orlandi ......................... 251/208 |
| 4,962,912 | A | * | 10/1990 | Stoll .............................. 251/208 |
| 5,109,705 | A | | 5/1992 | Masyagutov et al. |
| 5,152,465 | A | | 10/1992 | Calabro |
| 5,219,148 | A | * | 6/1993 | Weyand ........................ 251/175 |
| 5,349,985 | A | | 9/1994 | Fischer |
| 5,372,048 | A | | 12/1994 | Dunbar |
| 5,388,466 | A | | 2/1995 | Teunissen |
| 5,402,812 | A | | 4/1995 | Moineau et al. |
| 5,417,083 | A | * | 5/1995 | Eber ............................... 62/528 |
| 5,504,950 | A | * | 4/1996 | Natalizia et al. ................. 4/623 |
| 5,577,660 | A | | 11/1996 | Hansen |
| 5,611,517 | A | | 3/1997 | Saadi et al. |
| 5,689,843 | A | | 11/1997 | Duke et al. |
| 5,721,383 | A | * | 2/1998 | Franklin et al. ........... 73/861.77 |
| 5,829,072 | A | * | 11/1998 | Hirsch et al. ..................... 4/605 |
| 5,853,130 | A | * | 12/1998 | Ellsworth ...................... 239/548 |
| 5,868,311 | A | * | 2/1999 | Cretu-Petra ................. 236/12.12 |
| 5,877,429 | A | * | 3/1999 | Gauley et al. ............ 73/861.77 |
| 5,950,576 | A | * | 9/1999 | Busato et al. ............. 123/41.08 |
| 6,016,836 | A | | 1/2000 | Brunkhardt |
| 6,019,003 | A | * | 2/2000 | Wieder ...................... 73/861.79 |
| 6,019,130 | A | | 2/2000 | Rump |
| 6,029,094 | A | * | 2/2000 | Diffut ............................. 700/32 |
| 6,079,280 | A | * | 6/2000 | Miller et al. ............... 73/861.77 |
| 6,135,152 | A | * | 10/2000 | Knapp ...................... 137/625.41 |
| 6,250,601 | B1 | | 6/2001 | Kolar et al. |
| 6,311,569 | B1 | | 11/2001 | Siebert et al. |
| 6,416,032 | B2 | * | 7/2002 | Oh .................................. 251/14 |
| 6,427,927 | B1 | | 8/2002 | Hall |
| 6,438,770 | B1 | | 8/2002 | Hed et al. |
| 6,598,851 | B2 | * | 7/2003 | Schiavone et al. ...... 251/129.11 |
| 6,705,534 | B1 | | 3/2004 | Mueller |
| 6,854,658 | B1 | * | 2/2005 | Houghton et al. ......... 236/12.12 |
| 6,860,288 | B2 | | 3/2005 | Uhler |
| 6,880,575 | B2 | * | 4/2005 | Mountford et al. ..... 137/625.41 |
| 6,899,133 | B2 | | 5/2005 | Brunkhardt |
| 6,913,203 | B2 | | 7/2005 | DeLangis |
| 6,927,501 | B2 | | 8/2005 | Baarman et al. |
| 7,168,677 | B2 | * | 1/2007 | Gama et al. ..................... 251/69 |
| 7,213,587 | B2 | * | 5/2007 | Rutten ...................... 123/568.24 |
| 8,434,693 | B2 | | 5/2013 | Brown et al. |
| 8,807,521 | B2 | * | 8/2014 | Dunki-Jacobs ......... E03C 1/057 251/129.04 |
| 2001/0011558 | A1 | * | 8/2001 | Schumacher ................. 137/613 |
| 2003/0089399 | A1 | | 5/2003 | Acker |
| 2003/0102447 | A1 | | 6/2003 | Williams, Jr. |
| 2007/0246550 | A1 | * | 10/2007 | Rodenbeck et al. ........ 236/12.11 |
| 2008/0060184 | A1 | | 3/2008 | Baarman et al. |
| 2008/0150750 | A1 | | 6/2008 | Parris et al. |
| 2008/0156889 | A1 | * | 7/2008 | Shapira et al. ............. 236/12.12 |
| 2008/0271238 | A1 | * | 11/2008 | Reeder et al. ...................... 4/597 |
| 2009/0039176 | A1 | * | 2/2009 | Davidson et al. ............... 239/67 |
| 2009/0119832 | A1 | * | 5/2009 | Conroy .............................. 4/623 |
| 2009/0126810 | A1 | | 5/2009 | Currie |
| 2009/0261282 | A1 | * | 10/2009 | Connors .................. 251/129.01 |
| 2009/0293190 | A1 | | 12/2009 | Ringelstetter et al. |
| 2010/0065124 | A1 | * | 3/2010 | Samaroo ........................... 137/1 |
| 2010/0126612 | A1 | * | 5/2010 | Huang et al. ............. 137/625.41 |
| 2011/0088799 | A1 | * | 4/2011 | Jung .............................. 137/607 |
| 2011/0284101 | A1 | * | 11/2011 | Thurau et al. ................. 137/468 |

* cited by examiner

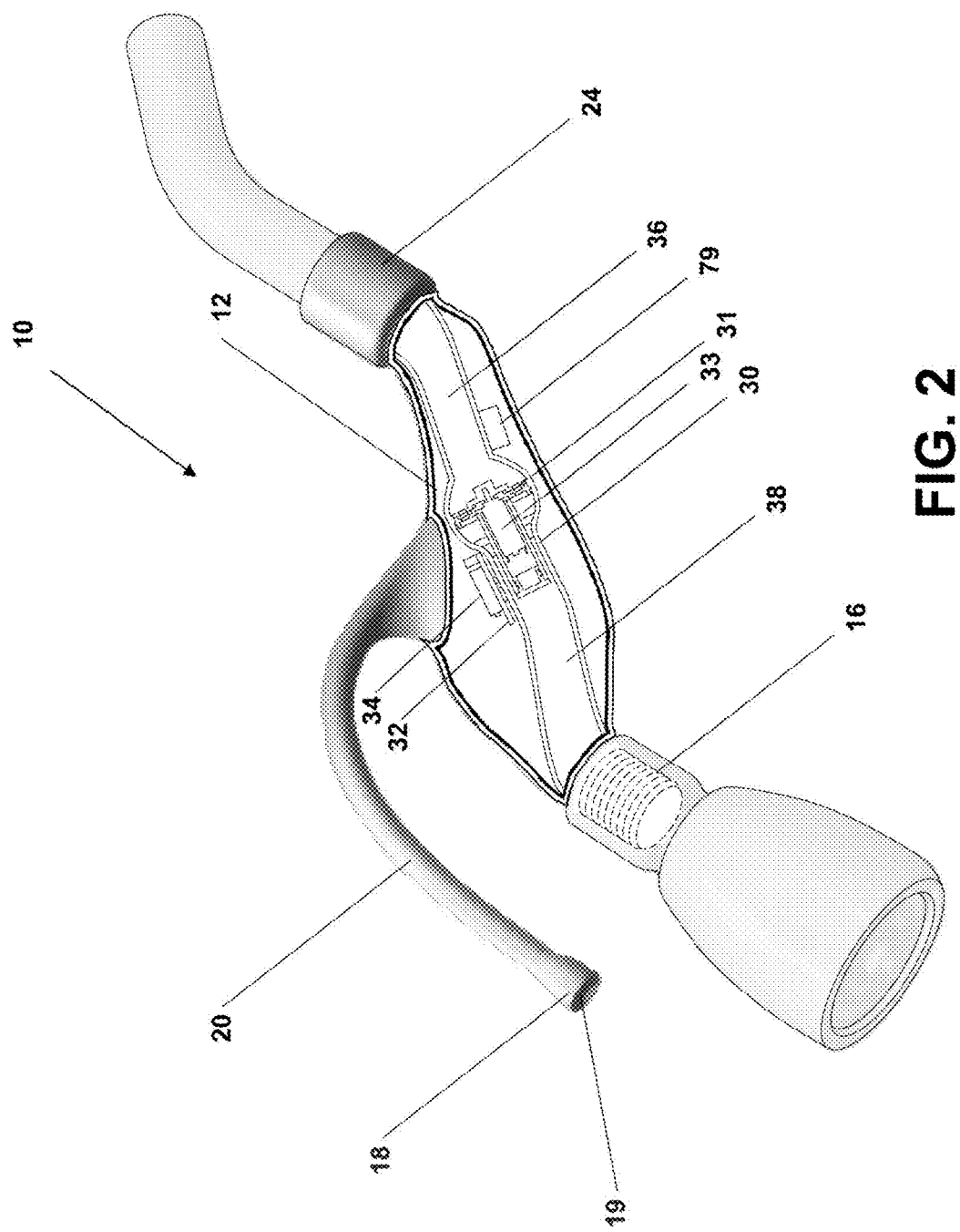

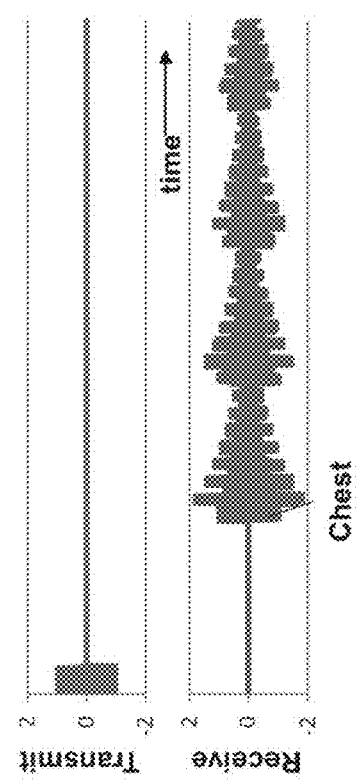
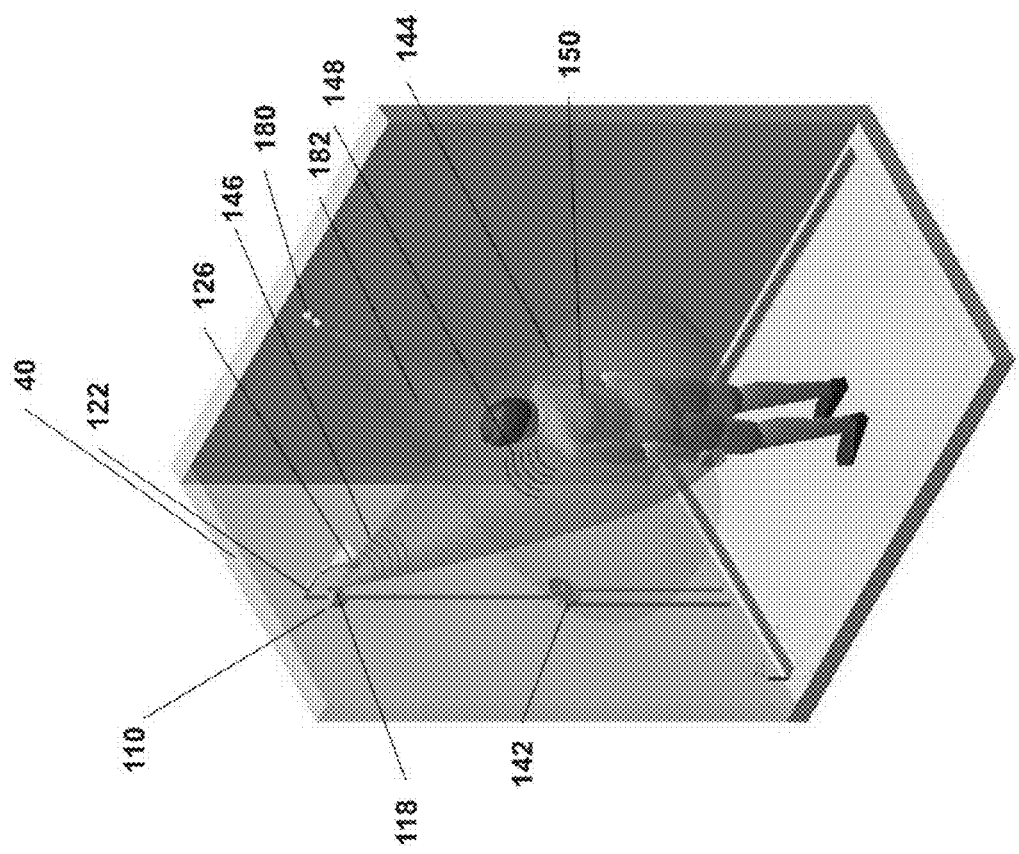
FIG. 6A

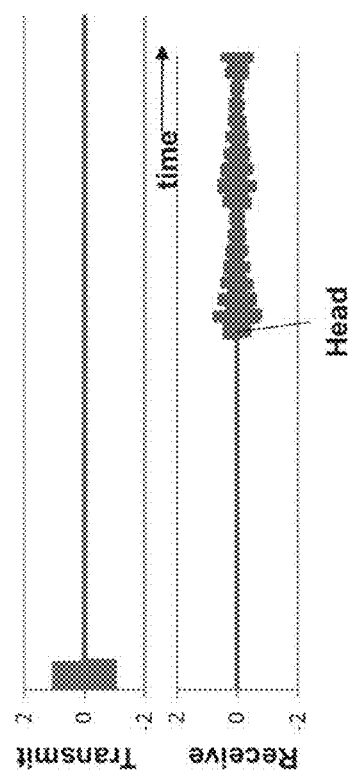
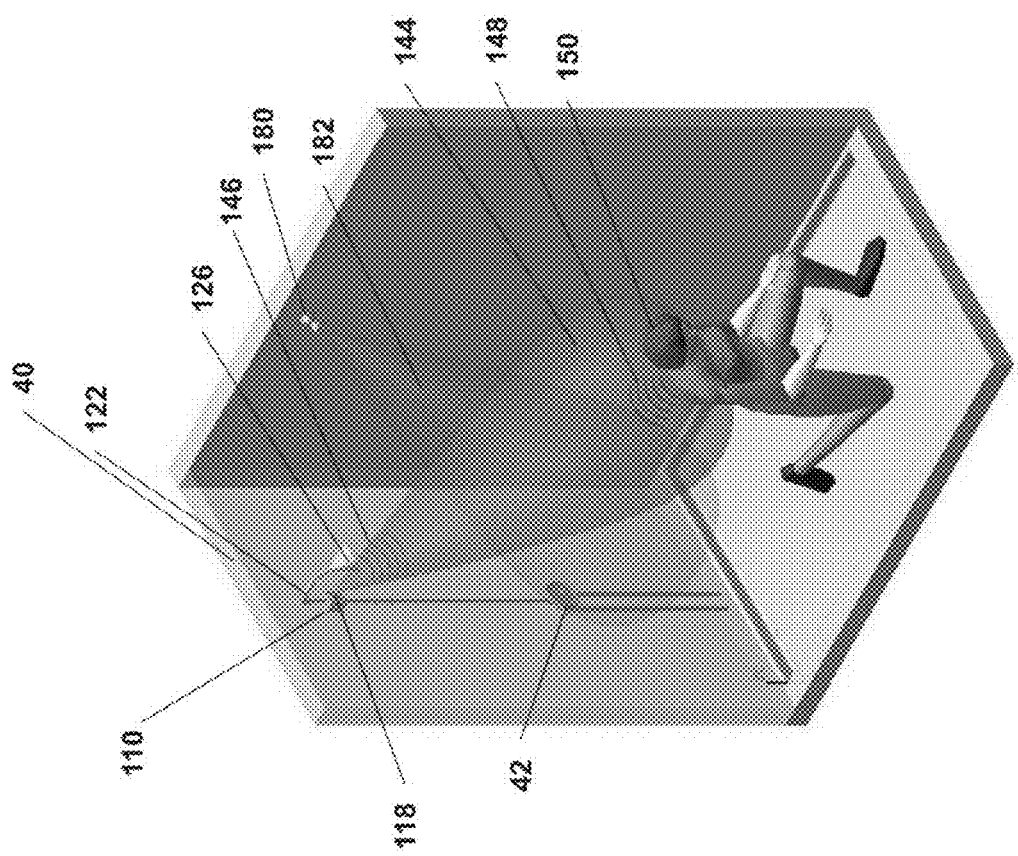
FIG. 6B

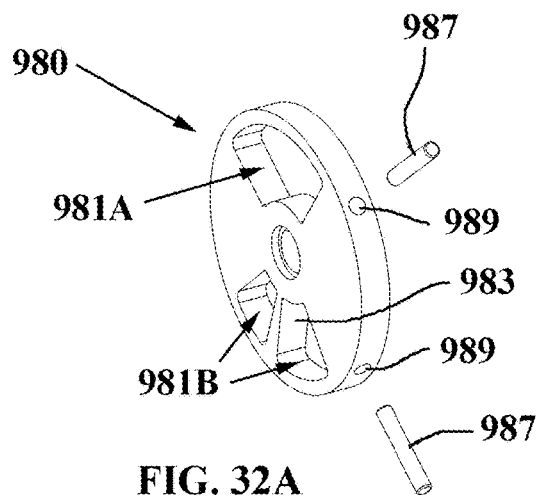
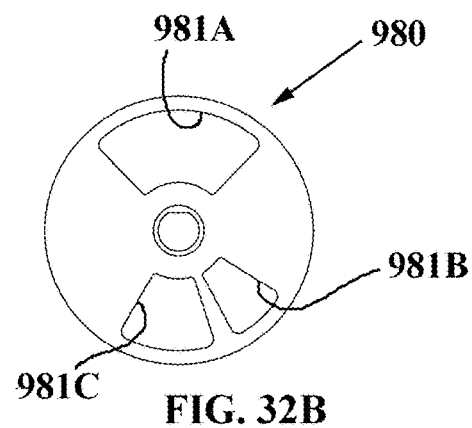
FIG. 32A
FIG. 32B
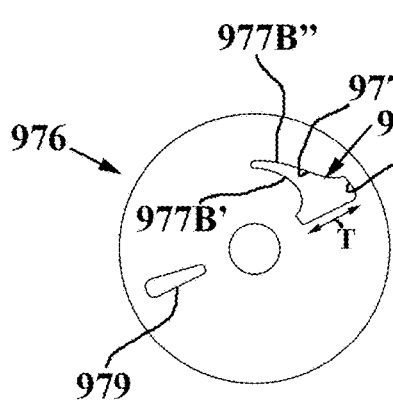
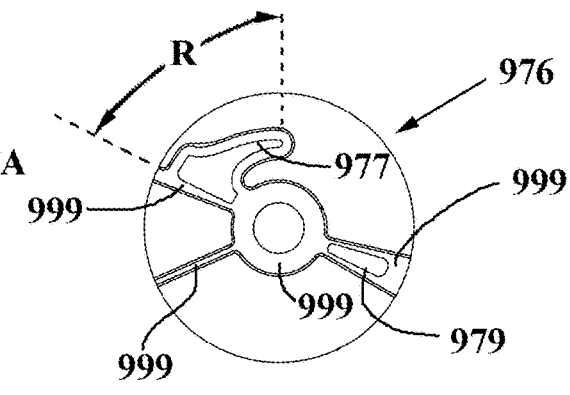
FIG. 33A
FIG. 33B
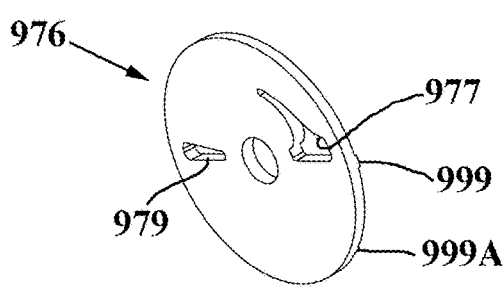
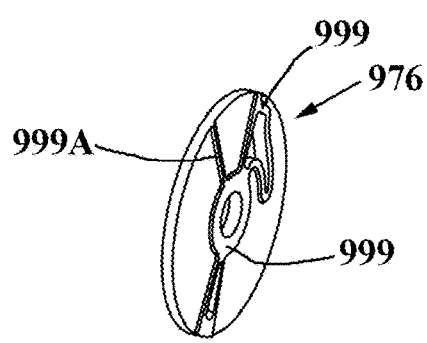
FIG. 33C
FIG. 33D

US 9,657,464 B2

FLOW CONTROL SYSTEM

CROSS REFERENCE TO RELATED APPLICATIONS

This application is a continuation-in-part of PCT Patent Application No. PCT/US12/39722, filed on May 25, 2012, entitled Flow Control System, which is a continuation-in-part of United States Non-Provisional patent application Ser. No. 13/115,971, filed on May 25, 2011, entitled Flow Control System. This application also claims priority to U.S. Provisional Patent Application No. 61/348,000, filed on May 25, 2010, entitled Adaptive Fluid Management, as well as to U.S. Provisional Patent Application No. 61/732,276, filed on Nov. 30, 2012, entitled Flow Control System. The entirety of the foregoing patent application no's PCT/US12/39722, 13/115,971, 61/348,000 and 61/732,276 are incorporated herein by reference.

BACKGROUND

Fluid conservation systems, including water conservation systems, have been in use for at least the past 30 years. These systems generally fall into the following categories: passive full time flow rate restrictors; manually activated one-flow rate systems; manually activated two-flow rate systems; timer controlled two-flow rate systems; fluid recovery/recirculation systems; and fluid aeration or embolization systems. Passive full time flow restrictors are the most common conservation methods employed to date. While a variety of devices and techniques may exist for conserving and/or limiting fluid use, it is believed that no one prior to the inventors has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

FIG. 2 depicts a partial cross-sectional schematic view of the fluid flow control system of FIG. 1.

FIGS. 6A and 6B depict schematic views of an installation of an alternative embodiment of a flow control system having a second remote proximity sensor.

FIG. 32A is a downstream side perspective view of an alternative embodiment of a rotating valve plate.

FIG. 32B is an upstream side plan view of the rotating valve plate of FIG. 32A.

FIG. 33A is a downstream side plan view of an alternative embodiment of a stationary valve plate.

FIG. 33B is an upstream side plan view of the stationary valve plate of FIG. 33A.

FIG. 33C is a downstream side perspective view of the stationary valve plate of FIG. 33A.

FIG. 33D is an upstream side perspective of the stationary valve plate of FIG. 33A.

Figure 1:
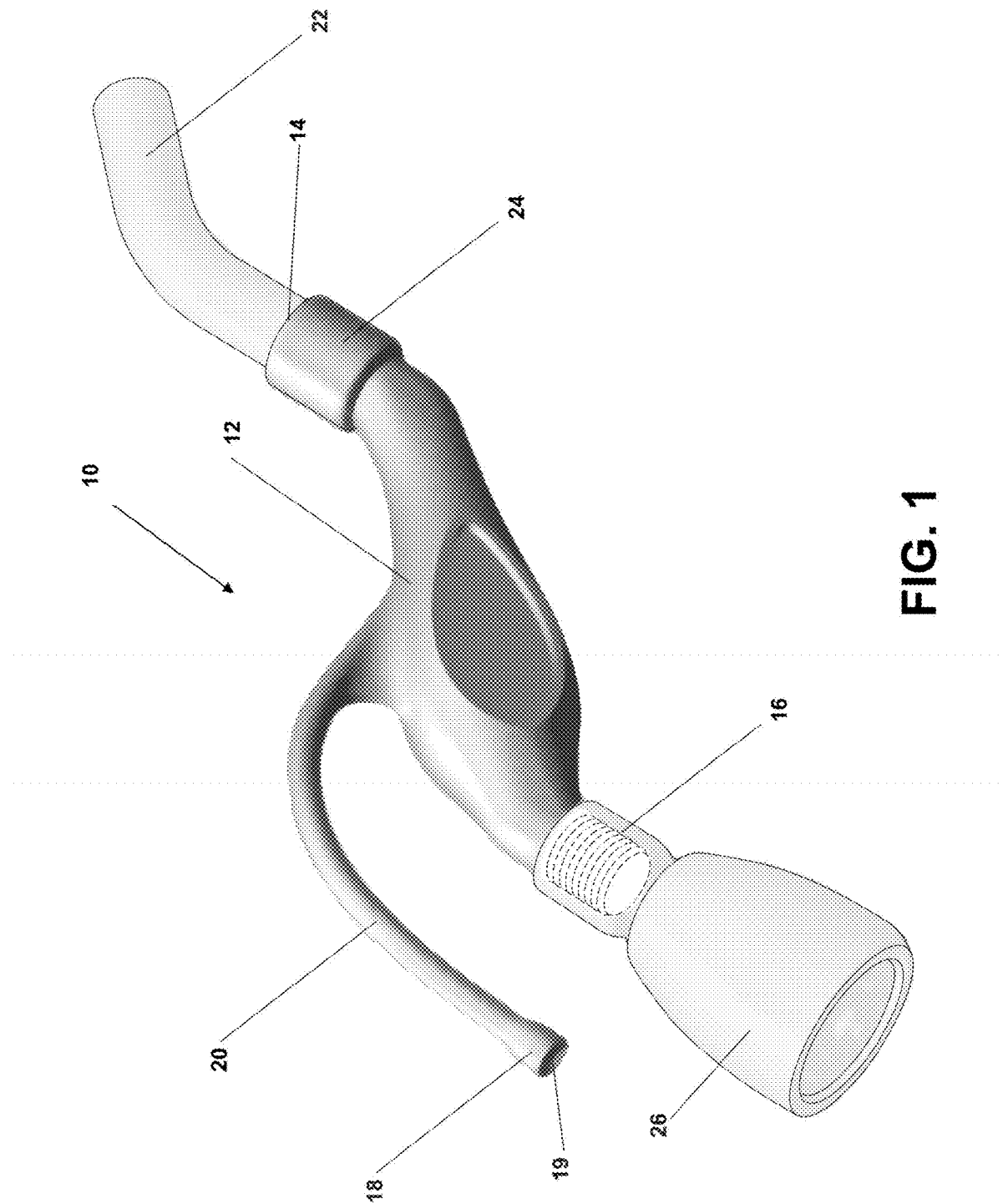
FIG. 1 depicts a perspective view of a fluid flow control system which is particularly adapted for use in shower environment.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. It will be apparent to one skilled in the art that the systems, methods, and devices described herein are applicable to many application domains which comprise a variety of fluid types and sources, external objects, optimization parameters and objectives, and application specific control strategies. Accordingly, the drawings and descriptions should be regarded as illustrative in nature and not restrictive.

As used herein, the term "fluid communication" (or in some contexts "communication") means that there is a path or route through which fluid (e.g., water) may flow between two components, either directly or through one or more intermediate components. In other words, fluid communication between two components means that fluid can flow from one component to another but does not exclude one or more intermediate components between the two recited components which are in fluid communication. Thus, a fluid inlet and outlet are in "fluid communication" with one another, even though there are one or more conduits extending therebetween as well as one or more valves which serve to regulate the flow of fluid between the inlet and outlet. The term "electrical communication" is similarly defined to mean that there is a path or route through which an electrical current (e.g., a signal) may flow between two components, either directly or through one or more intermediate components.

The apparatus and methods described herein provide fluid flow control systems, particularly water flow control systems for regulating the flow rate and/or other parameters of water flow. In some embodiments, water flow rate through the system is controlled based on a signal from one or more proximity sensors which detect the position of an object with respect to the sensor and/or a water outlet (e.g., a shower head). As used herein, the term shower head is meant to include any of a variety of water emitting devices used for showering purposes, including not only fixed shower heads for attachment to a fluid outlet, but also shower heads configured for handheld use (e.g., demountable showerheads located on the end of a flexible tube which is attached to a fluid outlet). In other embodiments, water flow rate (and, in some embodiments, water temperature) is controlled using a programmable controller (pre-programmed and/or user-programmed), and one or more fluid flow sensors, temperature sensors, timers, and/or proximity sensors.

Some embodiments described herein are used in conjunction with bathing showers or sink faucets such as those typically found in a home. In a conventional home shower arrangement, for example, a water feed tube extends out of the wall of a shower enclosure (which may be a shower stall, a shower surround, a tub surround, etc.). The exposed end of the feed tube is usually threaded (typically, externally-threaded), and a shower head is threadably attached to the exposed end of the water feed tube. Water flow through the feed tube and the attached shower head is controlled, for example, by one or more handles provided on the wall of the shower enclosure. In some single handle arrangements, a single handle controls both flow rate and temperature by adjusting the mix of hot and cold water delivered to the feed tube as well as the flow rate of each. Other single handle arrangements only control the mix of hot and cold water, without the ability to adjust water flow. In dual handle arrangements, one handle typically controls the flow of hot water and the other controls the flow of cold water delivered to the feed tube. In the case of a shower provided in a bathtub surround and the like, water flow through the shower head is controlled using one or two handles provided on the tub spout assembly or on the wall just above the tub faucet. A diverter mechanism may also be provided in order to direct water through the shower head rather than through the tub spout.

FIGS. 1-3B schematically depict an exemplary fluid flow control system (10) which is configured for use, for example, in a shower environment. Fluid flow control system (10) regulates fluid flow through the system using position sensing, and may be used, for example, to reduce water consumption. A user, such as a bather in a shower environment, may control (either purposefully or as dictated by the control scheme in the system) the water flow rate simply by changing their position in the shower stall (or other area where the system is installed). Fluid flow is varied based on the detected distance of an object (e.g., a bather) from the sensor. By way of example, fluid flow is varied proportional to the detected distance of the bather (or other object) from the sensor. In one specific example, proportional flow regulation provides maximum fluid flow when the user (or other object) is nearest a proximity sensor and/or the shower head (e.g., within a certain predetermined distance), minimum (or zero) when the user is furthest away from the sensor/shower head (including when the user is undetected), and at least one (or a plurality, or infinite number of) intermediate fluid flow rates when the user is located somewhere between (e.g., when the user is detected, but is further away than the predetermined distance for maximum flow).

For example, full flow may be provided when the user is nearest to the system (10), and the flow rate may be reduced (continuously or in one or more steps) as the user moves away from the system (10). This allows for the water flow rate through the shower head to be reduced, for example, when the user is washing their hair, shaving their legs, or engaged in some other activity when a lower water flow rate (or no water flow) is desired or advantageous. In some embodiments, flow control system (10) is configured to only allow water flow when an object is detected (e.g., a bather enters the shower enclosure), while in other embodiments system (10) may be configured to allow a predetermined flow rate (e.g., a low flow rate) whenever water is supplied to the system (10) regardless of whether or not an object is detected.

Figure 23:
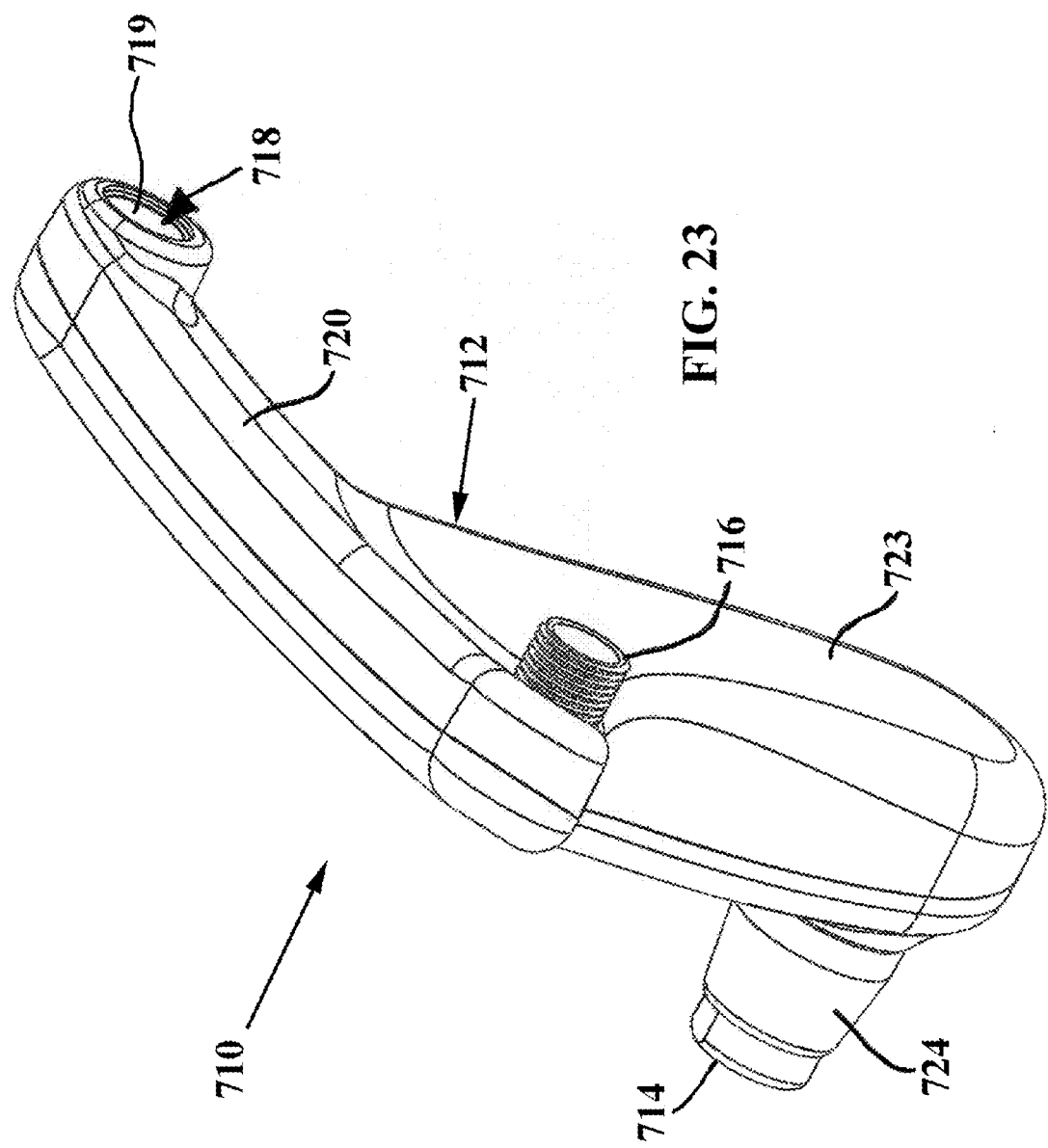
FIG. 23 depicts a perspective view of yet another embodiment of a fluid flow control system which is particularly adapted for use in shower environment.
Figure 24:
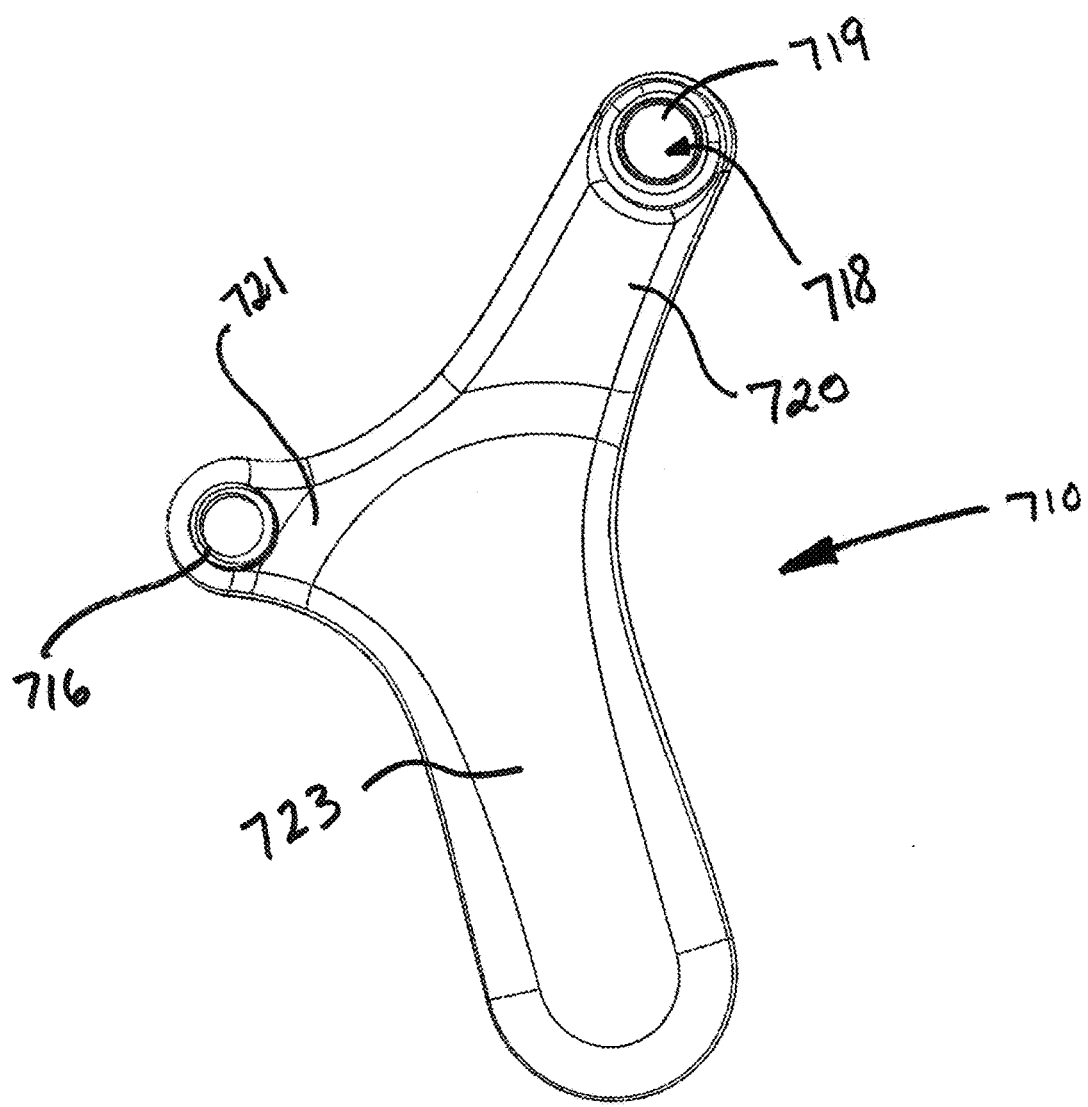
FIG. 24 depicts a front plan view of the flow control system of FIG. 23.
Figure 25:
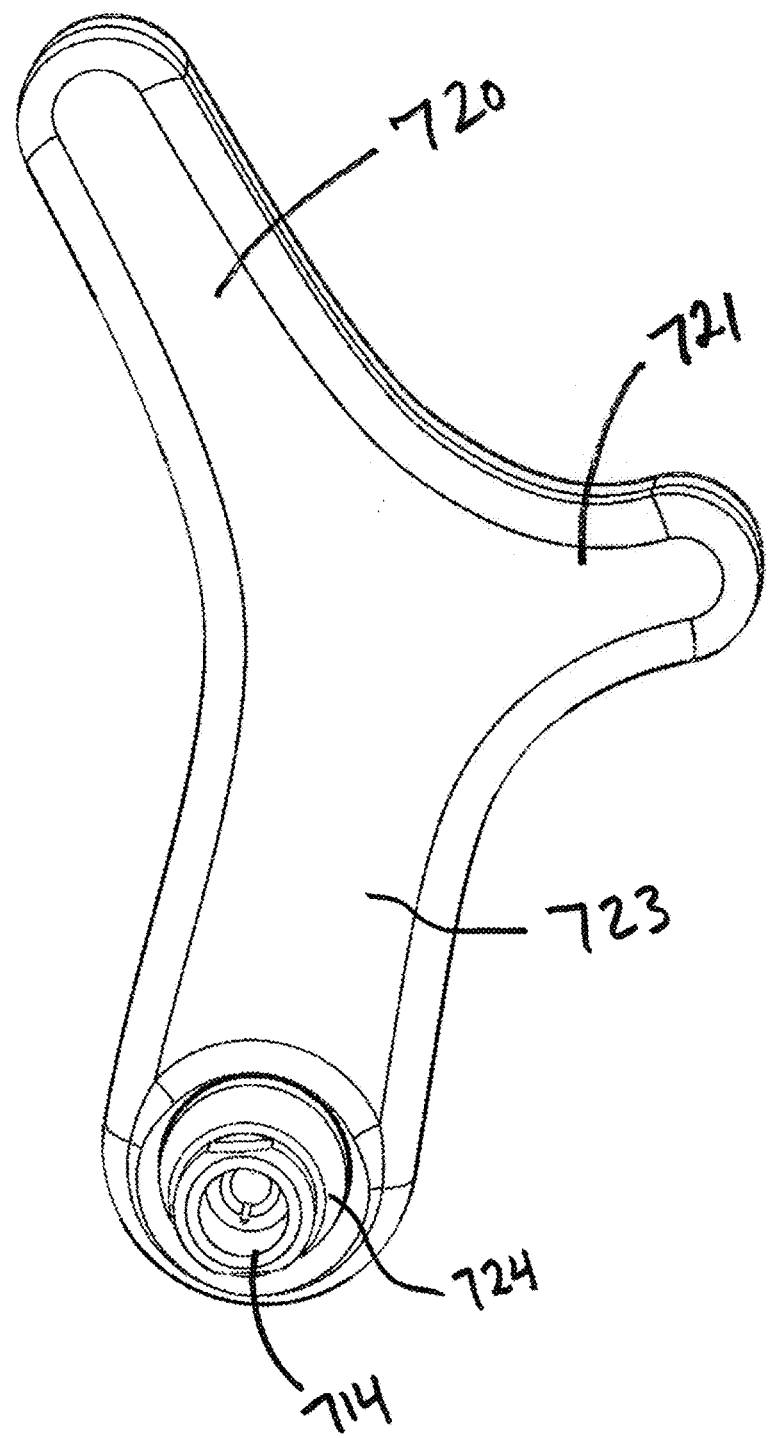
FIG. 25 depicts a rear plan view of the flow control system of FIG. 23.
Figure 26:
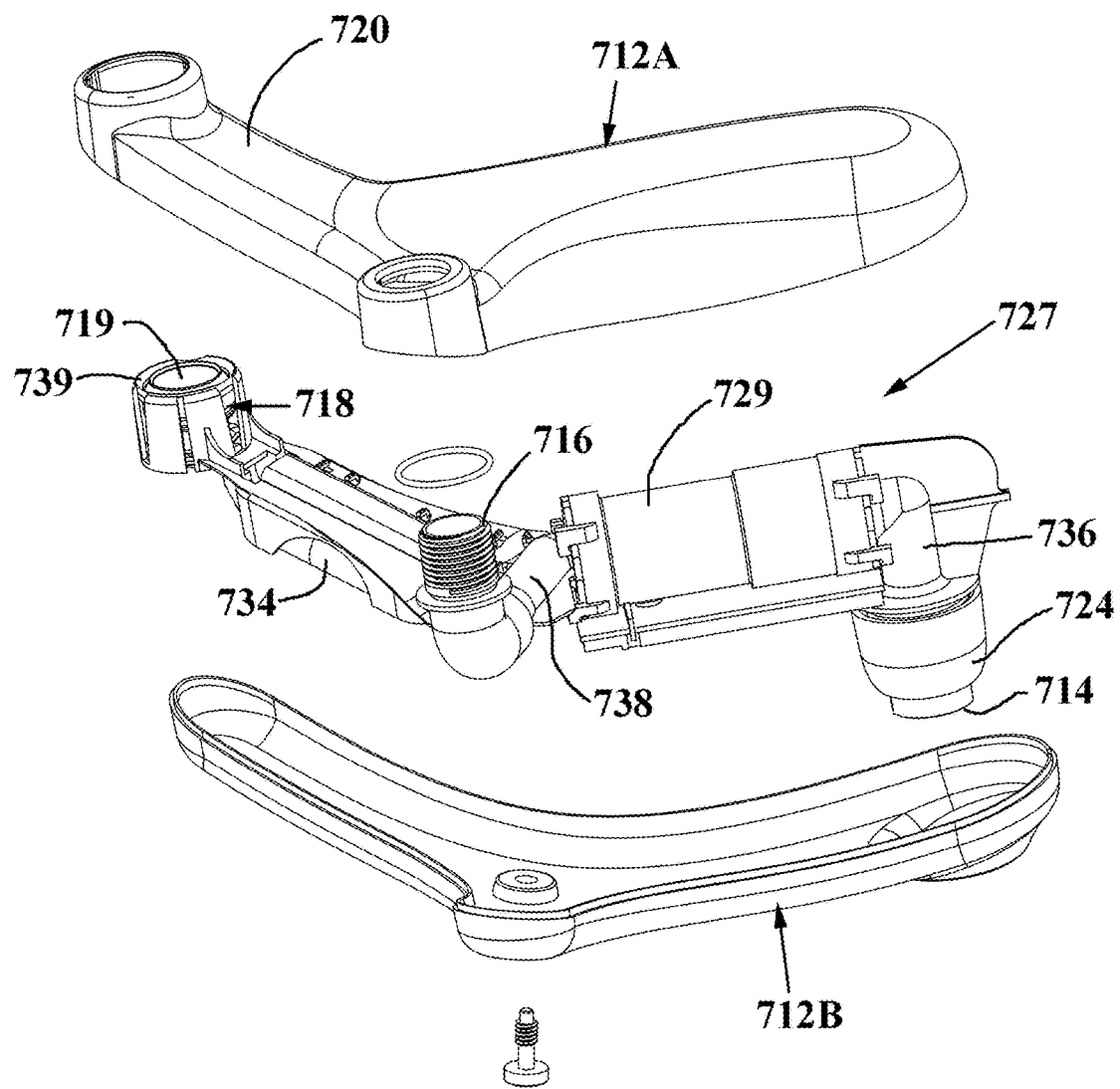
FIG. 26 depicts an exploded view of the flow control system of FIG. 23.
Figure 27:
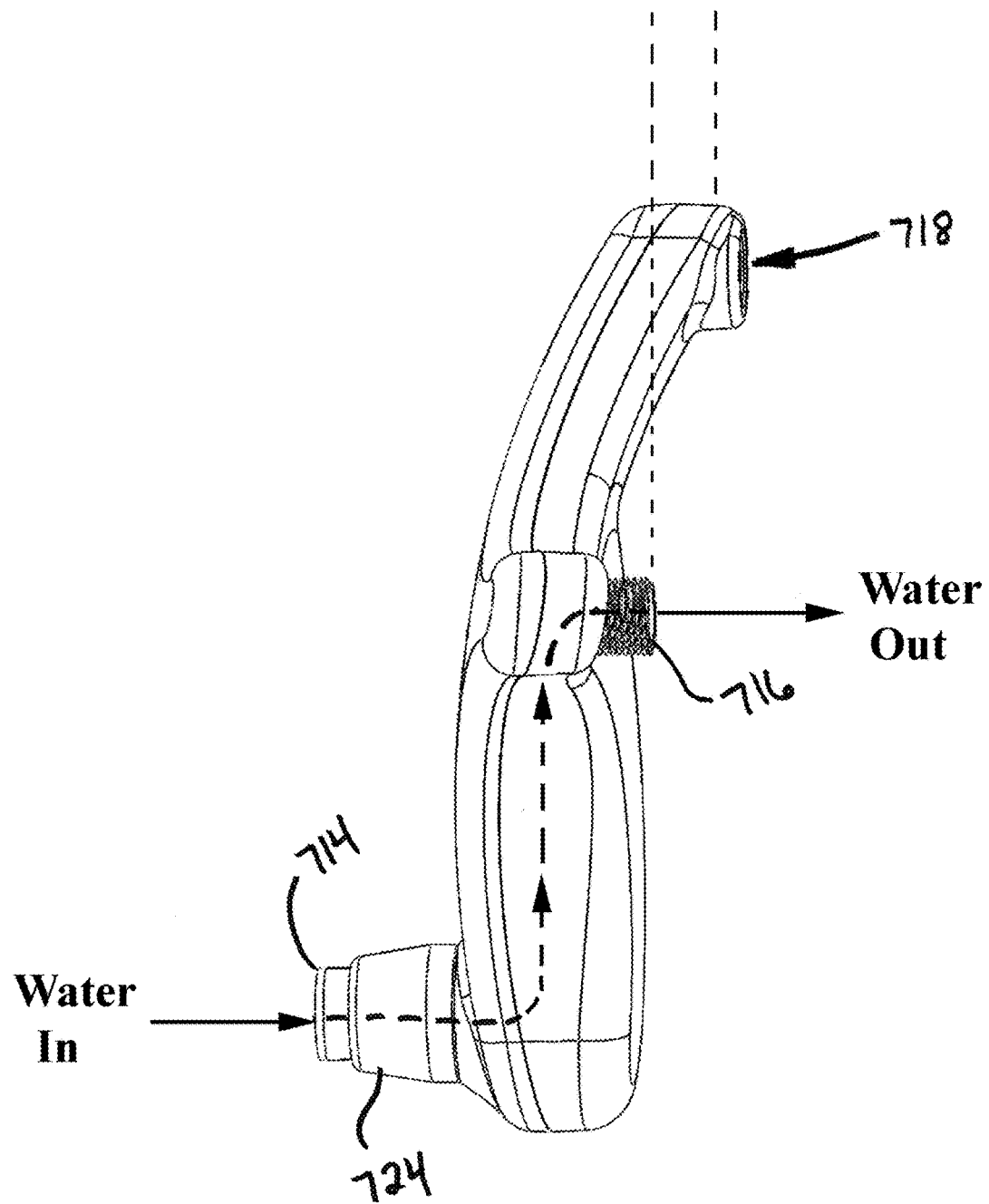
FIG. 27 depicts a side plan view of the flow control system of FIG. 23, indicating the flow of water through the system.

As further described herein, the embodiments of fluid flow control systems (10, 710) shown in FIGS. 1 and 23 are self-contained, requiring no external devices for operation. For example, a homeowner may attach a distal end of system (10) to the water feed tube of a shower enclosure, and attach a shower head to the proximal end of system (10). In the embodiment shown in FIG. 1, no other connections are necessary. In some embodiments, power for the electrical components of the fluid flow control system is generated by the water flowing through the system, with the generated power stored in a rechargeable battery within the fluid flow control system. As also described below, alternative embodiments of the fluid flow control system may include other external components such as a user interface (e.g., a wall-mounted keypad) and/or one or more additional proximity sensors.

As seen in FIGS. 1-2, water flow control system (10) generally comprises a housing (12), a water inlet (14) on a distal end of housing (12), a water outlet (16) on a proximal end of housing (12), and a proximity sensor (18). Inlet (14) and outlet (16) are configured to be selectively in fluid communication with each other. Water inlet (14) includes an internally threaded coupling (24) which is configured for threadably attaching system (10) to an externally-threaded water feed tube (22), such as the type typically found in home shower enclosures. By way of example, feed tube (22) may comprise a water supply pipe extending out of (or away from) the wall (40) of a shower enclosure (see FIG. 3A). As described previously, water flow through feed tube (22) may be controlled, for example, by one or more handles (42) provided on the wall of the shower enclosure (see FIG. 3A) or on a spout assembly in the case of a shower provided in a bathtub surround. It will also be understood that the flow control systems described herein may be used in any of a variety of shower environments, whether fully or partially enclosed, or even fully open shower installations (e.g., an open area such as found in a locker-room or other non-enclosed area).

Water outlet (16) is provided at the other end of housing (12) and is externally threaded such that a shower head (26) may be attached thereto, as shown in FIG. 1. Any of a variety of types of commercially-available shower heads (26) may be used in conjunction with flow control system (10). Alternatively, a shower head may be integrally provided on flow control system (10) such that water outlet (16) comprises a shower head.

When flow control system (10) is attached to water feed tube (22), water flowing through feed tube (22) will flow into system (10) through inlet (14), through a fluid passageway provided in housing (12), and exit system (10) through outlet (16). The fluid passageway within housing (12) extends from water inlet (14) to water outlet (16). As further described herein, the fluid passageway in the embodiment of FIGS. 1-2 includes fluid conduits (36, 38), and a flow control device (30) (e.g., a controllable valve) is located between (or even within one or both of) the fluid conduits (36, 38).

In the embodiment shown in FIGS. 1 and 2, proximity sensor (18) is provided on the end of a proximity sensor arm (20) on housing (12). In the depicted embodiment, sensor arm (20) is an integral part of housing (12) and is configured to orient proximity sensor (18) in the proper location and direction. Sensor (18) generally includes a sensor cover or lens (19) though which reflected acoustic or electromagnetic waves are received from an interrogation region for purposes for detecting the presence and location of an object within the interrogation region, as further described herein. For this reason, sensor cover/lens (19) is located and oriented so as to be directed toward the desired interrogation region (e.g., a region located beneath, and in the water flow direction of, a shower head attached to system (10)). In one embodiment, the sensor cover includes an open-celled foam which allows acoustic or electromagnetic waves (e.g., ultrasonic waves) to pass therethrough (i.e., to or from the transducer of the sensor (18)), while preventing water from contacting the transducer. In some embodiments, the foam includes a water repellant coating such as a wax so that water is not retained on or in the foam. The foam may also include a biocide (e.g., as a coating) in order to prevent microbial growth. An air gap may also be provided between the open-celled foam and the transducer in order to further prevent water from coming into contact with the transducer.

Sensor arm (20) is rigid so that the position and orientation of sensor (18), particularly sensor cover (19), cannot be altered. In other embodiments, sensor arm (20) may be adjustable so that the user may align sensor (18), particularly the transducer thereof, based on the particular installation (e.g., the size of the shower enclosure, the size and style of the shower head, etc.). In still other embodiments, sensor (18) may be separate from housing (12), such as a remote proximity sensor mounted to a wall of the shower enclosure (as further described herein). In addition, some embodiments include two or more proximity sensors, such as one mounted on sensor arm (20), and one or more remote proximity sensors mounted to a wall (or walls) of the shower enclosure.

Proximity sensor (also referred to as a proximity detector) (18) is configured to detect the position of an object within an interrogation region located adjacent system (10) and provides signals indicative of the object's position within that region. In the embodiment of FIGS. 1-3B, the object is a user of the system (e.g., someone showering), and sensor (18) generates signals indicative of the location of the user within a region adjacent system (10). Any of a variety of sensors may be used for this purpose, including active or passive acoustic and electromagnetic sensing systems, as well as an infrared sensor. For example, sensors detecting a user's (or other object's) presence may be based on detected or reflected sound waves (e.g., audible sound or ultrasound), reflected microwaves, LIDAR-type sensors, or infrared-based detection (e.g., a sensor which detects the presence and location of a user based on infrared radiation from the user).

Figure 3A:
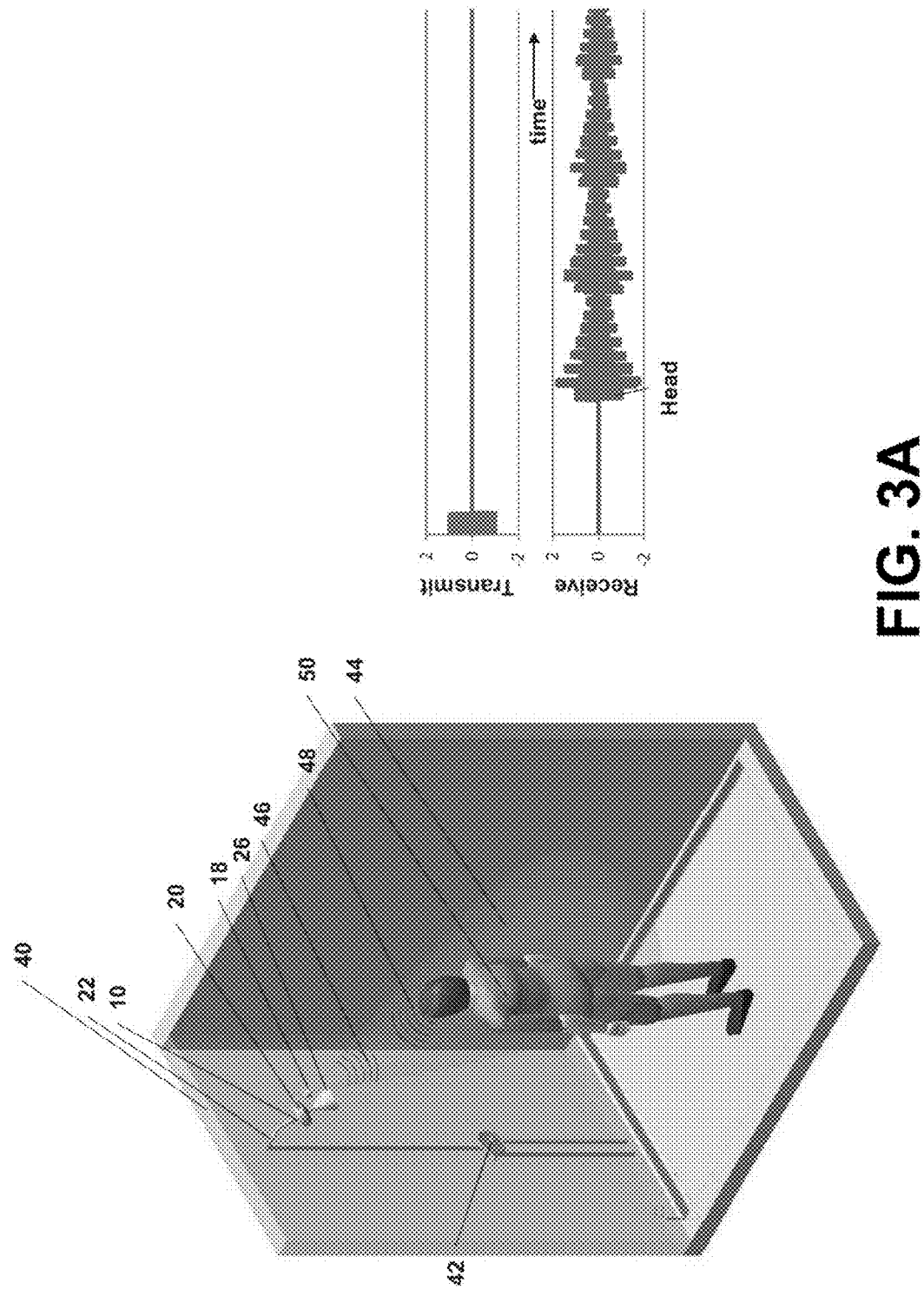
FIGS. 3A and 3B depict schematic views of an installation of the flow control system of FIG. 1, wherein the housing is slightly modified from that shown in FIG. 1.
Figure 3B:
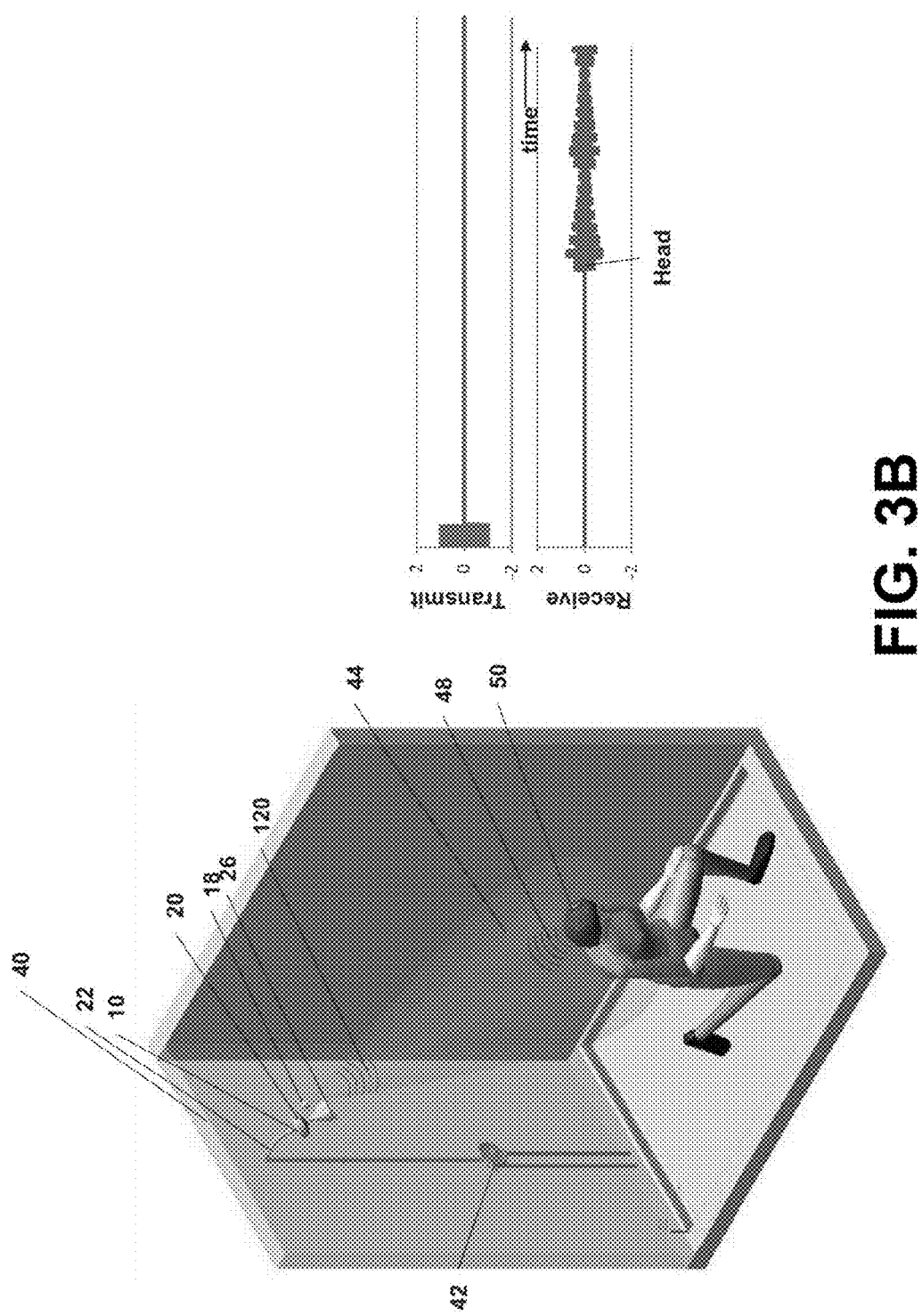

In the particular embodiment shown in FIGS. 1-3B, sensor (18) comprises a piezoelectric ultrasonic sensor which emits an interrogation field (46) of ultrasonic sound waves defining a cone-shaped interrogation region (44) extending away from the sensor lens (19) of sensor (18). Since sensor arm (20) generally orients sensor (18) so that the interrogation axis of sensor (18) is generally parallel to the axis of fluid outlet (16) (see FIG. 2), the cone-shaped interrogation region (44) will generally extend away from a shower head attached to outlet (16), as shown in FIGS. 3A and 3B. In order to maintain alignment between the interrogation axis of sensor (18) and threaded water outlet (16), water outlet (16) is fixed in position with respect to housing (12) and sensor arm (20). Since it may be desired by the user to adjust the angle of the shower head, however, in an alternative embodiment coupling (24) is pivotally attached to housing (12). In this manner, a user may adjust the angle of the shower head by manipulating the entire housing (12) without altering the alignment between sensor (18) and fluid outlet (16).

Sensor (18) also detects ultrasonic waves reflected from a user within the interrogation region (44), and provides a range signal indicative of the location of a user within the interrogation region (44). For example, in FIG. 3A, the bather (50) is within the interrogation region (44) and the amplitude and timing of the acoustic echo (48) from the interrogation field (46) shown in the amplitude vs. time plot of FIG. 3A indicates not only the presence of the bather (50)

within the interrogation region (44), but also the bather's distance from sensor (18). Sensor (18) provides a signal indicative of the distance the bather (50) is from sensor (18). For example, the plot shown in FIG. 3A indicates how the amplitude and timing of the echo (48) can be used to determine the distance of the bather's closest approach, which also can be used by the controller to estimate the bather's height. Similarly, when the bather is kneeling or bending over as shown in FIG. 3B, the amplitude and timing of the echo can be used to determine that the bather is kneeling or bent over. As further described herein, the proximity signal generated by sensor (18) is used to regulate the flow rate of water through flow control device (30).

By way of one specific example, sensor (18) comprises a Model T/R40-14.4A0-01 ultrasonic sensor available from Futurlec. Such sensor is driven by signals sent from a controller provided in housing (12). The controller periodically sends a burst of electronic pulses at the resonant frequency of sensor (18), such as a series of 20 pulses at 40 KHz. As further described herein, the controller (32) may include not only a microcontroller, but also transmitter circuitry which amplifies the electronic pulses and a Transmit/Receive switch (T/R Switch) configured to transmit the pulses to the transducer of the sensor (18). After the ultrasonic pulses are emitted by sensor (18) as an interrogation field, ultrasonic pulses reflected from an object (e.g., a bather in the shower enclosure) are received by the transducer of sensor (18) and provided to controller (32) (which is in electrical communication with sensor (18)). The controller (32) circuitry includes a low-noise amplifier (LNA) which amplifies the echo signals provided by the sensor transducer, and the amplified signals are then processed by an A/D converter provided in the controller circuitry (e.g., an A/D converter included in a microcontroller). Thereafter, the echo signals are further processed by controller (32) to determine the location of the user with respect to the sensor (18)/shower head (26). Of course other types of piezoelectric ultrasound sensors may be employed, including ultrasound sensor systems which not only generate the ultrasonic pulses (i.e., are not driven by the controller of the system (10)), but also provide a signal indicative of the distance to a detected object (i.e., the controller (32) does not need to determine distance based on the echo pulses).

In FIG. 3B, the bather (50) has moved further away from sensor (18)—for example, the bather is shaving her legs. The amplitude of the acoustic echo (48) is thereby reduced, and the acoustic echo (48) takes longer to reach sensor (18). Thus, the signals provided to controller (32) (i.e., as shown in the time v. amplitude plot in FIG. 3B) indicate that the bather is further away from sensor (18). In addition, as seen in the plot of FIG. 3B, the echo signals provided to the controller can also be used to determine the distance of furthest approach—which in turn can be used by the controller as an indication that the bather is kneeling or bent over. If the bather were to move outside of the interrogation region (44) either no echo signal is provided to controller (32), or the signal is such (e.g., low amplitude) that the controller (32) interprets the echo signal as indicating that the user is outside of the interrogation region (44). The size, shape and range of the interrogation region can be altered by sensor choice, or even the type of acoustic sensor lens employed.

In some instances, (e.g. very large shower enclosures or very small shower enclosures), it is advantageous to tailor the analog amplification of the transducer response signals through the use of a time-gain-control amplifier (TGC). TGC amplifiers modify the received signal gain prior to A/D conversion as a function of time after the conclusion of the sensor's transmit burst. By increasing gain over time, receiver sensitivity is improved at longer distances from the sensor, thereby accommodating a larger interrogation volume. By decreasing the gain over time, receiver sensitivity is reduced at longer distances from the sensor, thereby reducing the echo signal from the walls of smaller enclosures.

As mentioned above, water flow control system (10) further includes a controller (32) depicted schematically in FIG. 2, as well as a power source (34) which provides power not only to controller (32) but also sensor (18), flow control device (30), and other components of system (10). In general, the power source (34) is configured to provide sufficient and reliable power for operating low-voltage, low power consumption electronic components for a reasonable period of time. Power source (34) may comprise, for example, a user-replaceable battery. In other embodiments, system (10) may be configured to operate on household current, and therefore power source (34) may comprise a suitable transformer which converts household current to a suitable low voltage current (e.g., 1 to 5 volt DC current). In some embodiments, and as further described herein, the flow control system includes an internal turbine generator which generates electrical power from water flowing through the system. In such embodiments, a rechargeable battery or supercapacitor may be included for storing excess power generated by the turbine. Alternatively, where the system generates power from flowing water, storage of excess power may not be necessary (e.g., when the flow control system is configured to not need power when water is not flowing through the system).

The controller (32) processes signals from sensor (18) in accordance with stored instructions (e.g., one or more programs stored in memory) so as to generate signals which control the operation of flow control device (30). Controller (32) can have any of a variety of suitable forms and structures known to those skilled in the art. By way of example, controller (32) can include one or more integrated circuits programmed to perform various functions. Such structures are sometimes referred to as microcontrollers, and typically include a processor, programmable memory, and input/output connectors for not only receiving signals from one or more sensors (e.g., sensor (18)) but also transmitting signals used to drive one or more components (e.g., flow control device (30)). However, the term "controller" is not limited to microcontrollers, and includes one or more microcomputers, PLCs, CPUs, processors, integrated circuits, or any other programmable circuit or combination of circuits. Controller (32) can also include more than one microcontroller, with certain tasks assigned to each microcontroller (e.g., one microcontroller programmed to initiation operation of the flow control system upon detection of the flow of water through the system).

Controller (32) may also include additional components and circuitry such as one or more separate memories for storing instructions and data, one or more T/R Switches, one or more amplifiers (e.g., an LNA), A/D Converter, a wireless transceiver (e.g., to provide RF communication between a remote proximity sensor and the microcontroller of controller (32)), and other componentry known to those skilled in the art for providing the controller functionality described herein. In one exemplary embodiment, the controller (32) includes a Model PIC16LF870 or PIC16LF1827 microcontroller available from Microchip Technology, Inc., a T/R Switch (for transmitting and receiving signals to and from the proximity sensor (18)), and a low noise amplifier for processing signals received from sensor (18). This particular microcontroller includes an A/D converter, however, in other embodiments a separate A/D converter may be provided. In addition, particularly when a remote proximity sensor is included (instead of, or in addition to, sensor (18) provided on sensor arm (20)), a wireless transceiver such as MRF49XA available from Microchip Technology Inc. may be included in controller (32) to provide for wireless RF communication between the microcontroller and the remote sensor (or other components described herein, such as wall-mounted user interface).

Flow control device (30) is configured to regulate the flow of water through system (10) in response to signals from controller (32). Flow control device (30) may comprise any of a variety of structures suitable for controlling the flow of water from conduit (36) to conduit (38). By way of example, flow control device (30) may comprise a motor-driven valve, wherein the position of the valve is controlled via signals from controller (32) to the motor which drives the valve between open and closed positions (fully open, fully closed, or one or more positions between fully open and fully closed). Any of a variety of valve types may be employed, including ball, butterfly, disc (including ceramic disc), diaphragm, pinch, or spool valves. In the embodiment shown in FIG. 2, flow control device (30) includes a disc valve (31) which is selectively actuated by motor (33) in response to signals (i.e., drive current) from controller (32) to motor (33). Motor (33) is driven by DC current supplied by controller (32) such that motor direction can be reversed simply by controller (32) causing the polarity of the drive voltage to be reversed. In this manner, controller (32) provides more rapid and continuous control of the flow rate. Motor (33) is also configured to use a relatively high gear reduction (e.g., 300:1) in order to provide high starting and stall torques which mitigate valve sticking due to contaminants and scale build-up. As further described herein, a sensor may be provided in order to detect whether flow control device (30) is open or closed, and provide a corresponding signal to controller 32. Alternatively, such a sensor may detect the amount that flow control device (30) is open (e.g., 0 to 100%).

FIGS. 23-27 depict an alternative embodiment of a water flow control system (710) which is functionally the same as water flow control system (10) in FIGS. 1 and 2. System (710) generally comprises a housing (712), a water inlet (714) extending away from the rear face of housing (712), a water outlet (76) on the front face of housing (712), and a proximity sensor (718). As best seen in the exploded view of FIG. 26, the housing (712) includes a front shell (712A) and a rear shell (712B), with a flow path assembly (727) located between the front and rear shells. The flow path assembly (727) includes the sensor (718), inlet (714), outlet (716), a pair of batteries (734) (only one is visible in FIG. 26), and a valve housing (729). The valve housing (729) contains the flow measurement device (e.g., a turbine, as further described herein), flow control device (e.g., a rotating disc valve), and a motor for driving the flow control device. The flow path assembly (727) snap fits onto the front shell (712A), and the rear shell (712B) is secured to the flow path assembly (727) using a screw which engages a captive nut provided on the flow path assembly. Of course it will be understood that the components of system (710) can be assembled in any of a variety of other ways.

Inlet (714) and outlet (716) are configured to be selectively in fluid communication with each other, through housing (712). Water inlet (714) extends away from the rear face of housing (712), and includes a coupling (724) which is configured for attaching system (710) to a water feed tube such as the type typically found in a shower enclosure. As described previously, water flow through the feed tube of the shower enclosure may be controlled, for example, by one or more handles provided on the wall of the shower enclosure (see FIG. 3A) or on a spout assembly in the case of a shower provided in a bathtub surround.

Water outlet (716) extends away from the front face of housing (712) and is externally threaded such that a shower head may be attached thereto, similar to that shown in FIG. 1. Any of a variety of types of commercially-available shower heads may be used in conjunction with flow control system (710), including handheld showerheads as previously described. Alternatively, a shower head may be integrally provided on flow control system (710) such that water outlet (716) comprises a shower head.

When flow control system (710) is attached to a water feed tube, water flowing through the feed tube will flow into system (710) through inlet (714), upwardly through the fluid passageway provided in housing (712) located between the front and rear faces of housing (712) (i.e., through valve housing (729), and exit system (710) through outlet (716). The fluid passageway within housing (712) extends between water inlet (714) to water outlet (716), and includes fluid conduits (736, 738) located upstream and downstream of valve housing (729) wherein the flow control device is located (e.g., a controllable valve similar to that shown in FIGS. 1 and 2 and described above, or valve arrangements hereinafter described).

Proximity sensor (718) is provided in housing (712) adjacent the upper end of a proximity sensor arm portion (720) of housing (712). In the depicted embodiment, sensor arm (720) is an integral part of housing (712) and is configured to orient proximity sensor (718) in the proper location and direction. Unlike the embodiment of FIG. 1, sensor arm portion (720) is configured such that when system (710) is installed, sensor (718) is horizontally and vertically offset from outlet (716). In addition, outlet (716) is located adjacent the upper end of an outlet arm portion (721) of housing (712), with sensor arm portion (720) and outlet arm portion (721) extending upwardly away from main housing portion (723), and at and angle to each other. Thus, when viewed from the front (FIG. 24) or rear (FIG. 25), sensor arm portion (720), outlet arm portion (721) and main housing portion (723) resemble a Y-shape with one of the upwardly extending arm portions (721) shorter than the other (720). As seen in the side view of FIG. 27, main housing portion (723) which contains the controller, power supply (e.g., a battery), flow control device, temperature sensor, etc., is generally thicker than arm portions (720, 721). As also shown in the side view of FIG. 27, sensor is angled forward with respect to main housing portion (723) such that sensor (718) extends forward of outlet (716) when viewed from the side (as indicated by the dashed line in FIG. 27). This helps to properly orient the sensor (718) and, in conjunction with the Y-shape of the housing (712) aids in preventing the sensor from being blocked when a large diameter shower head attached to outlet (716).

As before, sensor (718) generally includes a sensor cover or lens (719) though which reflected acoustic or electromagnetic waves are received from an interrogation region for purposes for detecting the presence and location of an object within the interrogation region, as further described herein. For this reason, sensor cover/lens (719) is located and oriented so as to be directed toward the desired interrogation region (e.g., a region located beneath, and in the water flow direction of, a shower head attached to system (710)).

Sensor arm portion (720) is rigid so that the position of sensor (718) cannot be altered. However, sensor (718) is adjustably mounted in an "eyeball socket" mount (739) having a hemispheric socket which receives sensor (718) and cover (719) such that the sensor may be adjusted to ensure proper alignment of the sensor with respect to the shower head. The socket mount (739) may provide, for example, about 10 degrees of adjustment about the nominal axis of the sensor (718). Other sensors described further herein, such as proximity sensors (618, 680) in FIG. 20 may similarly be adjustably mounted in a housing such that the sensors may be aligned with the shower head as needed.

Proximity sensor (also referred to as a proximity detector) (718) is configured to detect the position of an object within an interrogation region located adjacent system (710) and provides signals indicative of the object's position within that region. Sensor (718) comprises a piezoelectric ultrasonic sensor which emits an interrogation field of ultrasonic sound waves defining a cone-shaped interrogation region extending away from the sensor lens (719) of sensor (718). Sensor arm portion (720) generally orients sensor (718) so that the interrogation axis of sensor (718) is generally parallel to the axis of fluid outlet. In order to maintain alignment between the interrogation axis of sensor (718) and threaded water outlet (716), water outlet (716) is fixed in position with respect to housing (712) and sensor arm portion (720). Since it may be desired by the user to adjust the angle of the shower head, however, coupling (724) may be configured to allow a user to adjust the angle of the shower head by manipulating the entire housing (712) without altering the alignment between sensor (718) and fluid outlet (716). Alternatively, a swivel connector may be located between water inlet (714) and the shower feed tube, as is known to those skilled in the art.

Like the embodiment shown in FIGS. 1 and 2, water flow control system (710) further includes a controller, a power source which provides power not only to the controller but also sensor (718), a flow control device (30), and other components contained within housing (712). As further described herein, the flow control system (710) may include an internal generator which generates electrical power from water flowing through the system. In such embodiments, a rechargeable battery or supercapacitor may be included for storing excess power generated by the turbine. Alternatively, where the system generates power from flowing water, storage of excess power may not be necessary (e.g., when the flow control system is configured to not need power when water is not flowing through the system). The controller processes signals from sensor (718) and generally operates system (710) in a manner similar to that described previously and/or as described further herein for alternative embodiments.

Figure 4:
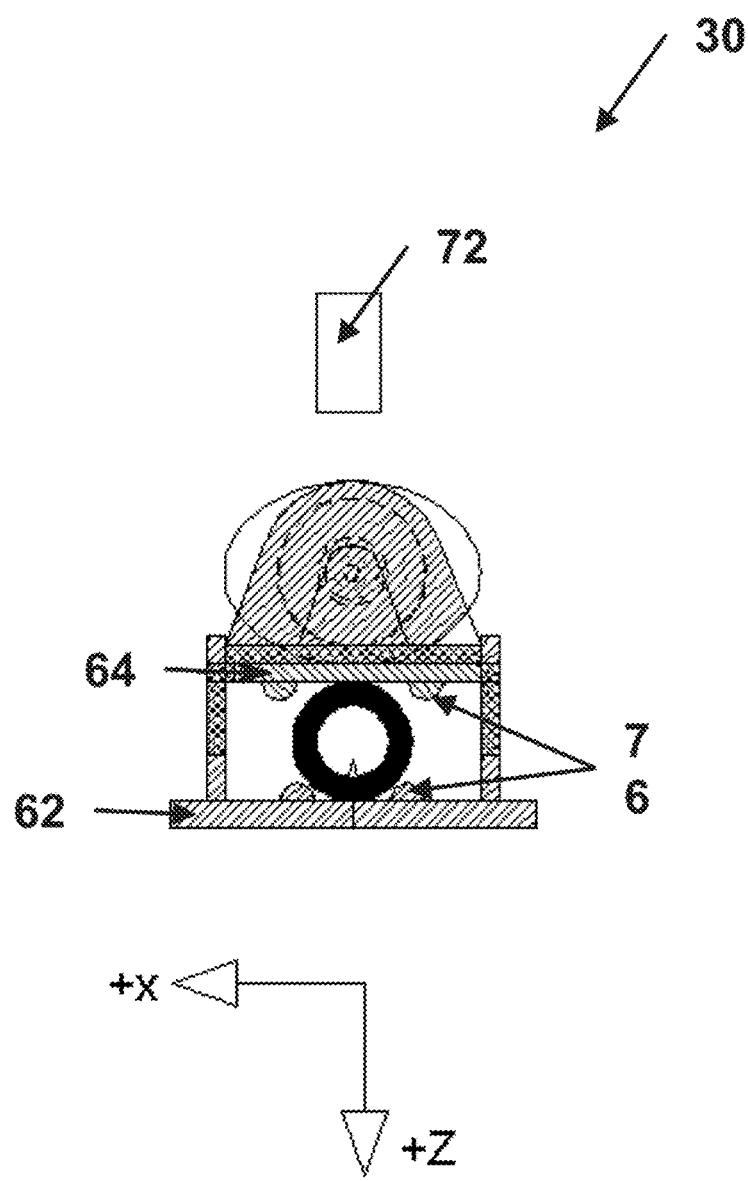
FIG. 4 is a schematic end view of an alternative embodiment of a flow control device.
Figure 5:
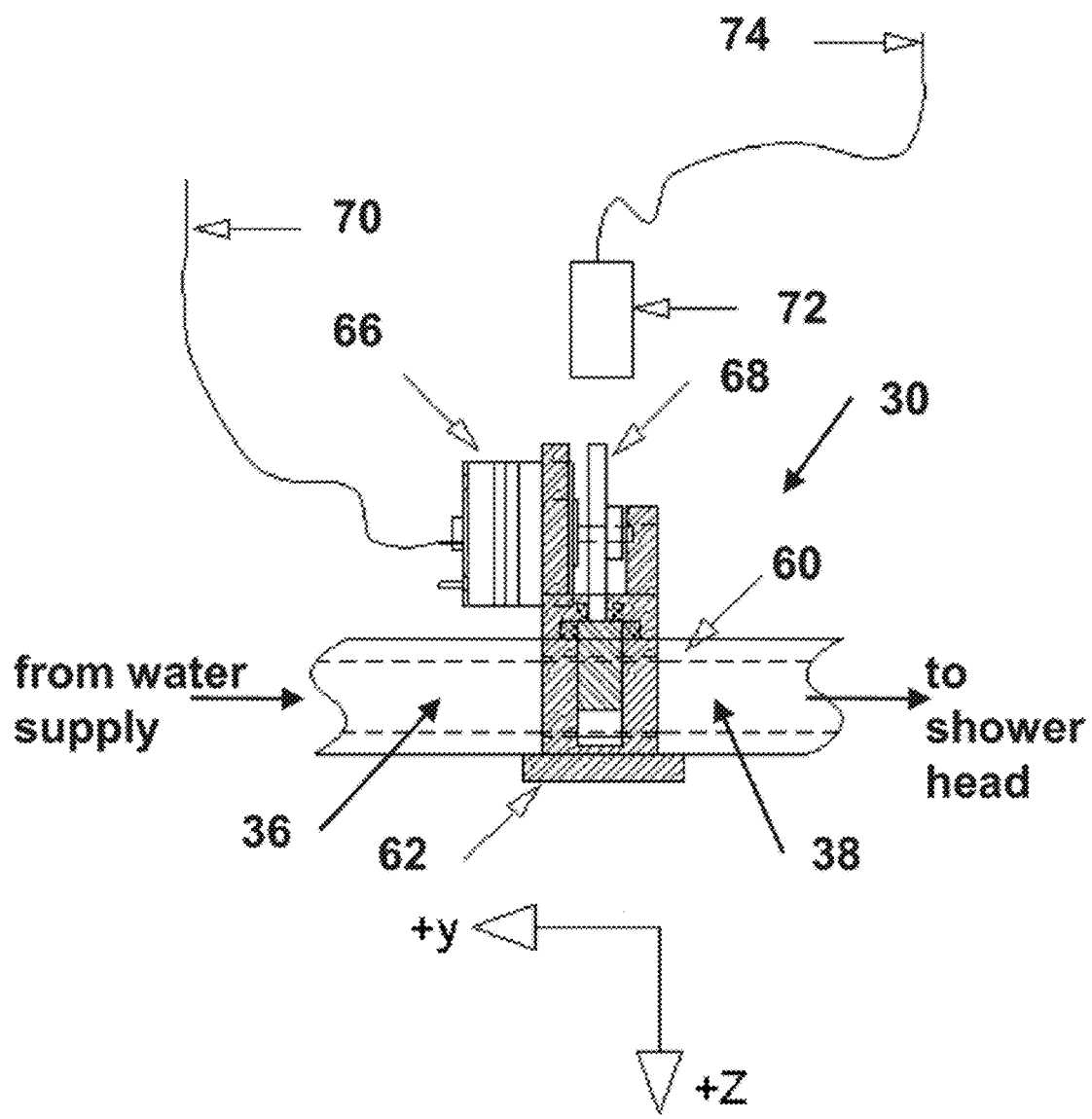
FIG. 5 is a side schematic view of the flow control device of FIG. 3.

FIGS. 4 and 5 depict yet another alternative embodiment of a flow control device which may be used in place of that depicted in FIG. 2. In this embodiment, conduits (36, 38) are provided by flexible tubing (60). Water from the water supply travels through conduit (36) and thereafter through conduit (38) to the shower head. Flexible tubing (60) which provides both conduits (36, 38) passes through a compression device composed of a stationary frame (62) and a movable compression bar (64). Stationary frame (62) provides mounting structure for the controllable motor (66) at the body of the motor and at the distal portion of the actuating shaft. A rotatable operating cam (68) is provided to apply compressive force on the movable compression bar (64) and then, by contact, to the flexible tubing (60). As operating cam (68) is rotated by motor (66), the movable compression bar (64) translates in the +z-direction and causes the cross-sectional area of flexible tubing (60) to decrease. At its downward limit of travel, movable compression bar (64) causes the tubing (60) to be compressed to the point that cross-sectional area of the tubing is substantially zero, thereby preventing fluid flow therethrough. Controllable motor (66) receives operating power and control through electrical connection (70) which receives signals from controller (32).

Cam position sensor (72) (e.g., an optical sensor) senses the angular position of operating cam (68) and causes a signal to be output through electrical connection (74) back to controller (32) which indicates whether or not the pinch valve shown in FIGS. 4 and 5 is open or closed (and optionally the amount open). Smooth protrusions (76) on movable compression bar (64) and stationary frame (62) are provided to reduce motion of the flexible tubing (60) along the x axis. Thus, the flow control device depicted in FIGS. 4 and 5 provides a pinch valve which controls fluid flow by selectively pinching flexible tubing (60) in response to, for example, bather position sensed by proximity sensor (18).

It will be apparent to one skilled in the art that there are various alternative methods by which the cross-sectional area of a flexible tube can be minimized to effect flow rate control such as, but not limited to: an eccentric roller; a roller on an arm; or opposing movable compression bars. Of course any of a variety of other types of valves can be employed, such as, but not limited to: ball valves; needle valves; plug valves; and gate valves. Further, those skilled in the art will understand that other alternative energy sources or motive mechanisms to actuate the flow rate control strategy can be used, such as, but not limited to: hydraulic pressure; pneumatic pressure; or vacuum or suction. It also should be noted that a sensor for detecting the valve position may also be included in the embodiment shown in FIG. 2, such that the sensor signals back to controller (32) the current state of valve (31) in FIG. 2.

As will be discussed in more detail below, various other types of sensors and/or user input devices (e.g., a keypad, one or more input keys, etc.) may be provided on system (10), in communication with controller (32). The embodiment shown in FIG. 2 includes a temperature sensor (79) configured to sense the temperature of water flowing through conduit (36). Alternatively, temperature sensor (79) may be located to sense the temperature of water in conduit (38), downstream of flow control device (30). Temperature sensor (79) may comprise, for example, a linear active thermistor integrated circuit (e.g., MCP9701 from Microchip Technology In.), or a thermocouple, in communication with controller (32) and provides a temperature signal thereto. As further described below, controller (32) may be configured (e.g., programmed) to use the sensed temperature in regulating water flow through system (10).

Flow control system (10) may be configured (programmed) to operate in any of a variety of ways suitable for regulating flow rate based on the position of an object in a region adjacent the system, as well as (in some embodiments) water temperature and/or water flow rate.

By way of example, flow control device (30) and controller (32) may be configured such that, in the absence of a signal from sensor (18) indicating the presence of a bather, full flow through flow control device (30) is provided (e.g., the valve in flow control device (30) is fully open). In such an arrangement, as soon as the user turns on the water so as to provide water to inlet (14) of system (10), water will freely flow through shower head (26) at its maximum flow rate. Thereafter, when the bather enters the shower enclosure and the user's presence is detected within the interrogation region (44), the flow rate will be regulated based on the location of the bather as detected by sensor (18). Maximum flow rate (valve (31) 100% open) is maintained when the user is nearest the shower head. As the user moves further away from the shower head (i.e., further away from sensor (18)), valve (31) is closed (e.g., by an amount proportional to a predetermined distance of the user from the shower head). If the user moves a predetermined distance from sensor (18) or out of the interrogation region (44) entirely, controller (32) causes valve (31) to close even further (e.g., to less than 10%, or less than 5% open), or even entirely closed such that no water flows through the shower head.

In embodiments which employ both proximity and temperature sensors, the sensed temperature may be used, for example, to conserve water by limiting the flow rate once a preset water temperature has been reached—particularly if no user is detected in the interrogation region. Such an arrangement provides the additional benefit of allowing a user to turn on the water supply to a shower head and allow the water temperature to reach a desired or appropriate preset temperature before the user enters the shower enclosure. Once the preset temperature is reached, water flow is reduced by the system until the presence of a user is detected by the proximity sensor. The preset temperature may be built into (i.e., stored in memory or otherwise programmed in the controller) the system. Such a preset temperature may be chosen to correspond to an expected minimum bathing temperature (e.g., 85 F). In such a system, the controller does not use this preset temperature to control water temperature. Rather, the preset temperature is simply used to determine whether or not a user has begun a bathing session, rather than use of the shower for some other purpose (e.g., cleaning the shower enclosure, bathing a pet, etc.).

Alternatively, system (10) may be configured such that the user may input the desired temperature. For example, one or more input devices (e.g., a keypad, one or more buttons, a touchscreen, etc.) may be provided on housing (12), or on a user interface which communicates with controller (32) (wired or wirelessly). For example, a user interface may be mounted on a wall of the shower enclosure, as further described herein. Alternatively, system (10) may be configured to wirelessly communicate (e.g., via RF, ultrasound or infrared signals) with a remote user interface such as an interface similar to a television remote control. In the case of a remote user interface which communicates via ultrasound, the transmitter of the user interface may even be tuned to the resonant frequency of the proximity sensor (18) such that the user interface communicates with the controller (32) via proximity sensor (18).

As yet another alternative, system (10) may be configured to wirelessly communicate with a personal computer, or even a handheld computing device such as a "smartphone" which communicates with controller (32) via a suitable program loaded into the smartphone which communicates with controller (32) via RF (e.g., BlueTooth or WiFi standards). The user interface, regardless of type, allows the user to set or change the preset temperature used by controller (32) (e.g., using a wall mounted user interface having keys labeled with up and down arrows, along with a display screen showing the preset temperature).

During use of a system incorporating both proximity and temperature sensors, system (10), particularly controller (32) thereof, may initiate the start of a shower cycle. Initiation of a shower cycle may occur upon user input (e.g., the bather presses an input button on system (10)), or system (10) may initiate a shower cycle upon sensing water flow through the system or even upon the detection of an abrupt temperature change (indicating the flow of water at a temperature different than the ambient temperature). By way of example, a fluid flow sensor may be provided in system (10) such that, when the bather turns on the faucet to supply water to inlet (14), the fluid flow sensor provides a flow signal to controller (32), which then initiates a new shower cycle. Controller (32) may also be programmed such that water flow is stopped (or significantly reduced) if a predetermined period of time has elapsed since initiation of a bather session with the temperature not reaching the preset temperature described above. Alternatively, controller (32) may initiate a shower cycle when the water temperature is stabilized at or above the preset bathing temperature.

In one embodiment, after water flow through system (10) is detected, controller (32) maintains full flow (e.g., valve (31) is fully open) at least until the sensed temperature is stable (based on, for example, the temperature not varying by more than a predetermined amount during a period of time). If the stabilized temperature is less than the preset bathing temperature (e.g., 85 F), controller (32) will maintain maximum water flow. This provides a "system override" feature whereby flow control does not occur when water from the shower head is being used for purposes other than bathing, such as to clean the shower enclosure, wash a pet, or other instances in which a bathing temperature (i.e., a temperature at or above the preset bathing temperature) is not desired or necessary.

Once the water temperature is stable (stabilized temperature) at or above the preset bathing temperature, and the presence of a user in the interrogation region has not been detected, the flow rate is reduced to a "keep pipes warm" setting (e.g., less than 1 gpm, less than 0.5 gpm, or about 0.1 gpm, or a reduced % opening of valve (31) such as 10%, or 5%)—also referred to as a temperature maintenance mode. By allowing some water to continue to flow, the water temperature is maintained without wasting water prior to the user entering the shower enclosure. Controller (32) may also be configured to increase water flow if the sensed temperature drops by more than a predetermined amount (e.g., more than 1 F) below the stabilized temperature (or, alternatively, the preset temperature) in order to increase the water temperature back to the stabilized temperature (or, alternatively, the preset temperature).

Once the proximity sensor detects that a bather has entered the shower, the flow is immediately raised to full flow (e.g., 2.5 gpm for a 2.5 gpm shower head) by causing valve (31) to fully open. An anti-scald feature may also be provided in system (10) such that the rate at which the flow rate is increased is greatly reduced if the water temperature exceeds a preset safety limit (e.g., 120 F pursuant to American Society of Sanitation Engineers Standard 1016). Alternatively, if the temperature exceeds the preset safety limit, system (10) may be configured such that controller (32) stops water flow entirely or maintains water flow in the temperature maintenance mode (or some other reduced flow rate) until the user causes the water temperature to drop (e.g., by manipulation of handles (42)). When the water temperature drops below the preset safety limit, controller (32) will cause the water flow rate to gradually increase back to the appropriate rate (i.e., based upon the sensed position of the bather).

Also following detection of bather by sensor (18), controller (32) may be programmed to execute an algorithm that determines the approximate height of the bather based on signals from proximity sensor (18) while standing, and the approximate "height" of the bather while kneeing or bending over. By way of example, the amplitude and timing of the echo signal can be used by the controller to estimate the bather's height. The approximate "height" of the bather while kneeling or bending over can then be determined by the controller using stored data correlating a person's standing height with the person's "height" while kneeling or bending over.

While the bather is statistically standing nearest the sensor, full flow is maintained. For example, controller (32) may be programmed to continuously calculate the distance of closest approach to the sensor, and the full flow portion of the interrogation region is determined based on a programmed number of standard deviations of the mean distance value of this data. Similarly, controller (32) may be programmed to continuously calculate the distance of furthest approach (e.g., kneeling or bending over) to the sensor (18), and the minimum flow portion of the interrogation region is determined based on a programmed number of standard deviations of the mean distance value of this data. While the bather is statistically kneeling or bending over, controller (32) causes the flow rate to be reduced to programmed minimum flow rate (e.g., less than 2 gpm, less than 1.5 gpm, less than 1.0 gpm, or about 0.5 gpm). Thus, controller (32) alters flow rate based on the sensed distance of the bather from sensor (18) and/or the shower head. And it will be understood that the sensed distance of the bather includes the distance of the bather's head from sensor (18) and/or the shower head.

Controller (32) is further configured such that, while the bather is located a distance from sensor (18) which is between that resulting in maximum (full) flow and that resulting in minimum flow, the flow rate is proportionately varied (linearly or nonlinearly) between the maximum flow rate and the minimum flow rate. The flow rate may be based, for example, on the ratio of the sensed distance less the standing height distance, divided by the difference between the standing height and kneeling height distances. Thus, controller (32) controls the water flow rate based on the sensed position of the bather in the interrogation region. Water is supplied to the bather at a programmably altered flow rate varying from full-flow to no flow, based on the distance of the bather from one or more proximity sensors.

Controller (32) is also configured to accumulate bathing time and/or gallons of water consumed (e.g., if a flow measurement device is included in the system), since the start of the shower cycle (e.g., from the time the temperature stabilizes at or above the preset temperature). If one or the other accumulator reaches a preset value, a water shutdown cycle is initiated. Particularly in embodiments which do not measure actual flow rates (e.g., lack a flow measurement device), accumulated bathing time may be scaled based on flow levels. For example, instead of simply accumulating the amount of time since the shower cycle commenced, regardless of flow rate, the elapsed "flow-ratio compensated time" (FRCT) may be accumulated. FRCT is defined as (time* (flowcurrent/flowmax)), wherein flowcurrent/flowmax is the percentage of flow (e.g., the percentage valve (31) is open) during any period of time. Thus, for example, when scaled bathing time is accumulated (as FRCT), one minute of bathing time at 25% water flow (e.g., when the bather is kneeling) is accumulated as 0.25 minutes, and one minute at full water flow is accumulated as one minute.

When shutdown mode has commenced based on the accumulated bathing time or gallons of water consumed reaching their predetermined limits, the controller (32) causes pulsation of water flow to alert the bather that it has entered shutdown mode, signaling that water flow will cease in a predetermined period of time (e.g., approximately 60 seconds, 30 seconds, or some other preprogrammed time period). An audible signal may also be provided to the user in addition to, or in place of, pulsating water flow. If the shower cycle is terminated by entering the water shutdown cycle, controller (32) may be programmed to include a lockout period during which no water flow will be permitted (e.g., 5 minutes, or 1 minute). At the end of such a lockout period, controller (32) will return to its initial state, waiting for the commencement of another shower cycle. Alternatively, when water flow ceases due to, for example, the user manipulating handles (42) to turn off the water supply to the system, controller (32) will return to its initial state, waiting for the commencement of another shower cycle. The above-described system may also be configured to signal to the bather once the water temperature has stabilized, such as by an audible signal.

FIGS. 6A and 6B are similar views to FIGS. 3A and 3B, and depict yet another embodiment of a flow control system (110). In this embodiment, flow control system (110) is configured to be positioned along a mixed water supply line which leads from shower control faucet (or handle) (142) to water feed tube (122) extending out of the wall (40) of the shower enclosure. The water supply line may be located external or internal to the wall (40), and a fixed shower head (126) is connected to the feed tube (122) in the typical fashion.

Flow control system (110) is similar to flow control system (10) described previously, and includes a proximity sensor (118) provided on the housing of the flow control system (110). In this embodiment, the housing is configured to be mounted to wall (40) (when the water supply line is external to wall (40)), or flush mounted within an opening cut into wall (40) (when the supply line is internal to wall (40)). Sensor (118) is provided on a surface of the housing such that, when flow control system (110) is mounted along the supply line, sensor (118) is directed toward the interrogation region (144). By way of example, flow control system (110) may be mounted within the wall (40) with sensor (118), particularly the sensor cover/lens, exposed through an opening in wall (40) or otherwise positioned for emitting an interrogation field (146) that results in a range signal for objects in the interrogation region (144).

In FIG. 6A the bather (150) is within the interrogation region (144) and the amplitude and timing of the acoustic echo (148) from the interrogation field (146) shown in the amplitude vs. time plot indicates the presence of the bather (150) within the interrogation region (144), near the shower head. In FIG. 6B, the bather (150) has moved further away from the shower head (and hence sensor (118)) within interrogation region (144). Thus, the amplitude of the acoustic echo (148) is reduced, and the acoustic echo (148) takes longer to reach sensor (118). In response, sensor (118) provides a signal indicating that the bather is further away from sensor (118). As in the previously described embodiment, the location of bather (150) in relationship to the interrogation region (144) determines the flow rate of water exiting shower head (126).

The water control system (110) shown in FIGS. 6A and 6B further includes a second, remote sensing device (180) which may comprise a second proximity sensor. Remote proximity sensor (180) may be similar to proximity sensor (18) described previously. However, in this embodiment, remote proximity sensor (180) is separate from the main housing of water control system (110) and is shown mounted to a side wall (or surface) of the shower enclosure. Remote proximity sensor (180) communicates with the controller of the water control system (110), e.g., by a wired or wireless communication Like proximity sensors (18, 118), remote proximity sensor (180) generates an ultrasound beam which creates a second interrogation region (182). In the example shown, the second interrogation region (182) generally extends orthogonal to first interrogation region (144). However, second interrogation region (182) may be oriented in any of a variety of ways with respect to first interrogation region (144).

Remote proximity sensor (180) provides a signal to the controller indicative of the location of an object (e.g., a bather) with respect to remote proximity sensor (180) in the manner described previously. The controller of water control system (110) uses this additional signal to further control water flow rate through system (110) based on the position of the user or other object.

By using two proximity sensors (118, 180), the embodiment shown in FIGS. 6A and 6B acquires two-dimensional information regarding the location of the user. Thus, water flow may be controlled based upon movement of the user laterally in the shower stall, as well as movement of the user in the front to back direction (i.e., towards or away from the shower head). The use of a plurality of proximity sensors is also desirable in shower installations having multiple shower heads (e.g., spa-type showers). In such embodiments, the flow control system may be configured to regulate water flow through a plurality of shower heads, such as a shower head mounted on the front wall of the shower enclosure (e.g., as shown in FIG. 6A) and a second shower head mounted on a sidewall of the shower enclosure (e.g., adjacent second proximity sensor (180)). In this manner, the first proximity sensor may be used to control water flow through the first shower head, and the second proximity sensor may be used to control water flow through the second shower head. Of course water flow systems with any number of fluid outlets and proximity sensors may be provided in accordance with the teachings herein.

From the preceding discussion regarding FIGS. 1-6B, it will be apparent to one skilled in the art that periodic changes in amplitude and timing of the object generated characteristics of the acoustic echo of the interrogation signals allows tracking of the location of the bather (50, 150) relative to the interrogation region (44, 144, 182). It will also be apparent that the motion of the bather within the interrogation region(s) can also be monitored. Such information can be used to further control water flow for water conservation or other purposes. By way of example, if the system (10, 110) determines, based on signals from the proximity sensor(s), that the user has remained essentially stationary for a predetermined period of time (e.g., just "chilling" and daydreaming) controller (32) may cause the water flow rate to slowly decrease even through the proximity to the sensor (18, 118, 180) has not changed. In this case, the bather location velocity vector is zero (or less than some predetermined value). In yet another alternative embodiment, controller (32) may be configured such that the rate of change of water flow will vary based on, for example, whether the bather is moving toward the sensor or away from the sensor, or even the velocity of the bather's movement. For instance, if the bather is moving away slowly, flow rate may also be decreased more slowly. If the bather is moving toward the sensor at the same slow velocity, controller (32) may increase the flow rate more aggressively than when the user is moving away from the sensor at the same slow rate.

Proximity sensors (118, 180) can independently be active or passive, acoustic, electromagnetic or infrared sensing systems such as, but not limited to, sensors based on detected or reflected sound waves (e.g., audible sound or ultrasound), reflected microwaves, or infrared detection. In addition, one or more additional proximity sensors may be provided, disposed in a single housing or in multiple housings positioned about a shower enclosure. When more than one interrogation region (144, 182) is provided, the interrogation regions can be substantially congruent, substantially complementary or partially congruent and complementary.

As yet another variation, mixed water supply line (122) may be replaced by separate hot and cold water supply lines such that hot and cold water is mixed within fluid control system (10, 110). In addition, water delivered through the fluid outlet of the water control system may supply multiple feed tubes and shower heads. Also, while the embodiments of FIGS. 1-6B depict a fixed, but pivotable, shower head (26, 126), a demountable, hand-held shower head may be employed with system (10, 100). For sake of drawing simplicity, such an arrangement is not illustrated but certainly can be used with the systems described herein. Installation configuration modifications which provide a largely unobstructed view of bather (50, 150) from the provided sensor location for such hand-held shower heads will be apparent to one skilled in the art.

Figure 7:
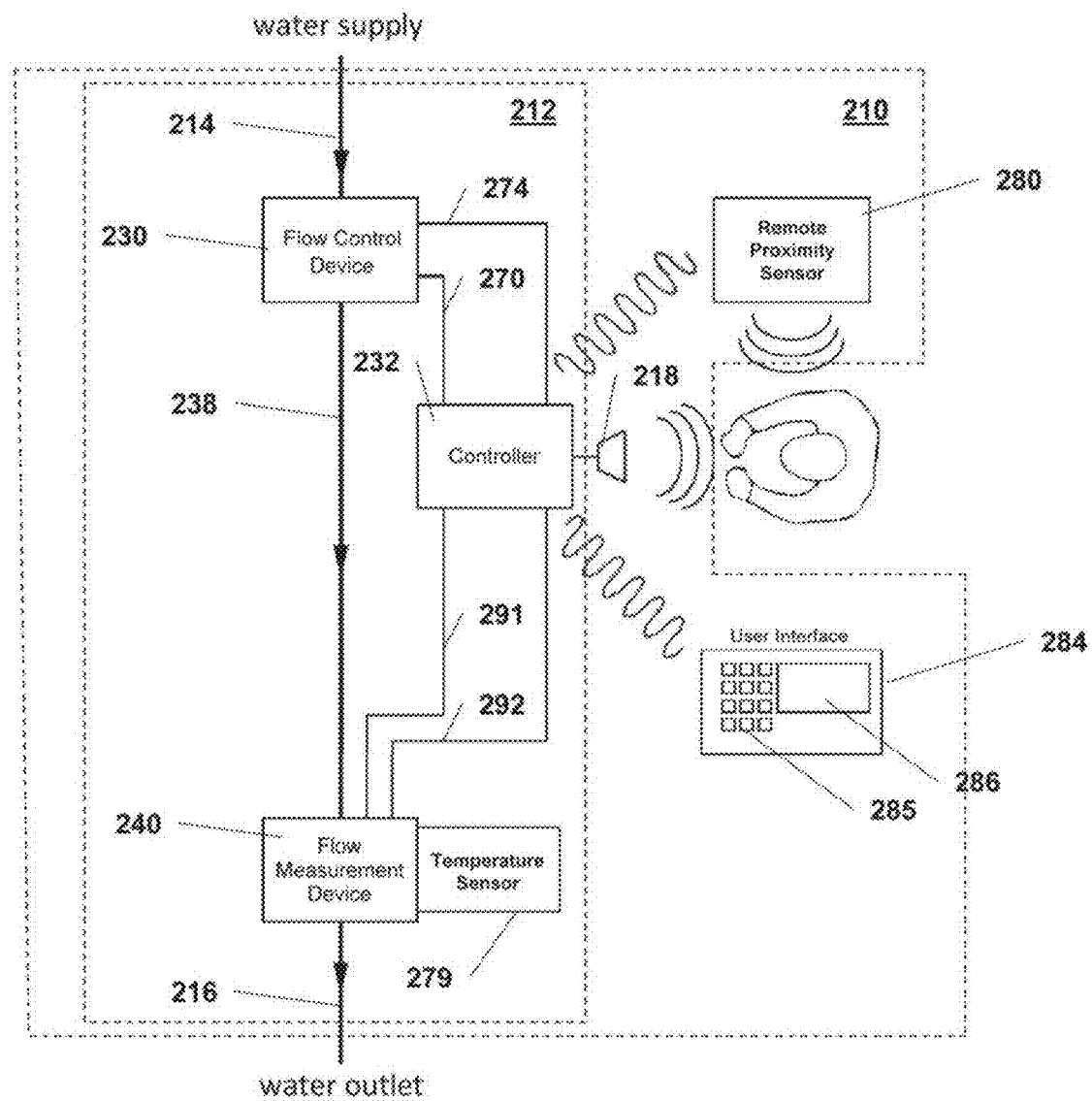
FIG. 7 is a schematic illustration of yet another alternative embodiment of a flow control system.

FIG. 7 depicts a block diagram of another embodiment of a fluid flow control system (210). System (210) may be structurally configured similar to the embodiment shown in FIGS. 1 and 2, and therefore includes a housing (212), a water inlet (214) provided at a distal end of housing (212), and a water outlet (216) provided at a proximal end of housing (212). A proximity sensor (218) is also provided, and may be located, for example, on housing (212)—such as on the end of a sensor arm (e.g., similar to sensor arm (20) in FIG. 1).

As described previously, proximity sensor (218) provides signals to the controller (232) which are indicative of a bather's position within an interrogation region adjacent sensor (218). As described previously, controller (232) regulates the flow rate of water through system (210) by sending appropriate signals to flow control device (230). Flow Control device (230) may comprise any of the devices and assemblies described previously, such as that shown in FIGS. 4 and 5, or the valve/motor combination depicted in FIG. 2. Flow control device (230) receives control power and signals from controller (232) through electrical connections (270, 274). Upon receiving signals from controller (232) through electrical connection (270), flow control device (230) continuously adjusts the flow of water through conduit (238) from 0 to 100% (i.e., from no flow, to full flow, and one or more flow rates therebetween). Flow valve position indication (as described previously in conjunction with FIGS. 4 and 5), or other signal indicating the state of flow control device (230) (e.g., 0-100% flow) is transmitted from the flow control device (230) to controller (232) through electrical connection (274). In one embodiment, the valve position indication signal provided to controller (232) simply indicates whether or not the flow control device (230) is fully open. Alternatively, the signal indicates the amount which flow control device (230) is open (e.g., 0 to 100%).

Fluid flow control system (210) further includes a remote proximity sensor (280) which is separate from housing (212), and communicates with controller (232) by a wired connection or a wireless communication (e.g., via radio waves). Remote proximity sensor (280) provides an additional interrogation region, as described previously. A user interface (284) is also provided in system (210). User interface (284) is separate from housing (212) and comprises a keypad (285) having one or more input keys for accepting user input, as well as a display screen (286) for displaying information to a user. As described previously, user interface (284) may alternatively comprise a handheld remote control unit or even a personal computing device such as a smartphone. A speaker may also be provided on user interface (284) for providing audible signals to a user. User interface (284) is configured for mounting on (or even flush-mounted within) a wall within the shower enclosure, or on a wall outside of the enclosure, and communicates with controller (232) by a wired connection or a wireless communication (e.g., via radio waves).

While flow control system (210) may be programmed to operate in any of the variety of ways described previously, system (210) further includes a flow measurement device (240) operatively located along conduit (238) between flow control device (230) and water outlet (216). Flow measurement device (240) is configured to supply a signal to controller (232) indicative of fluid flow rate, and may comprise any of a variety of structures and components known to those skilled in the art. It should be noted that flow measurement device (240) may also be located upstream of flow control device (230).

In one embodiment, the flow measurement device (240) is configured to not only provide a means for measuring fluid flow, but also provide a source of electrical energy for the system, particularly controller (232). A rechargeable power source such as one or more rechargeable batteries or supercapacitors may be provided in system (210) such as within housing (212) or even within controller (232) itself, as described previously. The signals from flow measurement device (240) are not only indicative of water flow rate, they are also sufficiently strong to provide electrical power to system (210). The signals are transmitted from flow measurement device (240) to controller (232) along electrical connection (291). In the embodiment shown, flow measurement device (240) also includes a fluid temperature sensor (279) such as the thermistor IC described previously in order to measure the temperature of the fluid exiting the system (212) through water outlet (216), and provide a temperature signal to controller (232) through electrical connection (292). Alternatively, fluid temperature sensor (279) may communicate directly with controller (232) along a separate electrical connection. In addition, fluid temperature sensor (279) may be located anywhere along the fluid flow path (e.g., upstream or downstream of flow control device (230), and upstream or downstream of flow measurement device (240)).

Figure 8:
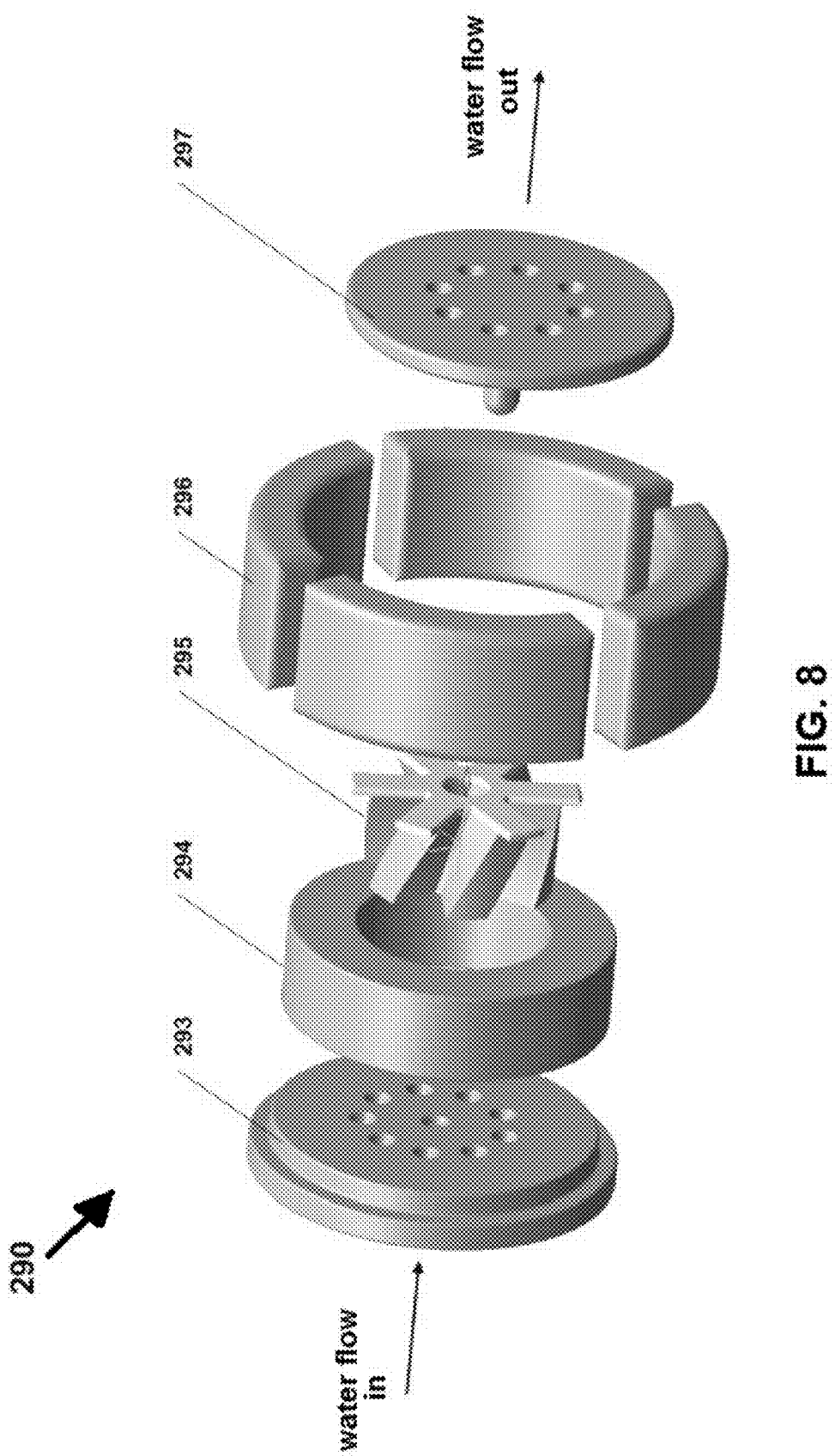
FIG. 8 is an exploded view of a flow measurement device suitable for use in the flow control systems described herein.

FIG. 8 shows an exploded schematic view of an exemplary flow measurement device (290) which not only provides a flow rate signal to controller (232), but also provides electrical energy to system (210). The electrical energy is derived from the energy of the fluid flowing through the flow measurement device (290). Flow measurement device (290) is similar to the flow meter described in U.S. Pat. No. 5,372,048, which is incorporated herein by reference.

Flow measurement device (290) shown in FIG. 8 includes an upstream orifice plate (293), a magnetic ring (294), a turbine spool (295), stator field coils (296), and downstream orifice plate (297). Fluid flows through upstream orifice plate (293) which organizes the fluid flow into a more laminar state. The fluid then flows through turbine spool (295) which is configured to rotate about a central axis in response to the fluid flowing past it. The fluid then exits through downstream orifice plate (297) which is configured to isolate the downstream turbulence from the turbine spool (295). Magnetic ring (294) is magnetically polarized (contains two or more magnetic poles), and is fixably attached to turbine spool (295) so that magnetic ring (294) rotates about the same axis as the turbine spool (295). Magnetic ring (294) is located and configured to rotate within stator field coils (296) as fluid flows through the device. The changes in magnetic orientation with respect to the stator field coils (296) induce an alternating current whose period of oscillation is inversely proportional to the rotational velocity of the turbine spool (295). Monitoring the period of oscillation provides a measure of the fluid flow velocity through the rotational velocity of the turbine spool (295). Combining the measure of fluid flow velocity (e.g. mm/sec) with the volume of the fluid filled space surrounding the turbine spool (295) provides a measure of the volume fluid flow rate (e.g. ml/sec).

The alternating current generated by stator field coils (296) may be provided to controller (232) along electrical connection (291). Controller (232) may be configured to not only determine fluid flow velocity, and hence volumetric flow, through conduit (238) of system (210) based on the period of oscillation of the current received from flow measurement device (290), but also to convert the alternating current into a direct current voltage suitable for operating components of system (210). Excess current may also be directed to one or more power storage devices in order to power system (210) when no water is flowing.

Alternatively, an external circuit may be provided in order to receive the current generated in the stator field coils (296) and produce an analog or digital signal proportional to fluid flow velocity which is then supplied to controller (232). The external circuit may also convert the alternating current into a direct current voltage suitable for operating electrical devices included in the system (210). Under some flow conditions, the flow measurement device (290) may generate electrical current in excess of that needed to operate the system (210). The excess current can be stored in an electrical storage device such as, but not limited to, one or more rechargeable batteries or capacitors. This electrical storage device can be used to operate system (210) when fluid flow is insufficient to operate the electrical components. Although not depicted in FIG. 8, a temperature measurement device may be provided in flow measurement device (290), such as but not limited to, a thermocouple which can be, by way of example, attached to or embedded in the upstream or downstream orifice plate (293, 297). Also, electrical wiring details and mechanical support, alignment, and attachment details are not depicted in FIG. 8, but are well within the understanding of one skilled in the art in light of what is shown and described herein.

Figure 10:
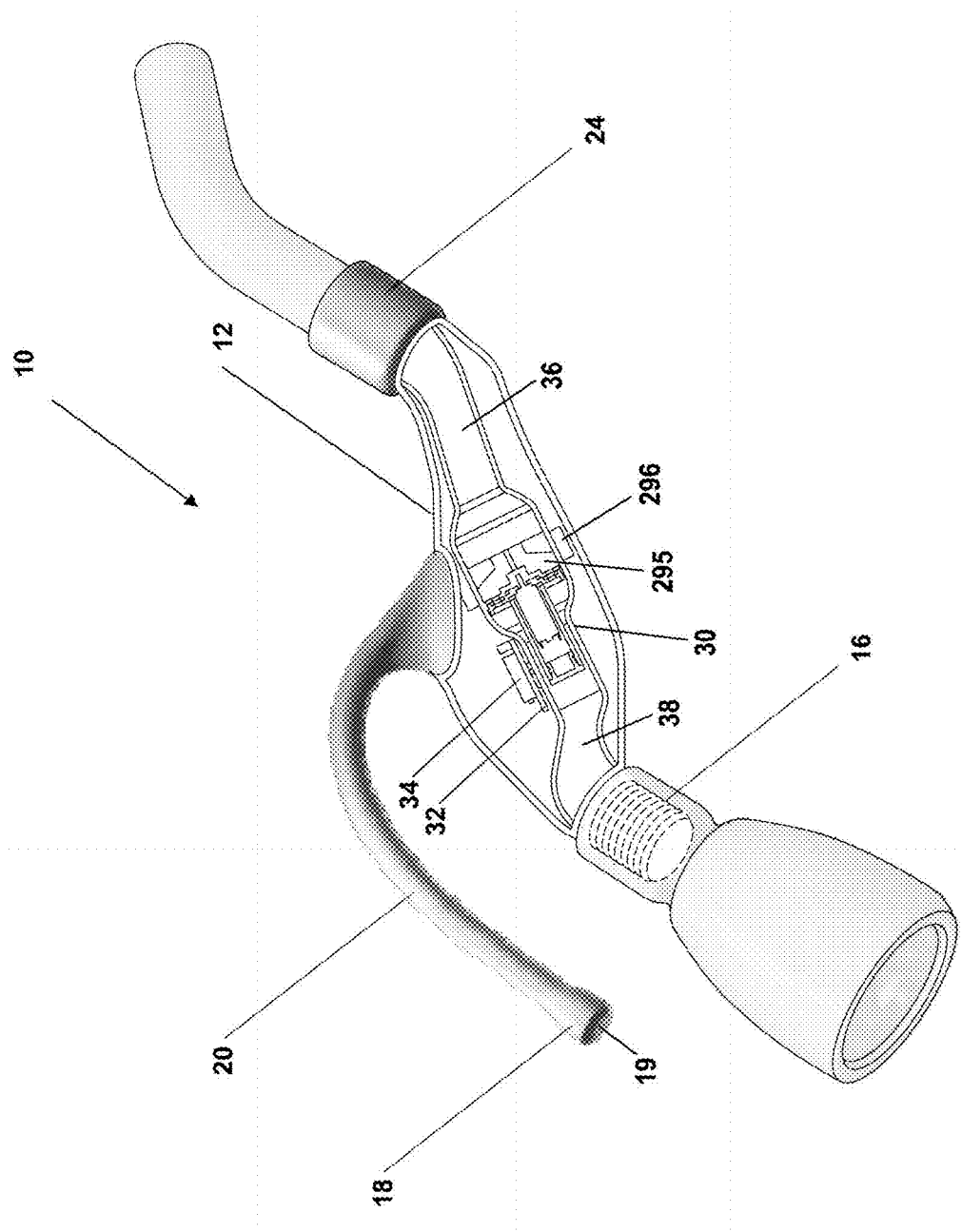
FIG. 10 depicts a partial cross-sectional schematic view of a modified flow control system similar to that shown in FIG. 2, wherein the flow measurement device of FIG. 8 is provided therein.

Flow measurement device (290) may even be incorporated into, or associated with, the flow control device (30) of FIGS. 1 and 2, with the flow rate data used by controller (32) in the manner described previously. Such an embodiment is depicted in FIG. 10, wherein flow measurement device (290) is provided between conduits (36, 38), upstream of flow control device (30). The embodiment depicted in FIG. 10 is essentially the same as that shown in FIG. 7, without a remote proximity sensor or user interface, and with the flow measurement device upstream of the flow control device. Similarly, flow measurement device (290) may be incorporated into the flow control system (710) shown in FIGS. 23-27.

In an alternative embodiment, the flow measurement device (240) may be configured to measure fluid flow using a mechanical fluid flow sensor or a fluid flow sensor that contains no moving parts and is not in direct contact with the fluid. Any of a variety of fluid flow measurement sensors known to those skilled in the art may be used. For example, ultrasound fluid flow measurement systems that use Doppler shifts of the interrogation beam to determine fluid velocity (and then by geometry, fluid flow in gpm) may be used. Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated.

A magnetic flow meter, commonly referred to as a "mag meter" or an "electromag," also may be used as a flow measurement device (240). A magnetic field is applied to the metering tube, which results in a potential difference proportional to the flow velocity perpendicular to the flux lines. Optical or thermal mass flow meters are yet another alternative. Optical flow meters use light to determine flow rate, whereas thermal mass flow meters which generally use combinations of heated elements and temperature sensors to measure the difference between static and flowing heat transfer to a fluid and infer its flow with a knowledge of the fluid's specific heat and density. As yet another alternative, flow rate may be determined using pressure measurements, such as by use of an elbow flow meter which uses pressure measurements of fluid flowing through an elbow in order to determine the flow rate.

Regardless of the type of fluid flow sensor employed as flow measurement device (240), the sensor may be provided in electrical communication (wired or wireless) with controller (232) such that power for the fluid flow sensor is supplied by controller (232) and signals indicative of fluid flow are provided by the fluid flow sensor to controller (232). Additionally, the flow measurement device (240) may contain a fluid temperature sensor to measure the temperature of the fluid exiting the system (210) through outlet (216), and provide a temperature signal to controller (232) through electrical connection (292).

User interface (284) receives input from a user (e.g., via keypad (285)) and transfers commands and data to controller (232) via, for example, an electromagnetic communication channel (i.e., wireless communication such as WiFi, BluTooth, etc.). The user interface (284) provides a convenient means for: i) configuring the operation of, 2) monitoring the utilization of, and 3) querying the status of the flow control system (210).

As further described herein, controller (232) may receive signals indicative of the state of flow control device (230) (e.g., either the % opening of a valve contained in flow control device (230) or simply whether or not the valve is fully open), fluid temperature, fluid flow rate, the position of a user (or other object) with respect to the proximity sensors (218, 280), and user input entered via user interface (384). In accordance with programmed instructions as well as these various signals and inputs, controller (232) regulates the flow of fluid through system (210) by sending signals to flow control device (230) which result in a change in fluid flow through system (210). For example, controller (232) may send signals to flow control device (230) which result in a valve in flow control device (230) changing states—e.g., fully closed, fully open, or one or more positions therebetween.

Figure 9:
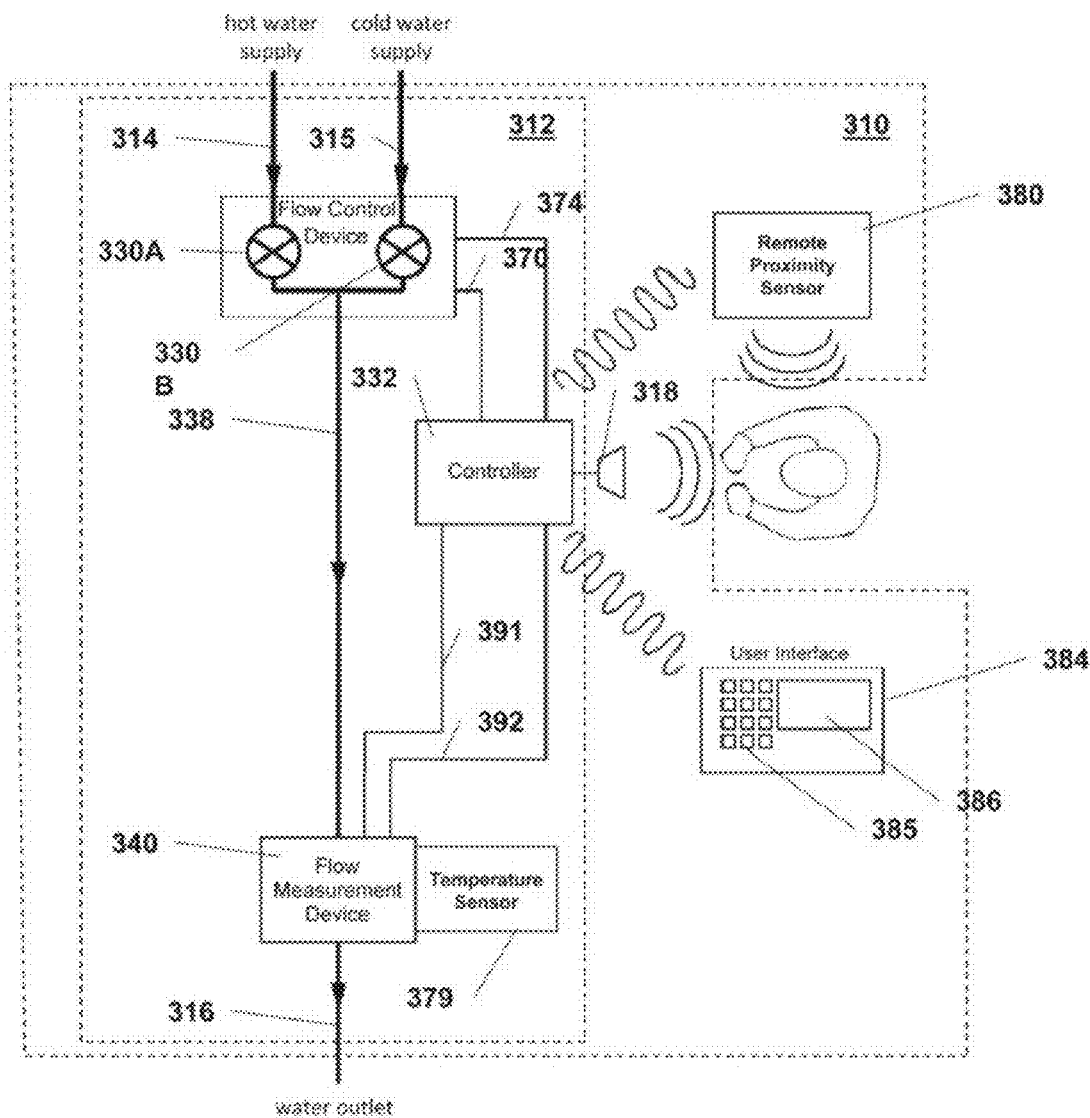
FIG. 9 is a schematic illustration of an alternative embodiment of a flow control system.

FIG. 9 depicts yet another alternative embodiment of flow control system (310) which is similar to that depicted in FIG. 7. System (310) may be structurally configured similar to the embodiment shown in FIGS. 6A and 6B, in that housing (312) is configured to be mounted within an opening in a wall of a shower enclosure with proximity sensor (318) located so as to detect the location of a user with respect to sensor (318) (i.e., sensor (318) is mounted so that it can "view" a user). For example, housing (312) may comprise a box having sensor (318) located on one side thereof. Housing (312) is mounted within an opening cut in the wall of a shower enclosure beneath the shower head, such that sensor (318), or at least the distal end of sensor (318) is exposed to the interior of the shower enclosure.

Flow control system (310) is further configured such that it includes hot water inlet (314) and cold water inlet (315), which are configured to be attached to hot and cold water supply lines, respectively, located behind a wall of a shower enclosure. Water outlet (316) is also on housing (312), and is configured to be attached to a feed tube located behind a wall of the shower enclosure. The feed tube, as in typical shower installations, extends upwardly behind the wall of the shower enclosure, and exits the wall at a suitable height terminating in a threaded end to which a shower head may be attached.

Flow control device (330) of system (310) in FIG. 9 not only controls water flow rate, it is also configured to mix hot and cold water to supply water to the shower feed tube at a suitable temperature. Flow control device (330) adjusts the flow of hot and cold water independently to create the desired flow and temperature of water supplied to conduit (338). Flow control device (330) adjusts the flow of hot and cold water based on signals provided by controller (332), as further described herein.

By way of example, flow control device (330) can comprise a pair of flow control valve assemblies (330A, 330B) which may be similar to the valve (31) and drive motor (33) assembly described previously. Controller (332) independently controls each valve assembly (330A, 330B) in order to not only regulate flow rate in the manner described previously (based on the location of a user within one or more interrogation regions), but also to regulate water temperature based on temperature signals from temperature sensor (379) as well as user-determined shower temperature (which may be different from the preset temperature defined previously with respect to the shower cycle). For example, if the measured temperature be lower than the desired temperature, the controller (332) sends a signal to the flow control valve attached to the hot water supply to open further. If the hot water valve (330A) is fully open, then the controller (332) will cause the cold water valve (330B) to close further. As before, fluid temperature sensor (379) may communicate directly with controller (332) along a separate electrical connection. In addition, fluid temperature sensor (379) may be located anywhere along the fluid flow path downstream of flow control device (330), and either upstream or downstream of flow measurement device (240).

A proximity sensor (318) is also provided, and may be located, for example, on housing (312). As in previously-described embodiments, proximity sensor (318) provides signals to the controller (332) which are indicative of a bather's position within an interrogation region adjacent sensor (318). Controller (332) regulates the flow rate of water through system (310) by sending appropriate signals to flow control device (330). Flow control device (330) (i.e., control valve assemblies (330A, 330B)) receives control signals (i.e., electrical power which drives the valve motor) from controller (332) through electrical connections (370, 374). Upon receiving signals from controller (332) through electrical connection (370), flow control device (330) continuously adjusts the flow of hot and cold water to not only provide the desired temperature, but also the appropriate flow rate through conduit (338), as described previously. Flow valves position indications, or other signals indicating the state of flow control device (330), particularly whether or not either or both valve assemblies (330A, 330B) are fully open, may be transmitted from the flow control device (330) to controller (332) through electrical connection (374).

Fluid flow control system (310) further includes a remote proximity sensor (380) which is separate from housing (312), and communicates with controller (332) by a wired connection or a wireless communication (e.g., via radio waves). Remote proximity sensor (380) provides an additional interrogation region, as described previously. A user interface (384) is also provided in system (310). User interface (384) is separate from housing (312) and comprises a keypad having one or more input keys for accepting user input, as well as a display screen for displaying information to a user. A speaker may also be provided on user interface (384) for providing audible signals to a user. User interface (384) is configured for mounting on (or even flush-mounted within) a wall within the shower enclosure, or on a wall outside of the enclosure, and communicates with controller (332) by a wired connection or a wireless communication (e.g., via radio waves).

System (310) also includes a flow measurement device (340) operatively located along conduit (338) between flow control device (330) and water outlet (316). Flow measurement device (340) is configured to supply a signal to controller (332) indicative of fluid flow rate, and may comprise any of a variety of structures and components known to those skilled in the art, as well as those previously described herein.

Figure 20:
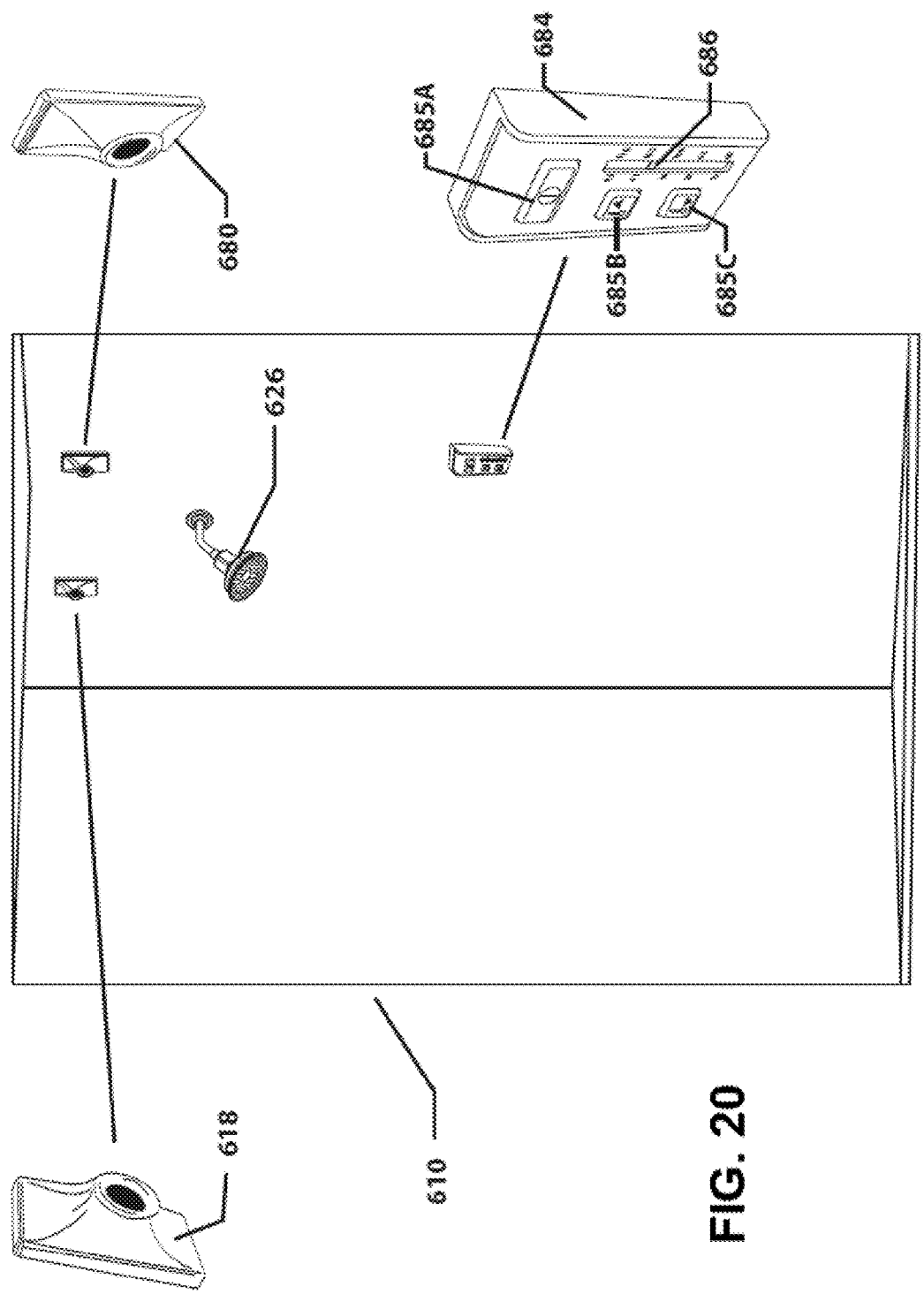
FIG. 20 depicts an exemplary installation of another embodiment of a flow control system installed in a shower enclosure.
Figure 21:
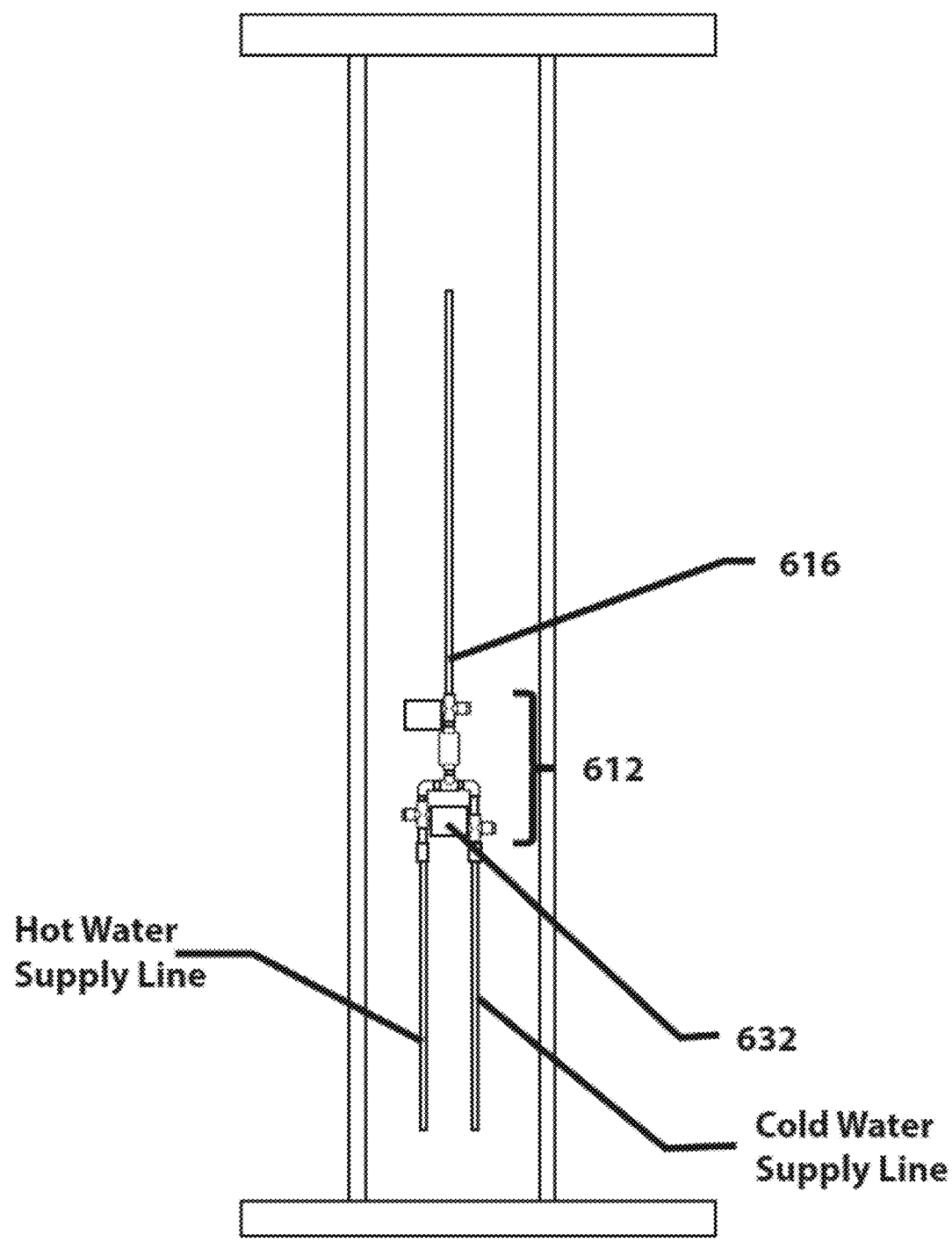
FIG. 21 is a schematic illustration of the internal assembly of the flow control system of FIG. 20.
Figure 22:
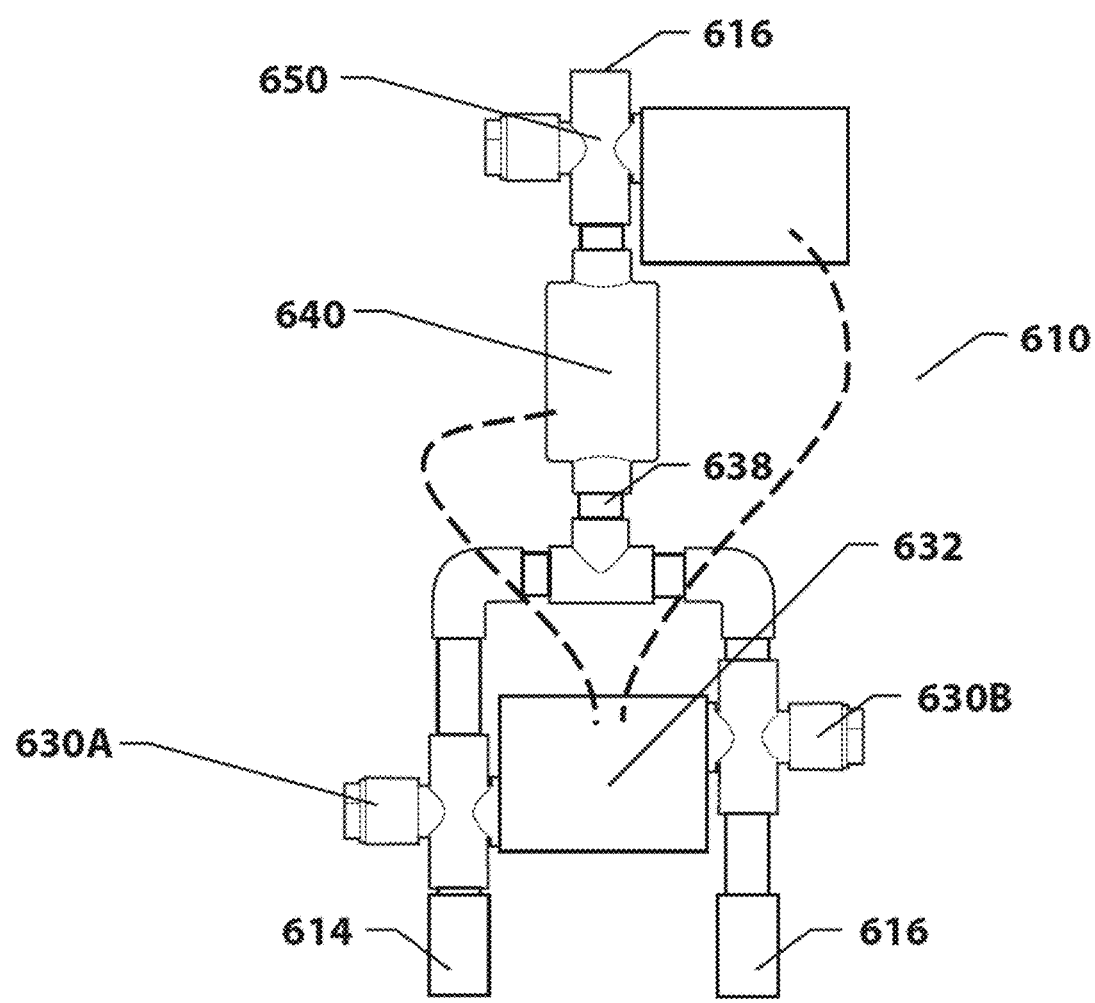
FIG. 22 is an enlarged schematic illustration of the internal assembly of the flow control system of FIG. 20.

FIGS. 20-22 depict an installation of modified version of the flow control system (310) of FIG. 9. In FIG. 20, flow control system (610) is shown installed in a shower enclosure such as found in a home, hotel, or other location where a shower may be provided, with much of the componentry of system (610) hidden behind the wall of the shower enclosure. In fact, the only components of system (610) visible in FIG. 20 are the proximity sensors (618, 680) and the user interface (684). Functionally, however, system (610) is configured similar to the embodiment shown in FIG. 9.

Proximity sensors (618, 680) are mounted on the same wall of the shower enclosure, above and offset from either side of shower head (626). In other words, sensors (618, 680) are spaced horizontally away from an imaginary vertical line extending through shower head (626), on opposite sides of such an imaginary line. Proximity sensors (618, 680) are located so as to detect the location of a user with respect to the sensors. Since shower head (626) will typically extend away from the wall of the shower enclosure by a distance falling within a known range, system (610) can be configured accordingly. Alternatively, system (610) can be configured such that the distance from the wall of the enclosure on which sensors (618, 680) are mounted to the end of shower head (626) may be provided to the controller (632) of system (610). It will also be understood that any number of sensors may be provided in system (610), and the proximity sensors may be mounted in alternative locations, such as the arrangement shown in FIG. 6A. As in previously-described embodiments, proximity sensors (318, 380) provide signals to the controller (632) (see FIG. 22) which are indicative of a bather's position within an interrogation region adjacent sensors (318, 380).

As discussed previously for other embodiments, flow control system (610) may include a single proximity sensor (618) mounted, for example, on the front wall of the shower enclosure. Alternatively, more than two proximity sensors may be provided, particularly in larger shower enclosures having a multitude of shower heads, with sensors mounted for example on one or more side walls and/or a rear wall of the shower enclosure.

Flow control system (610) may also be configured such that proximity sensors (618, 680) operate simultaneously or in alternating fashion so as to avoid interference with one another. As yet another alternative, one sensor (618) may be configured to transmit only, while the other sensor (680) receives the echo signals resulting from ultrasonic pulses transmitted by the first sensor (618).

In a still further embodiment, sensors (618, 680) and the system controller can be configured such that only one sensor transmits ultrasonic pulses at a time while both sensors receive the resulting echo signals. This process may be repeated such that after one sensor transmits pulses (with detection by both sensors), then the other sensor transmits pulses for detection by both sensors. This arrangement will allow for bather sensing much closer to the sensors, allows the system to acquire more detailed information about the shower installation (e.g., wall locations for subtracting as background signals), and/or further information about the bather's distance from the various sides of the shower installation.

A user interface (684) is also provided in system (610). User interface (684) is shown mounted on the front wall of the shower enclosure, however, alternative locations may also be used. User interface (684) communicates with controller (632) using either a wired connection or by wireless communication (e.g., RF signal). User interface (684) includes input buttons (685A, 685B, 685C). The first input key (685A), which may be an input button for example, is used to power on the system (610), also causing water to flow through shower head (626). Second and third input keys (625B, 625C) are used to control water temperature, as desired, with a temperature display screen (686) displaying water temperature and/or the user's desired water temperature. Of course user interface (684) may be configured to provide additional input keys, information displays, etc., as described previously.

As best seen in FIGS. 21 and 22, system (610) is configured such that the controller, flow control devices and flow measurement device comprise an internal assembly (612) which is mounted behind the wall of the shower enclosure between the wall studs. Flow control system (610) is further configured such that it includes hot water inlet (614) and cold water inlet (615), which are configured to be attached to hot and cold water supply lines, respectively. Water outlet (616) is configured to be attached to the shower head feed tube which extends upward behind the wall of the shower enclosure. The feed tube, as in typical shower installations, extends upwardly behind the wall of the shower enclosure, and exits the wall at a suitable height terminating in a threaded end to which a shower head (626) may be attached.

System (610) not only controls water flow rate, it is also configured to mix hot and cold water to supply water to the shower feed tube at a suitable temperature. Flow control valves (630A, 630B) are used to not only regulate flow rate in the manner previously described (based on the location of the user within the interrogation regions), but also to adjust the flow of hot and cold water independently to create the desired temperature of water supplied to conduit (638). Flow control devices (630A, 630B) adjust the flow of hot and cold water based on signals provided by controller (632). In particular, controller (632) independently controls each valve assembly (630A, 630B) in order to regulate water temperature in conduit (638) based on temperature signals from a temperature sensor (not shown) as well as the user-input shower temperature (which may be different from the preset temperature defined previously with respect to the shower cycle). For example, if the measured temperature is lower than the desired temperature, the controller (632) sends a signal to the flow control valve attached to the hot water supply to open further. If the hot water valve (630A) is fully open, then the controller (632) will cause the cold water valve (630B) to close further.

In contrast to the previously described embodiment of FIG. 9, system (610) includes an additional flow control device (650) (e.g., a solenoid valve) which controls the flow rate of water through conduit (638). Additional valve (650) is used to turn the water flow on and off, and thus may be configured to operate in one of two positions: fully open or fully closed. Controller (632) sends a signal via wired or wireless communication to flow control device (650) (i.e., electrical power which drives the valve motor), causing flow control device (650) to either open or close. Such an arrangement allows valves (630A, 630B) to be simplified (and less expensive) since it will not be necessary for these valves to fully close. For example, valves (630A, 630B) may operate between 10% to 100% open, rather than having an operable flow range of 0-100%. As before, flow valve position indications, or other signals indicating the state of flow control devices (630, 650) may be transmitted from the flow control devices.

System (610) also includes a flow measurement device (640) operatively located along conduit (638) between flow control devices (330A, 330B) and water outlet (616). Flow measurement device (640) may be located upstream or downstream of flow control device (650). As described previously, flow measurement device (640) is configured to supply a signal to controller (632) indicative of fluid flow rate, and may comprise any of a variety of structures and components known to those skilled in the art, as well as those previously described herein such as the embodiment shown in FIG. 8 which not only provides a flow rate signal to the controller but also provides electrical energy to the system. As mentioned previously, the flow measurement device may be similar to the flow meter described in U.S. Pat. No. 5,372,048, which is incorporated herein by reference. Alternatively, flow measurement device (640) may be similar to the flow meter described in U.S. Pat. No. 5,388,466, which is also incorporated herein by reference. When flow control device (640) is configured to generate electrical energy from the water flowing therethrough, such electrical energy may be stored (e.g., in one or more rechargeable batteries) in order to operate the system (610). In this manner, particularly when user interface (684) is in wired communication with controller (632), system (610) does not require an external source of electrical power. Thus, installation is simplified since system (610) does not need to be supplied with AC current.

It will also be understood that the additional fluid control valve (650) described above may be incorporated into the embodiment such of FIG. 9, either along conduit (338) or along water outlet line (316). In fact, an additional valve, such as a simple on/off solenoid valve may be included in any of the previously-described embodiments, downstream (or in some cases, upstream) of the proportional flow control devices described previously. Alternatively, particularly in installations wherein the shower enclosure includes a conventional on/off water valve (e.g., shower control handles (42, 142), such as shown in FIGS. 1, 3, 6, 7 and 23, such an additional on/off valve is not necessary even if the flow control device (e.g., 30, 230) of the system is not capable of fully closing. In such an arrangement, the flow control device may merely close to about 10% or less, but not all the way to 0%, as the user will simply use the conventional shower control handle (e.g., 42, 142) to turn the water flow completely off. These flow control systems may also be configured to notify the user if the user has not shut off the water after a predetermined period of time (e.g., by an audible signal such as periodic beeping). In this situation, even though no bather is detected, because the flow control valve never fully closes, water will continue to flow through the system at a very low rate (since a bather will not be detected). These systems may also be configured such that when water flow to the system ceases completely (e.g., when the bather turns off the shower faucet), the flow control valve fully opens, awaiting the next shower cycle.

In some shower installations such as that shown in FIG. 6A the hot and cold water supply lines, shower control faucet (or handle), mixed water supply line which leads from the handle to the water feed tube (equivalent to water outlet (616)) are located external to the wall of the shower enclosure. Flow control system (610) is easily adapted to such arrangements. For example, internal assembly (612) (see FIG. 21) may be provided in a suitable waterproof or water resistant housing, with hot and cold water inlets and a mixed water outlet provided on opposite ends thereof. Such a housing containing the flow control devices (valves), controller, flow measurement device, and power supply/storage device (when necessary) is then simply mounted to the wall of the enclosure so as to replace the shower control handle (142 in FIG. 6A). The proximity sensors may then be in either wired or wireless communication with the controller.

Figure 11:
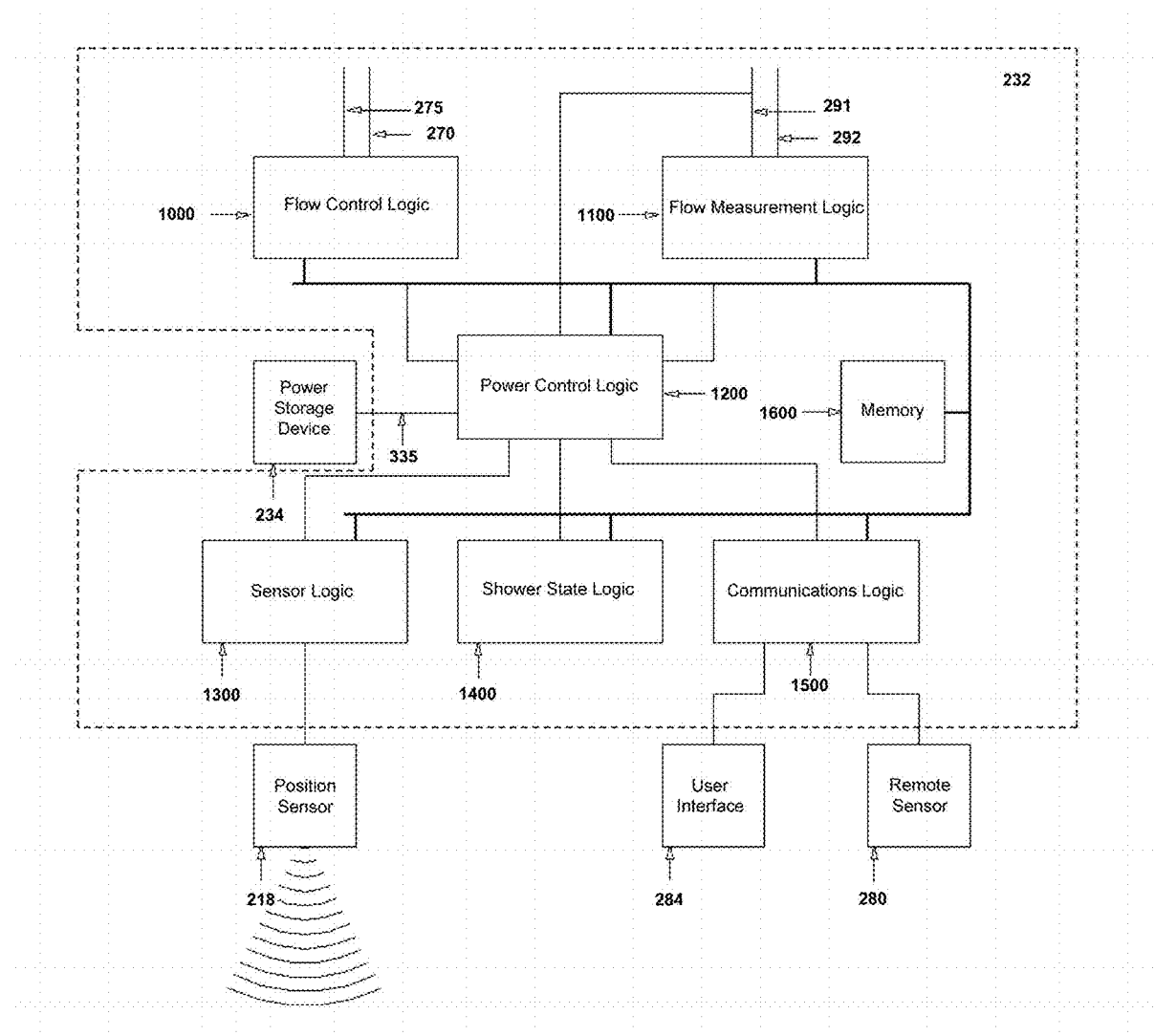
FIG. 11 is a block diagram of the control logic used in the flow control system depicted in FIG. 7.

Turning to FIG. 11, there is shown a block diagram of the control logic within controller (232) of the embodiment show in FIG. 7. The control logic is generally composed of the following functional logic blocks: flow control logic (1000), flow measurement logic (1100), power control logic (1200), sensor logic (1300), shower state logic (1400), and communications logic (1500). Controller (232), particularly the control logic thereof depicted in FIG. 11, receives signals from and transmits signals to various functional components of system (210), including: power storage device (234) (e.g., a rechargeable battery), proximity sensor (218), user interface (284) (particularly a transceiver provided as part of the user interface), and remote proximity sensor (280) (particularly a transceiver provided as part of the remote proximity sensor). The communication paths may be wired, or, particularly in the case of user interface (284) and remote proximity sensor (280), wireless. To that end, controller (232) may include a transceiver or other device(s) suitable for wireless communication.

Each of the functional logic blocks (1000, 1100, 1200, 1300, 1400, 1500, and 1600) can be realized as independent or cooperating dedicated functions such as but not limited to, for example: state machines; digital logic; memory access devices; mixed signal logic or analog logic. A subset of the functional logic blocks may be combined and realized by an independent or cooperating dedicated embodiment such as but not limited to, for example: customized programmable logic; state machines; digital logic; mixed signal logic or analog logic. Further, all of the functional logic blocks may be combined into a single dedicated embodiment such as but not limited to, for example: customized programmable logic; state machines; digital logic; mixed signal logic or analog logic.

Each of the functional logic blocks (1000, 1100, 1200, 1300, 1400, 1500, and 1600) may exchange data and/or state information between them through a data exchange bus (not shown). The data exchange bus may be composed of but not limited to, for example: a collection of dedicated signaling pathways amongst a subset of the functional logic blocks (e.g. dedicated physical wires); a shared, geographical addressed signaling pathway (e.g. a CAMAC bus); a master/slave shared signaling pathway (e.g. an I2C bus, Bluetooth); a frame-based shared signaling pathway (e.g. Ethernet or IEEE 802.3); or a shared memory signaling pathway (e.g. a database server system such as, but not limited to, MySQL).

In an embodiment wherein the flow measurement device generates usable power (as described previously), the power control logic (1200) accepts signals from the flow measurement device through a suitable signal pathway. For example, pulsed current generated by the stator field coils (296) (FIG. 8) is provided to power control logic (1200). Within the power control logic (1200), these current pulses are rectified and filtered to create a known, stable DC voltage and energy source for use within the system (210). Another function of the power control logic (1200) is to monitor the state of, and provide replenishment energy for, the power storage device (234). The power storage device (234) can be composed of but not limited to, for example: a lithium-ion battery; a nickelcadmium battery; a capacitor; or a fuel cell. When the power control logic (1200) is not able to provide sufficient energy for operation of the system (210) from the energy contained in the pulsed current generated by the stator field coils (296), energy from the power storage device (234) is used to augment that generated by the stator field coils (296).

The power control logic (1200) also provides energy to other functional logic blocks (1000, 1100, 1300, 1400, 1500, and 1600) via various power pathways. Power supplied to the functional logic blocks can be controlled to minimize energy utilization during periods of low or no fluid flow through the system (210), as determined by the energy content of the current generated by the stator field coils (296). For example, if there is no flow, the power control logic (1200) could provide a significantly reduced average power level to the communications logic (1500) for the purpose of responding to potential incoming communications from the user interface (284). The power control logic (1200) may contain configurable features (e.g. output voltages for each power pathway, stored power charging parameters, time-out values) that may be accessed and or established through the data exchange bus.

The flow control logic block (1000) accepts information from flow control device (230) and/or flow measurement device (240, 290) through signal pathways (274, 292). Information transferred via these pathways includes one or more of, but not limited to: fluid temperature; fluid pressure; flow control valve assembly health status; and flow control valve position; fluid flow rate. Information transferred via these pathways may be used during implementation of local control functions within the flow control logic block (1000) or made available to other functional logic blocks (1100, 1200, 1300, 1400, 1500, and 1600) via the data exchange bus. The flow control logic block (1000) may also accept directives from other functional logic blocks via the data exchange bus that result in sending control power to the flow control device (230) via signal pathway (270) which results in a change in fluid flow rate exiting fluid outlet (216).

Figure 12:
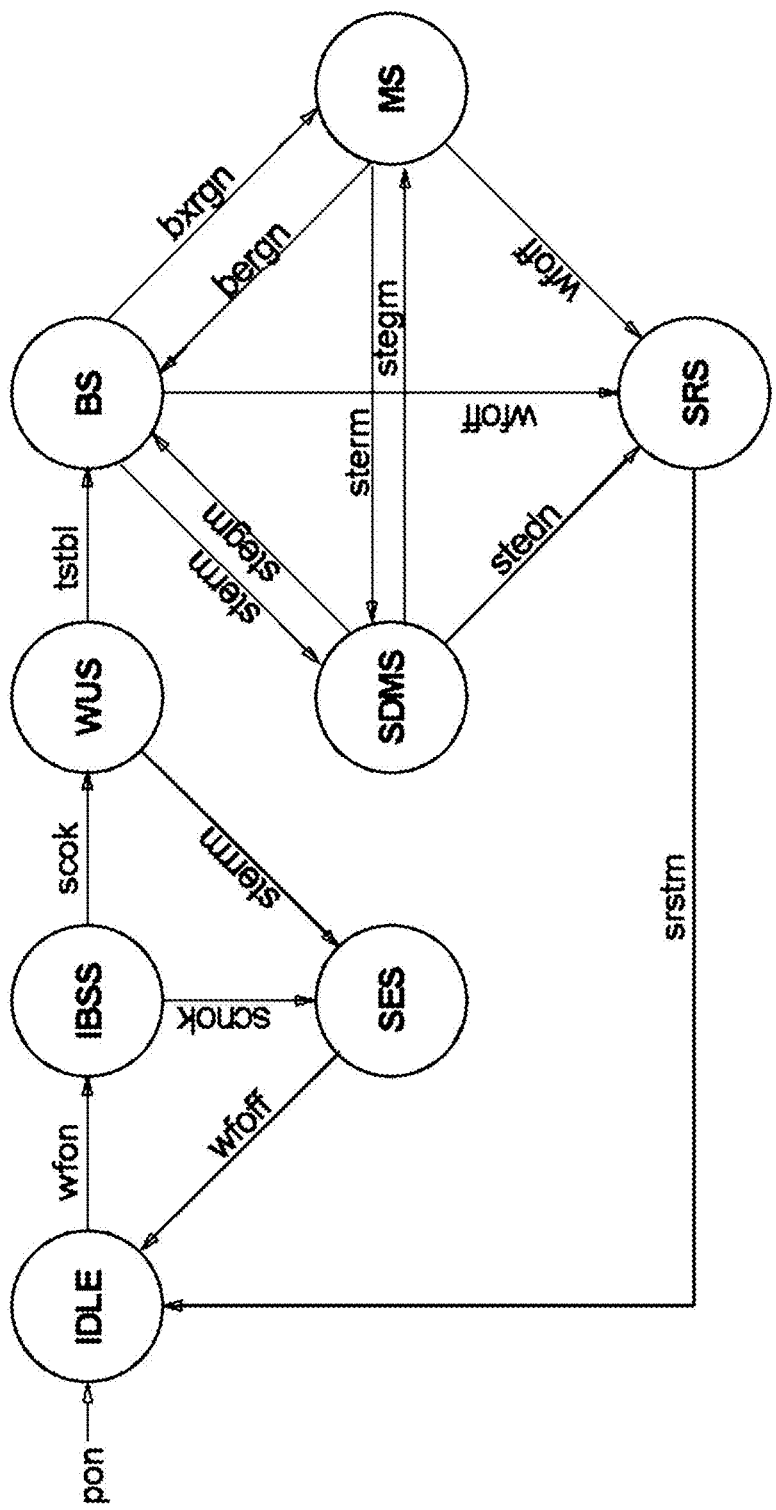
FIG. 12 depicts exemplary operational states for the flow control system of FIG. 7.

FIG. 12 shows exemplary operational states for system (210). The exemplary operational states for this embodiment are defined as:
IDLE—The device is waiting for a command.
IBSS—Initialize Bathing Status State
WUS—Warmup State
BS—Bathing State
MS—Maintain State
SDMS—Shower Database Management State
SRS—Shower Reset State
SES—Shower Error State The transition from state to state is defined by the following messages generated by sensors or other hardware located throughout the device (it being understood that the system may be configured such that one or more of these messages are not part of the control logic, such as "wpon" in cases where a pressure sensor is not provided in the flow control system):

pon—Power on: a message generated when the system is first powered on.

wpon—Water Pressure On: a message generated when water pressure is sensed at the entrance to flow control device (230).

wfon—Water Flow On: a message generated when water flow is sensed in the system. This event could be due to flow of water through flow measurement device (240, 290) and the resulting signal on signal pathway (291).

wfoff—Water Flow Off: a message generated when controller (232) determines that water flow must be terminated by the device.

scok—Shower Controller OK: a message generated when self-testing and initialization of the control logic of controller (321) is successfully completed.

scnok—Shower Controller Not OK: a message generated when self-testing and initialization of the control logic has resulted in an internal error condition.

sterrm—Shower Temperature Error Message: a message generated when controller (232) has not been able to sense a stable water flow temperature within a prescribed timeframe. In some embodiments, temperature sensing is provided and this message may be generated. In other embodiments, temperature sensing is not provided and therefore this message will never be generated.

tstbl—Temperature Stable: a message generated when the controller (232) has verified a stable water flow temperature within a prescribed timeframe. In some embodiments, temperature sensing is provided and this message will be generated as required in the controller (232) programming. In other embodiments, temperature sensing is not provided and this message is generated based on FRCT or volume as required in the controller (232) programming.

bxrgn—Bather Exited Region: a message generated when the controller (232) has detected that the bather is outside the interrogation region.

bergn—Bather Entered Region: a message generated when the controller (232) has detected that the bather is inside the interrogation region.

sterm—Schedule FRCT Extension Request Message: a message generated when the controller (232) has detected bather actions that would indicate a desire to extend the FRCT (water volume) limits pending expiration.

stegm—Schedule FRCT Extension Granted Message: a message generated when the controller (232) has detected bather actions that would indicate a desire to extend the FRCT (water volume) limits pending expiration and conditions allow the request to be granted.

stedm—Schedule FRCT Extension Denied Message: a message generated when the controller (232) has detected bather actions that would indicate a desire to extend the FRCT (water volume) limits pending expiration and conditions do not exist to allow the request to be granted.

srstm—System Reset Message: a message generated when the controller (232) has determined that a bather session has been terminated.

The specific manner in which the preceding signals and messages are generated is dependent on the particular compliment of sensors integrated into an embodiment of the device. One skilled in the art can optimize the embodiment, its compliment of sensors, and particular state transitions to achieve the wide range of functions previously described. It is also evident to one skilled in the art that sub-states and other derived signals may be defined to further refine the operation of the controller for a particular embodiment and functionality.

The flow control system, particularly the controller and control logic may be configured in a variety of ways, such as that described previously. Of course one skilled in the art will recognize that other control schemes may be employed. For example, the fluid flow system may be configured to minimize water consumption by automatically adjusting the flow rate of a shower based on the position of the bather with relation to the shower head and either the volume of water consumed during the shower session or the elapsed "flow-ratio compensated time" of the shower session (or even the uncompensated accumulated shower time). The system detects the presence of a bather within an interrogation region that includes the operable area of the shower enclosure (or other shower area). The flow rate of water through the system may be continuously altered in response to one or more of, but not limited to, the location of the bather within an interrogation region, the movement of the bather within an interrogation region, audible signals from the bather or another person in the vicinity of the system (e.g., via a microphone and associated voice-activation circuitry in the controller), or other types of input provided by the bather or another person in the vicinity of the system (e.g., via a keypad, input buttons or other user interface).

By way of example, when the system has entered a shutdown cycle (e.g., because the accumulated bathing time or water consumption reaches a predetermined limit), the bather (or another person in the vicinity of the system) may be permitted to extend the shower cycle, such as by audible input (via voice recognition or control) or by providing some other input such as by pressing a button or key on an input device or other user interface. The system may be configured to automatically allow an unlimited number of shower cycle extensions, each one of unlimited duration or of limited duration (e.g., each extension is only 1 or 2 minutes in length). Alternatively, the system control logic may be configured to only allow a predetermined number of shower cycle extensions (preprogrammed or based on user input), or even a predetermined number of shower cycle extensions of progressively shorter duration. If the controller determines that no additional shower cycle extensions are permitted, the system may either shut off all water flow or reduce water flow from full flow (e.g., 25% flow when no further extensions are permitted). The controller may even be configured to provide certain users with unlimited or different shower cycle extension rules, while others are not granted any (or a reduced number or duration) shower cycle extensions. Controller may include user recognition functionality, such as user access codes and other means for identifying users.

By way of further example, the following describes yet another operational and control method which may be incorporated into the control logic of the controller, comprises the following steps (some of which may be omitted, as will be apparent from the foregoing description of various embodiments):

A. Establishing the start of a bather session (e.g., based on user input, water flow detection, etc.);

B. Executing a "Warm-up Cycle" comprised of:
   (1) Providing water at full-flow rate
   (2) Optionally starting the accumulation of bathing time (raw time or FRCT) as well the accumulation of the volume of water consumed
   (3) When water temperature stabilizes, reduce water to a reduced-flow rate (e.g., less than 0.5 gpm)
   (4) Signal bather that water temperature has stabilized (e.g. audible signal to bather, such as a voice instruction, tone, music, etc.)
   (5) Exit "Warm-Up Cycle"

C. Sensing the presence and position of the bather within the region of operation, or receiving an external signal or command, to initiate the "Bathing Cycle" comprised of:
   (1) Providing water to the bather at a programmably altered flow rate varying from full-flow to no flow based on the distance of the bather from the primary shower head;
   (2) Accumulating the time spent within the region of interrogation region (raw time or FRCT);
   (3) Accumulating the volume of water consumed while the bather is within the interrogation region;
   (4) Accumulating sensor data indicative of the bather (e.g., data used to estimate user height, user movement, etc.);
   (5) Sensing exit of the bather from the interrogation region, or receiving an external signal or command, to initiate a "Maintain Cycle."

D. Upon initiating the "Maintain Cycle":
   (1) Providing water at a programmably reduced-flow rate;
   (2) Accumulating the FRCT (or raw time) that the user is outside the interrogation region;
   (3) Accumulating the volume of water consumed while the bather is outside the interrogation region;
   (4) Accumulating sensor characteristics indicative of the interrogation region without the bather present;
   (5) Sensing the entry of the bather into the interrogation region, or receiving an external signal or command, to initiate the "Bathing Cycle."

E. Monitoring accumulated FRCT (or raw time):
   (1) Alerting bather as end of programmed allowable FRCT is nearly reached;
   (2) Monitoring sensors, or receiving an external signal or command, that create a "FRCT Extension Request;"
   (3) Adding programmed extension FRCT to allowable FRCT;
   (4) Repeating steps 1 through 3 up to a programmed number of times (including the possibility of 0 more times);
   (5) Providing water at reduced-flow rate when programmed allowable FRCT plus extensions is reached (where reduced flow rate may include zero flow).

F. Monitoring accumulated volume of water consumed:
   (1) Alerting bather as programmed allowable volume is nearly reached;
   (2) Monitoring sensors, or receiving an external signal or command, that create a "Volume Extension Request;"
   (3) Adding programmed extension to allowable volume;
   (4) Repeating 1 through 4 up to a programmed number of times;
   (5) If during "Bathing Cycle" or "Maintain Cycle" providing water at reduced-flow rate when programmed allowable volume plus extensions is reached (including the possibility of 0 more times);

or if during "Warm-up Cycle" initiating internal error processing.

G. Monitoring water flow rate
  (1) When water flow rate is below a programmable value initiating "Reset Cycle" comprised of:
    (i) Starting FRCT countdown with a programmed value;
    (ii) Entering "Idle State" when counter is expired;
  (2) Initiating internal error processing if water flow rate does not match anticipated flow rate.

FIGS. 13-19 depict yet another embodiment of a flow measurement device (440) and flow control device (430) which may be incorporated into any of the flow control systems described herein. Flow measurement device (440) and flow control device (430) are integrated with one another such that an end portion of flow measurement device (440) provides a portion of a stationary valve plate of flow control device (430), as described below. This integrated structure shown in FIGS. 13-15 may be used, for example, in place of flow measurement device (290) and flow control device (30) in the structure shown in FIG. 10. Thus, flow measurement device (440) and flow control device (430) may be provided between conduits (36, 38) or alternatively within one or both of conduits (36, 38). It should be pointed out that conduits (36, 38) may comprise a single, unitary conduit (e.g., a flexible tube), with the integrated assembly of flow measurement device (440) and flow control device (430) housed therein similar to that shown in FIG. 10. In such an arrangement, water will flow through conduit (36), through flow measurement device (440), through flow control device (430), and into conduit (38). Thus, flow measurement device (440) will once again be located upstream of flow control device (40). As also described below, flow measurement device (440) may also be used to generate power for the flow control system (10). And flow control device (430) comprises a motor-driven ceramic disc valve.

Flow measurement device (440) not only provides a flow rate signal to the controller, but also provides electrical energy to the system. In contrast to the previously described embodiment, the flow rate measurement and power generation features of flow measurement device (440) are provided by separate structures. In particular, a first upstream turbine assembly (441) is used to measure flow rate, while a second downstream turbine assembly (442) generates usable electrical power. Thus, each of the first and second turbine assemblies (441, 442) includes a rotatable member (495, which rotates in response to water flow through the system.

Figure 14:
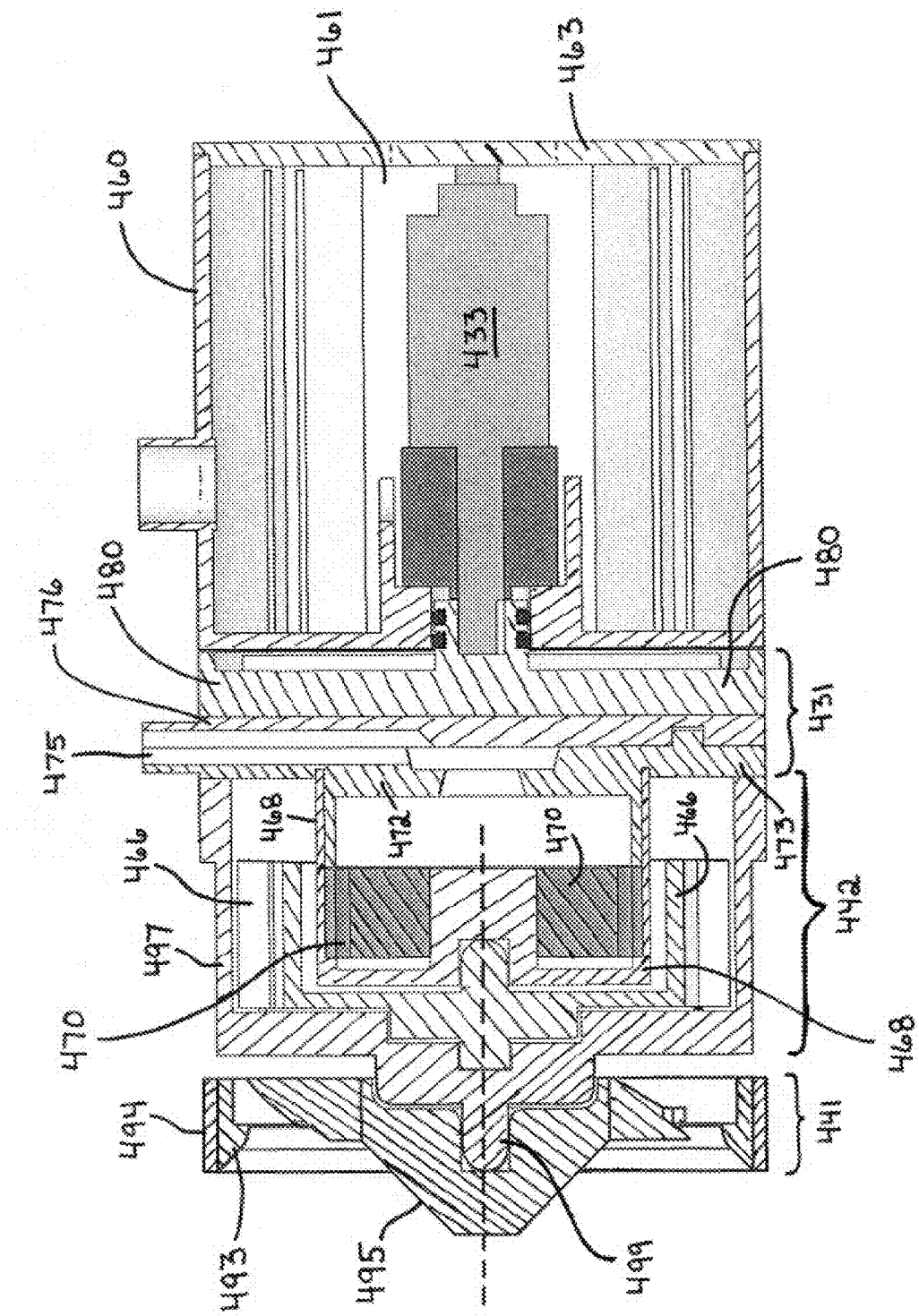
FIG. 14 is a schematic, partial cross-sectional view of the assembled embodiment shown in FIG. 13.
Figure 15:
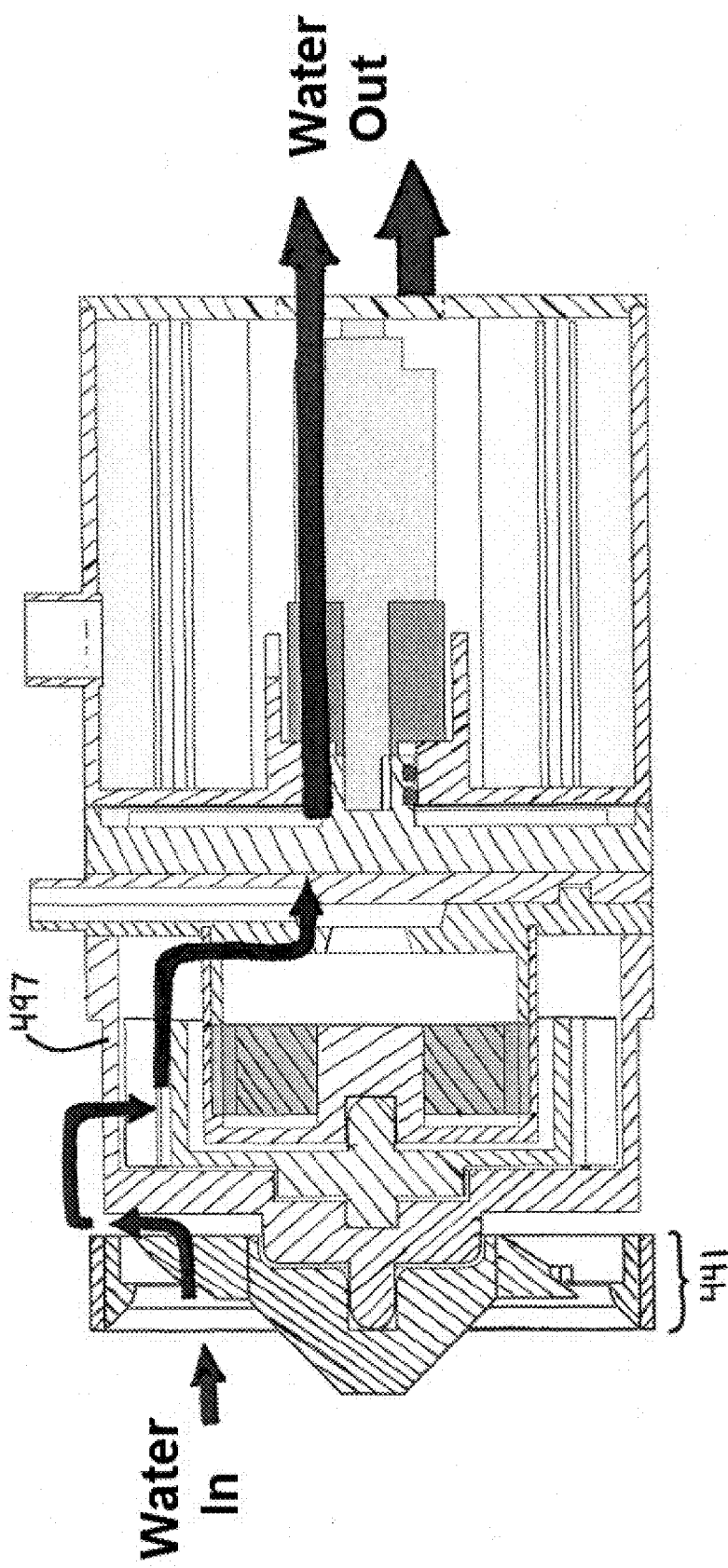
FIG. 15 is the same view as FIG. 14, wherein water flow is schematically illustrated.

First upstream turbine assembly (441) includes a turbine (495) mounted in a ring assembly comprising turbine ring (493) and magnetic ring (494). As best seen in FIG. 14, turbine ring (493) nests within magnetic ring (494), and turbine (495) is fixably mounted within turbine ring (493). Turbine (495) is rotatably mounted over shaft (499) of a nozzle assembly (497), such that first upstream turbine assembly (441) will rotate about a central axis of shaft (499) with respect to nozzle assembly (497) (i.e., nozzle assembly (497) is stationary). As is known to those skilled in the art, turbine (495) includes a series of angled blades configured such that water flowing through first turbine assembly (441) impinges upon the blades of turbine (495) causing turbine assembly (441) to rotate at a speed proportional to the water flow rate. A suitable sensor is provided (not shown) external to first turbine assembly (441) to detect the rotation of turbine assembly (441) and provide a signal to the controller indicative of the speed of rotation (and hence water flow rate). By way of example, magnetic ring (494) is magnetically polarized (contains two or more magnetic poles), and the fluid flow rate sensor comprises a Hall effect sensor in electrical communication with the controller and which supplies a voltage signal to the controller from which the speed of rotation of turbine (495) may be determined. Of course other types of rotational sensing devices and systems may be used, some of which would not require magnetic ring (494) for sensing purposes. One or more pre-turbine flow conditioning devices may also be provided upstream of turbine (495), as desired or necessary. Such conditioning devices may include, for example, a flow straightener or rotator, a flow velocity changer, and other devices known to those skilled in the art.

Second downstream turbine assembly (442) includes nozzle assembly (497), runner (466) rotationally mounted within the interior of nozzle assembly (497), a stator housing (468) fixedly positioned within the interior of nozzle assembly (497), a stator (470) fixedly mounted within stator housing (468) and partially within the interior of runner (466), and a stator housing endcap (472) mounted within the downstream end of stator housing (468) at the downstream end of nozzle assembly (497). Nozzle assembly (497) includes a plurality of fluid inlets (498) in its outer surface through which water flows into the annular interior of nozzle assembly (497). Water flowing through turbine (495) flows about the outer circumference of nozzle assembly and through fluid inlets (498) into the annular interior of nozzle assembly (497) (see FIG. 15). The water then flows about runner (466), causing runner (466) to rotate. As is well known to those skilled in the art, runner (466) is magnetically polarized (contains two or more magnetic poles).

Stator (470), as best seen in FIG. 14, is fixedly (i.e., non-rotational) mounted within stator housing (468) such that stator (470) is also positioned within the interior of runner (466). In this manner, as runner (466) rotates, the changes in magnetic orientation with respect to the stator field coils induce an alternating current which is provided to the controller along a suitable electrical connection (291). As discussed previously, the controller converts the alternating current into a direct current voltage suitable for operating components of the system and/or storage (e.g., in a rechargeable battery). The flowing water then passes through openings provided in stator housing end cap (472), as described below. As discussed previously, the alternative current from the stator field coils may also be used to provide another indicator of fluid flow rate.

Flow control device (430) essentially comprises a motor-driven disc valve. In some embodiments, ceramic discs are employed, while in other embodiments the discs are made from various other materials known to those skilled in the art such as stainless steel or brass. Flow control device (430) includes a housing (460), a motor (433) mounted in housing (460), a housing cover (463) having apertures which allow water to flow therethrough (not shown), and a disc valve assembly (431) located at the upstream end of housing (460). In some embodiments, housing (460) is configured to include one or more sealed chambers in which printed wiring boards (or printed circuit boards) and other electronic components and/or circuitry may be located. As seen in the schematic water flow diagram of FIG. 15, water flows through plenums in housing (460) located on opposite sides of motor (433) (the plenums are not depicted). These plenums are not in communication with the central interior (461) of housing (460) such that motor (433) remains dry. Openings in housing cover (463) are aligned with the plenums such that water will escape through these openings. Similarly, other electronic components in the various flow control systems described herein may be located in sealed or water resistant compartments, or simply located outside of any water flow path through the system.

Disc valve assembly (431) (e.g., a ceramic disc valve assembly) includes an apertured stationary valve plate (476) and an apertured rotating valve plate (480). Water will flow through valve assembly (431) only when portions of the openings (i.e., apertures) on the stationary and rotating valve plates (476, 480) are aligned with one another. Thus, water flow is regulated by motor (433) selectively causing rotating valve plate (480) to rotate.

Figure 13:
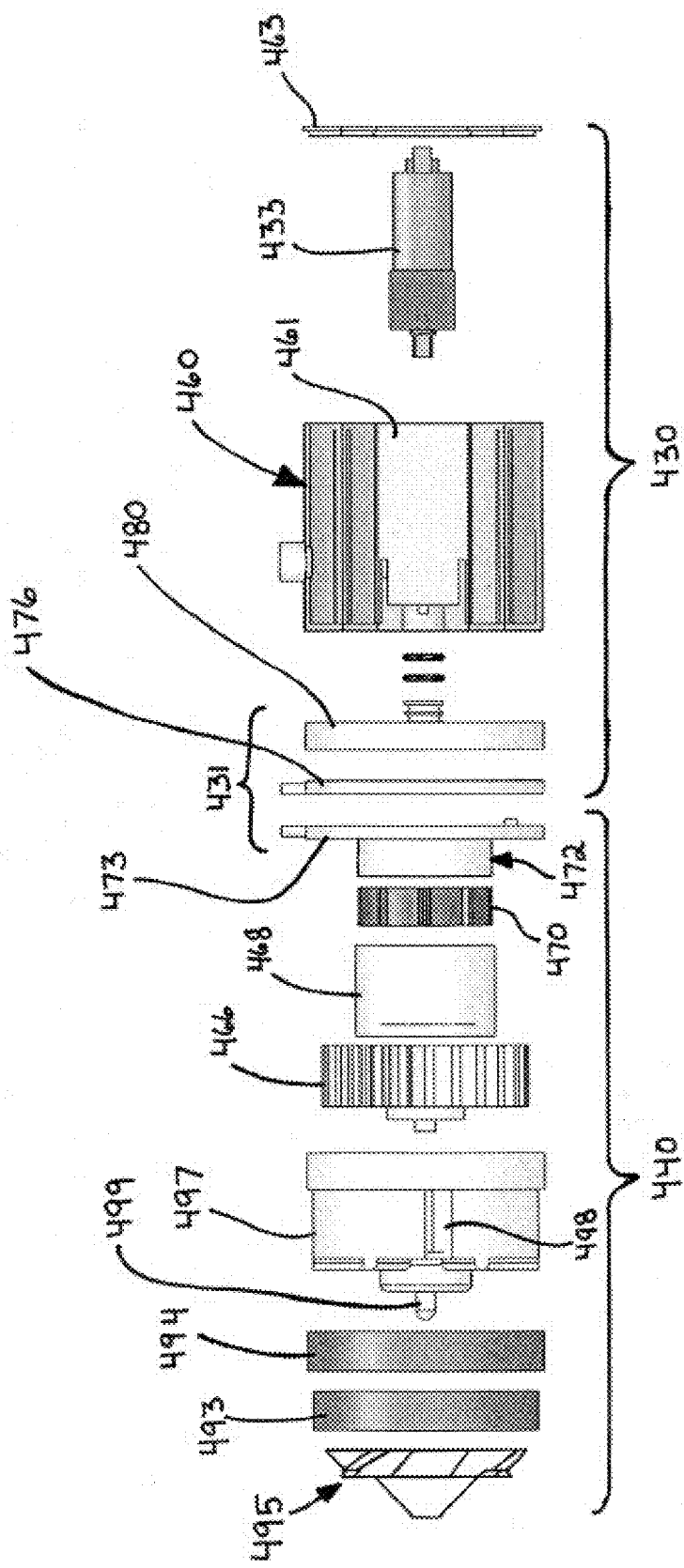
FIG. 13 is an exploded schematic illustration of an alternative embodiment of an integrated flow measurement device and flow control device for use in the embodiment shown in FIG. 10.
Figure 16:
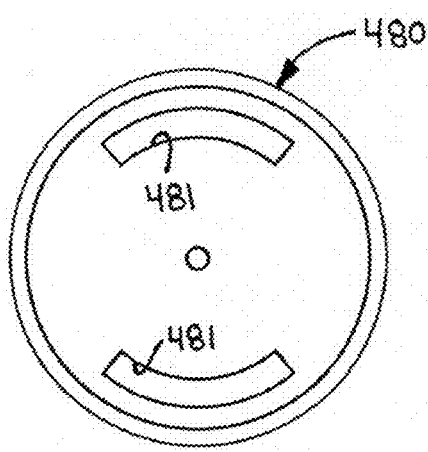
FIG. 16 is a downstream plan view of a rotating valve disc (i.e., plate) for use in the assembly of FIG. 13.
Figure 17:
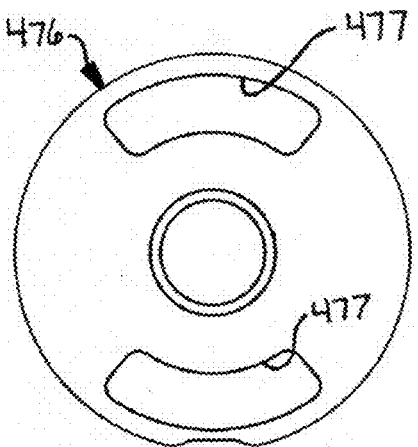
FIG. 17 is an upstream plan view of a stationary valve disc (i.e., plate) for use in the assembly of FIG. 13.

As seen in the plan views of FIGS. 16 and 17, rotating valve plate (480) and stationary valve plate (476) each include a pair of arcuate openings (481, 477) spaced inwardly from the outer circumference of the plates. Each of the pair of arcuate openings (481, 477) is circumferentially spaced on their respective plates. In the embodiment shown, the arcuate openings of each pair are also radially opposed to one another (i.e., directly opposite one another). As seen in FIGS. 13 and 14, stator housing endcap (472) includes a plate portion (473) which has the same size and shape as stationary valve plate (476). Plate portion (473) and stationary valve plate (476) are joined to one another as shown in FIG. 14. Plate portion (473) and stationary valve plate (476) also include mating recessed portions which, when plate portion (473) and valve plate (476) are matingly engaged, provide a wire chase (475) through which wiring and other electrical connections may pass into the interior of flow measurement device (440). Although not visible, plate portion (473) of stator housing endcap (472) also includes fluid openings which are aligned with arcuate openings (477) of stationary valve plate (476). In this fashion, when plate portion (473) and valve plate (476) are matingly engaged (FIG. 14), fluid flows through the openings in plate portion (473) into the openings in the stationary valve plate of disc valve assembly (431). The fluid openings in plate portion (473) may be similar in size and shape to the openings in the stationary valve plate, or may be various alternative shapes which expose the full extend of the openings in the stationary valve plate.

During operation, motor (433), in response to control signals (i.e., current) from the controller, will cause valve plate (480) to selectively rotate. In one embodiment, unless the system is in a lockout period described previously, valve assembly (431) will remain fully open prior to commencing a new bathing session. Thus, when a user first turns on the shower water supply, full water flow is provided. Valve assembly (431) is fully open when the full extent of each arcuate opening (477) on stationary plate (476) is in registry (i.e., aligned) with the full extent of each arcuate opening (481) on rotating valve plate (480). When aligned in this manner, water flows through arcuate openings (476, 481), with water flowing through the entirety of arcuate openings (481). When water flow is to be reduced (e.g., based on signals from the proximity sensor, or when the permitted water usage has been met), the controller will cause motor (433) to rotate valve plate (480) such that openings (481) are only in partial registry with openings (477) of valve plate (476). And flow can be stopped entirely (valve (431) closed) by rotating valve plate (480) until no portion of openings (481) are in registry with openings (477). It should also be noted that the flow control device may be alternatively configured such that either or both of the valve plates may be rotated for regulating fluid flow, as the same functionality is provided simply by causing the valve plates to be rotated with respect to each other.

Figure 18:
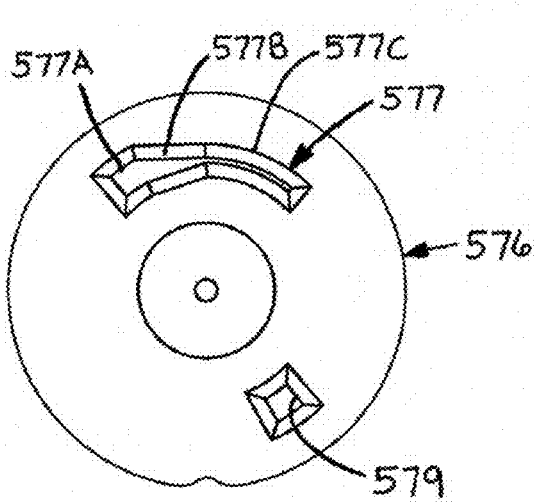
FIG. 18 is an upstream plan view of an alternative embodiment of a stationary valve disc (i.e., plate) for use in the assembly of FIG. 13.

FIGS. 18-19 depict an alternative embodiment of a stationary valve plate (576) having a pair of openings (or apertures) (577, 579) circumferentially spaced from one another on valve plate (576). As before, the openings (577, 579) are also generally radially-opposed to each other. It will be understood that identical openings are provided on the plate portion (473) of stator housing endcap (472), as described previously. Applicants have discovered that this alternative arrangement of the opening (577, 579) on the stationary valve plate not only provides more linear flow control than the embodiment shown in FIG. 17, but also more precise fluid control over the full range of flow rates. It should also be noted that the sidewalls of openings (577, 579) are also tapered in the axial direction (i.e., through the thickness of the plate), however this taper is not required.

First arcuate opening (577) is similar in length to openings (481) on plate (480) (identical, or within 10% of the length). However, first arcuate opening (577) has a varying width. First portion (577A) has a radial width approximately equal to the radial width of openings (481), and second portion (577C) has a generally constant, but narrower width compared to openings (481) and first portion (577A). For example, in the embodiment shown, second portion (577C) comprises an elongate, arcuate slit. A tapered portion (577B) has a tapering width and extends between first and second portions (577A, 577C).

Second opening (579) is similar in size and shape as, and is radially-opposed to, first portion (577A) of first opening (577). Second opening (579) may have any of a variety of alternative shapes such as circular and oval. By way of further example, second opening (579) may have an area approximately the same as first portion (577A) of first opening (577), even though its shape may be different. Second opening (579) is sized and located such that, for example, when only the tapered width portion (577B) and the second portion (577C) of the first opening (577) are aligned with one of the arcuate openings (481) in the first valve plate (480), the second opening (579) will not be aligned with the other arcuate opening (481) in the first valve plate (480).

Figure 19A:
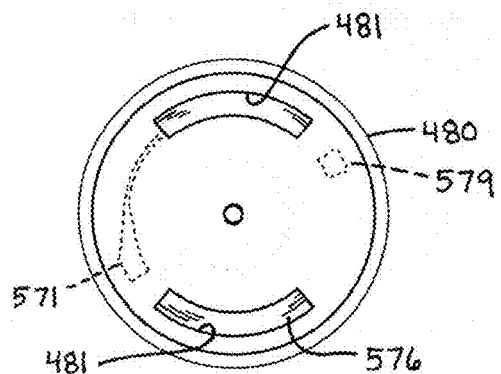
FIGS. 19A-19D schematically depict a downstream plan view of the combined rotating valve disc of FIG. 16 and the stationary valve disc of FIG. 18, showing the regulation of fluid flow by relative rotation of the discs.
Figure 19B:
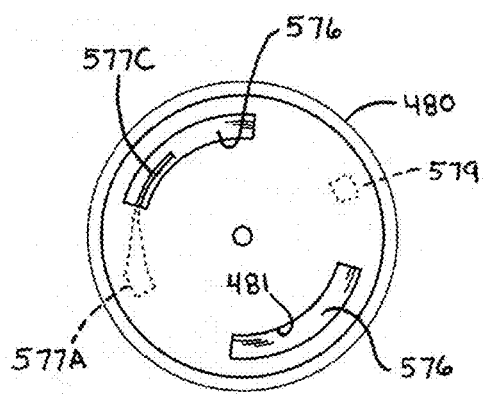
Figure 19C:
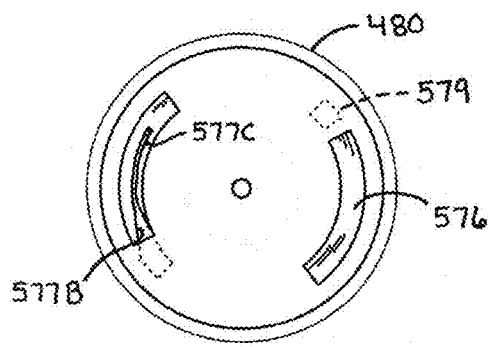
Figure 19D:
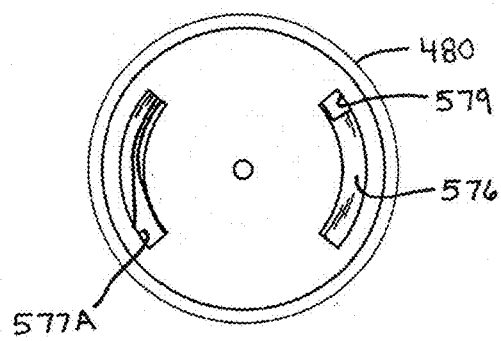

FIGS. 19A-D depict the rotation of plate (480) and (576) with respect to one another during operation in order to regulate fluid flow through disc valve assembly (431) (e.g., by selective rotation of plate (480) by motor (433)). FIG. 19D depicts the plates aligned for full flow, with the entirety of first and second openings (577, 579) aligned with openings (481) on rotating valve plate (480). However, because first and second apertures (577, 579) are smaller than arcuate openings (481), less than the entirety of openings (481) are used for full flow. FIG. 19A depicts the plates aligned for no water flow, with no portion of first and second openings (577, 579) aligned with openings (481) on rotating valve plate (480). In essence, stationary plate (576) completely blocks arcuate openings (481), preventing water flow therethrough.

In FIG. 19B, valve plate (480) has been rotated counterclockwise from its position in FIG. 19A such that second portion (577C) of first arcuate opening (577) is in registry with one of openings (481), but none of second opening (579) is in registry with the other opening (481). In this orientation, a low flow of water is permitted through second portion (577C) and a portion of one of openings (481). In FIG. 19C, valve plate (480) has been rotated further counterclockwise from its position in FIG. 19B such that tapered and second portions (577B, 577C) of first arcuate opening (577) are in registry with one of openings (481), but none of second opening (579) is in registry with the other opening (481). In this orientation, a greater flow of water is permitted through tapered and second portions (577B, 577C). And, as valve plate (480) is rotated further counterclockwise, approximately 90 degrees from its position in FIG. 19A, the entirety of first and second openings (577, 579) will be in registry with openings (481) to allow full flow (FIG. 19D). It should also be noted that, as in previous embodiments, a sensor may be provided in order to determine the position of (i.e., provide a signal to the controller indicative of) valve assembly (431), particularly the position of rotatable valve plate (480). Such sensor may be configured to simply provide a signal indicating whether or not valve assembly is fully open (FIG. 19D).

FIGS. 32-33 depict yet another embodiment of an apertured stationary valve plate (976) and an apertured rotating valve plate (980). These plates may be used in a valve assembly similar to that shown in FIG. 13 and in any of the flow control systems described herein (e.g., the embodiment of FIG. 23). As before, water will flow through the valve assembly only when portions of the openings on the stationary and rotating valve plates (976, 980) are aligned with one another. In this alternative embodiment, however, rotating valve plate (980) is positioned directly upstream of stationary valve plate (976) (opposite the configuration of the previously described valve plates.

Rotating valve plate (980) is similar to rotating valve plate (480) and includes a pair of arcuate openings (981A, 981B) spaced inwardly from the outer circumference of the plate. Openings (981A, 981B) generally function in the same manner as the arcuate opening in rotating valve plate (480). However, in this embodiment, the rotating valve plate (980) includes a third arcuate opening (981C) located immediately adjacent to second opening (981B). As discussed below, this third opening (981C) provides for additional pressure balancing of the valve, thereby reducing the amount of force necessary to rotate the valve plate (480). The arcuate openings (481A, 481B) are circumferentially spaced on plate (980) as before, approximately radially opposed to one another.

A pair of valve plate location magnets (987) in the form of cylinders positioned within radially extending chambers (989) are also provided and are used to sense the rotational position of the rotating valve plate (980) by a Hall effect sensor located adjacent the plate in the final valve assembly. The sensor provides a signal to the controller indicative of the valve plate position, thus indicating the extent that the valve is open (e.g., fully open, fully closed, etc.). Various other types of sensors may be used to detect the position of the rotating valve plate, such as an optical reflecting sensor. By way of example, an IR-emitting diode may be directed at the rotating valve plate through an IR transmissive material, with an IR sensor detecting reflected signals from an IR-reflective surface on the circumference of the rotating valve plate. Other position sensors known to those skilled in the art may similarly be employed.

Stationary valve plate (976) has a pair of openings (or apertures) (977, 979) circumferentially spaced from one another on valve plate (976). As before, the openings (977, 979) are also generally radially-opposed to each other. This alternative arrangement of the openings (977, 979) on the stationary valve plate (976) provides more precise and linear flow control than the previous embodiments over the full range of flow rates.

First arcuate opening (977) has a somewhat smaller arcuate length D (see FIG. 33B) compared to first opening (481A) on plate (980). However, first arcuate opening (977) has a varying width. First portion (577A) has a constant radial width T (see FIG. 33A) which is slightly less than the radial width of opening (981A) on plate (980), and a second portion (977B) has an arcuately tapering width as shown. In addition, the inner edge (977B') of second portion (977B) of first arcuate opening (977) has a greater curvature than the outer edge (977B").

Second opening (979) is similar in size and shape as, and is radially opposed to, first portion (977A) of first opening (977). Second opening (979) may have any of a variety of alternative shapes such as circular and oval. Second opening (979) is sized and located such that, for example, when only the tapered width portion (977B) of the first opening (977) are aligned with the first arcuate opening (981A) in the rotating valve plate (980), the second opening (979) will not be aligned with the other arcuate opening (981B) in the rotating valve plate (980).

Figure 34A:
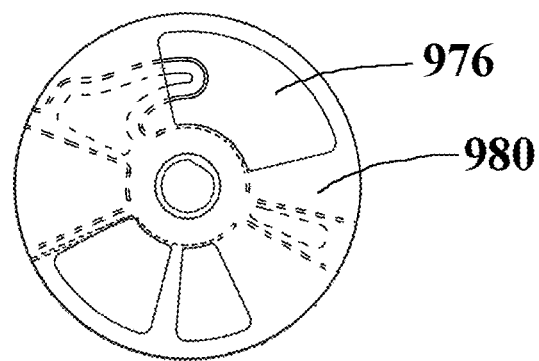
FIGS. 34A-34B schematically depict an upstream side plan view of the combined rotating valve disc of FIG. 32 and the stationary valve disc of FIG. 33, showing the regulation of fluid flow by relative rotation of the discs.
Figure 34B:
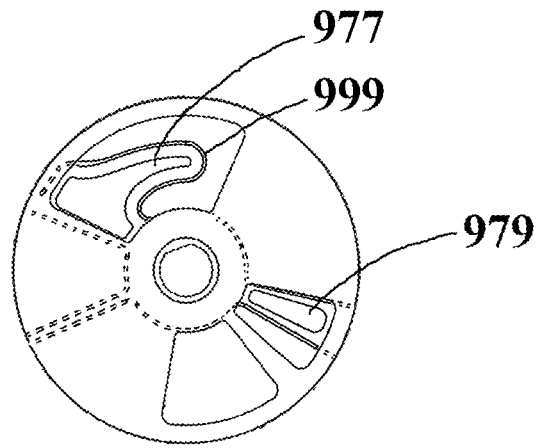

FIGS. 34A-B depict the rotation of plate (980) with respect to stationary plate (976) during operation in order to regulate fluid flow through disc valve assembly (431) (e.g., by selective rotation of plate (980) by motor (433)). FIG. 19B depicts the plates aligned for full flow, with the entirety of first and second openings (977, 979) aligned with openings (981A, 981B) on rotating valve plate (980). However, because first and second apertures (977, 979) are smaller than arcuate openings (981A, 981B), less than the entirety of openings (981A, 981B) are used for full flow. FIG. 19A depicts the plates aligned for minimal water flow, with a portion of tapered width portion (977B) of first arcuate opening (977) in registry with opening (981A), but none of second opening (979) is in registry with the other opening (981B).

As best seen in FIGS. 33B and 33D, stationary valve plate (976) also includes a pedestal (999) which extends about the periphery of first and second openings (977, 979), about the circumference of the central aperture in the plate, along a support rib (999A), and to the outer periphery of the plate, as shown. Pedestal (999) generally comprises an elevated flange which bears against the downstream face of rotating valve plate (980), creating gaps between the rotating valve plate (980) and the stationary plate (976) in the regions between the pedestal portions and the periphery of the stationary plate. During use, water is able to enter these gaps through openings (981A, 981B, 981C) in the rotating plate, this allowing water to move behind portions of the rotating valve plate. As a result, the water pressure in the gaps will equilibrate with the water pressure on the upstream side of the rotating plate. This pressure balancing greatly reduces the force required to rotate valve plate (980).

FIGS. 28-31 depict an alternative embodiment of a flow control device (830) which may be incorporated into any of the flow control systems described herein, and may also be integrated with a flow measurement device, as described previously. Applicants have discovered that this alternative valve design also provides more precise and more linear flow control than other conventional valve designs. Flow control device (830) generally comprises a spool valve. It will be understood that FIGS. 28-31 do not depict the outer housing for spool valve assembly (830), as only the stationary valve body (840) and rotating valve spool (860) are shown.

Figure 30:
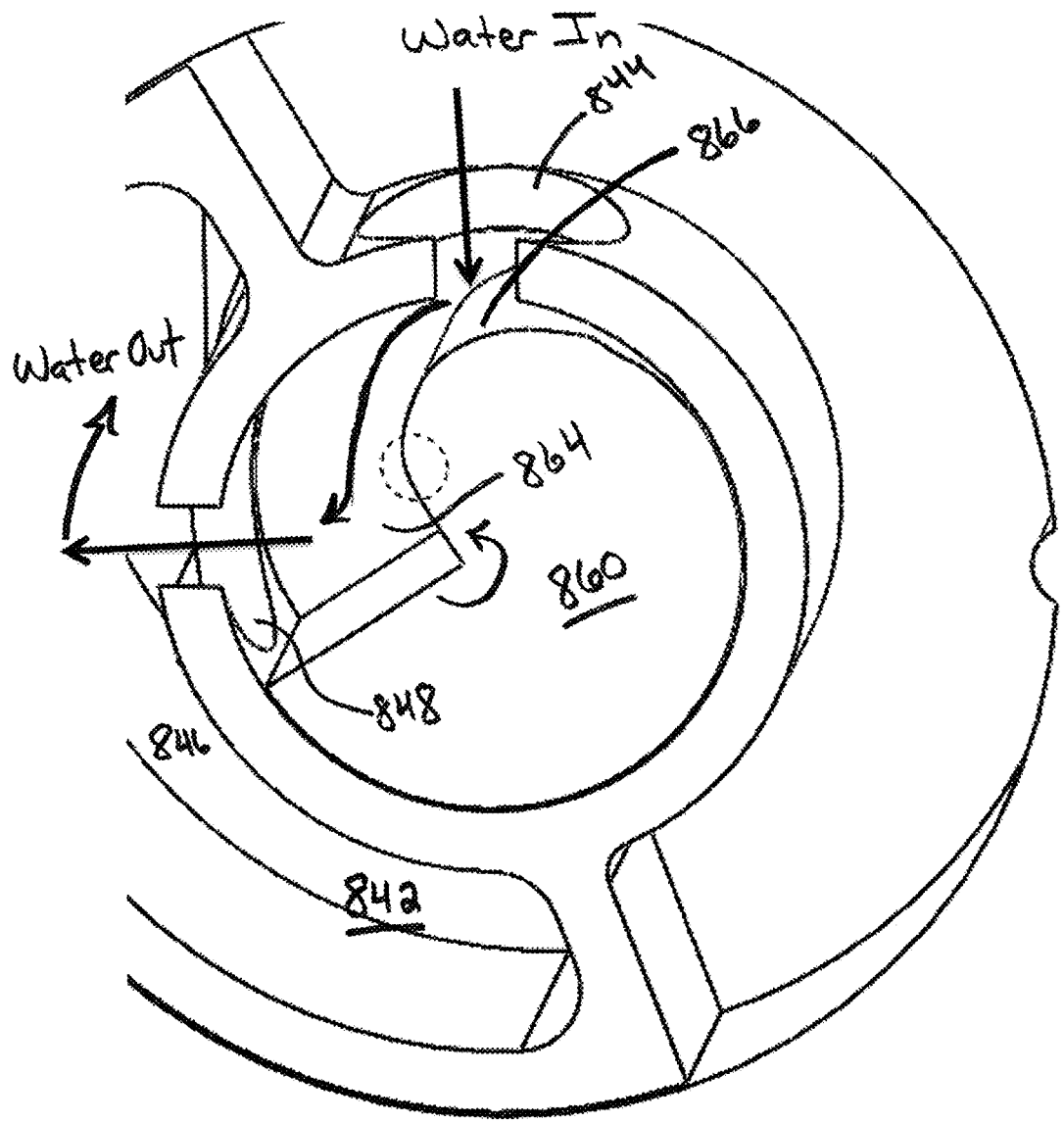
FIG. 30 depicts a cross-section view of the flow control device of FIG. 28, taken along the line 30-30 thereof.

Stationary valve body (840) generally has a hollow central cavity which receives rotating valve spool (860) therein through the open bottom end of valve body (840). As best seen in FIG. 30, an arcuate plenum (842) is also provided in stationary valve body (840) such that when rotating valve spool (860) is partially received within the interior of stationary valve body (840), arcuate plenum (842) extends about a portion of the outer periphery of rotating valve spool (860). A fluid inlet (844) is provided on stationary valve body (840), through which fluid may pass into the interior of hollow stationary valve body (840). The bottom of arcuate plenum (842) is open such that a fluid outlet (846) is provided. Fluid flows into spool valve assembly (830) through fluid inlet (844) and will flow out through the open bottom end (846) of plenum (842). As best seen in FIG. 30, an interior fluid aperture (848) is provided in stationary valve body (840) and provides fluid communication between the interior of hollow valve body (840) and arcuate plenum (842).

Figure 28:
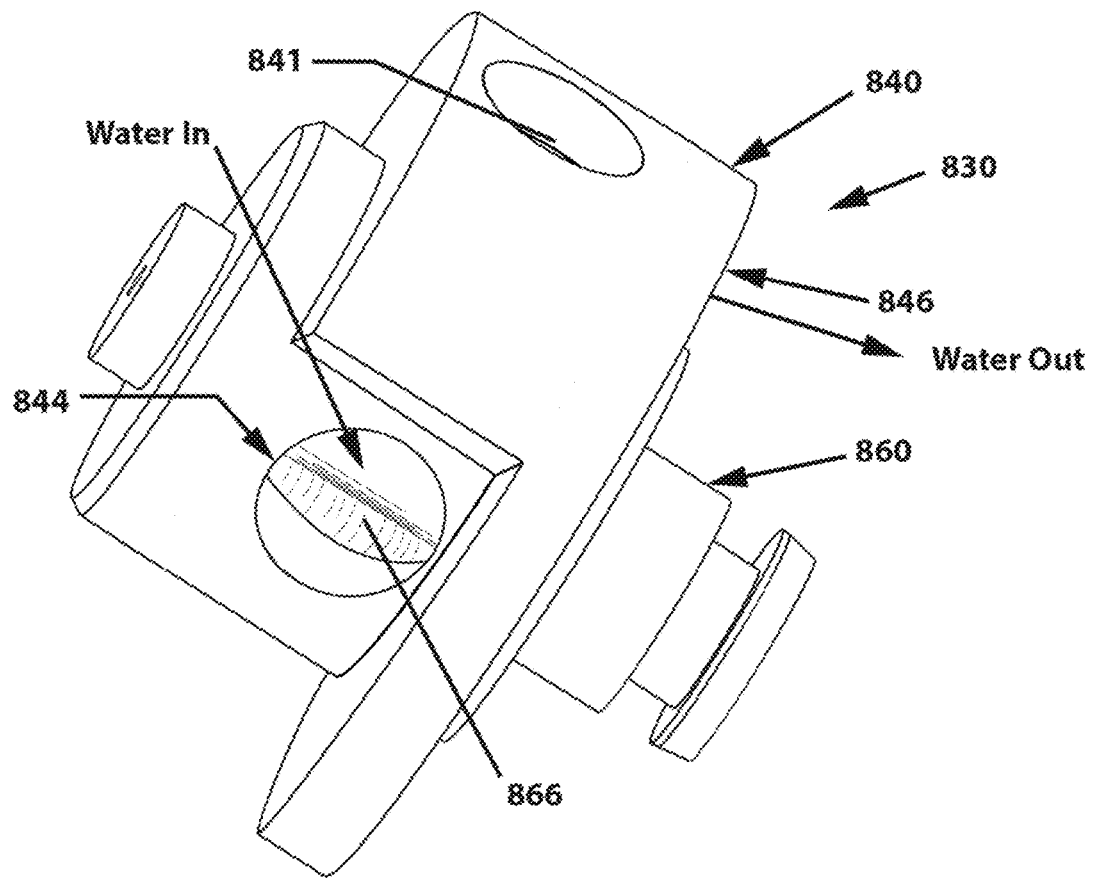
FIG. 28 depicts a perspective view of a flow control device for use in the flow control systems described herein.
Figure 29:
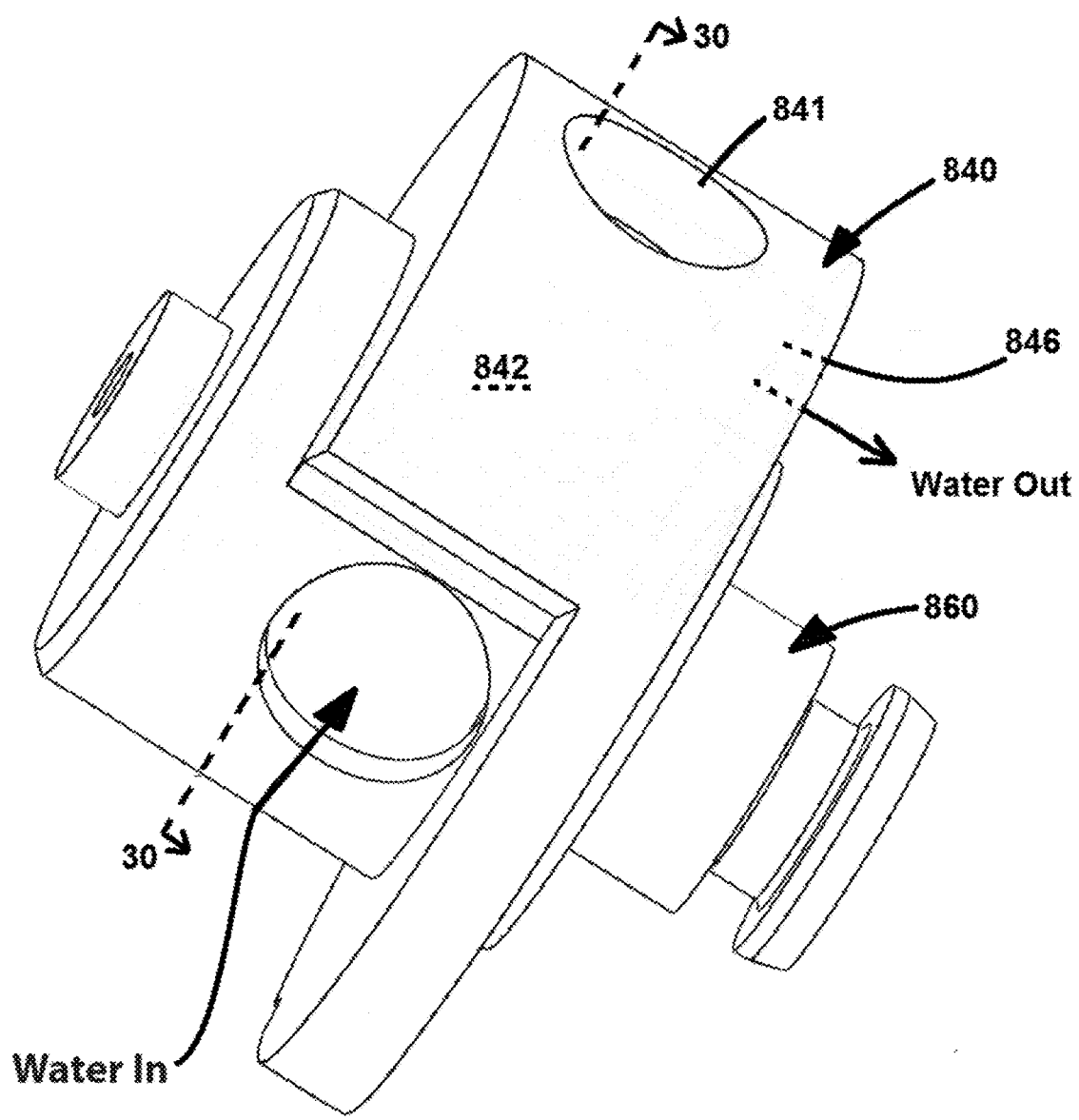
FIG. 29 depicts a perspective view similar to FIG. 28.
Figure 31:
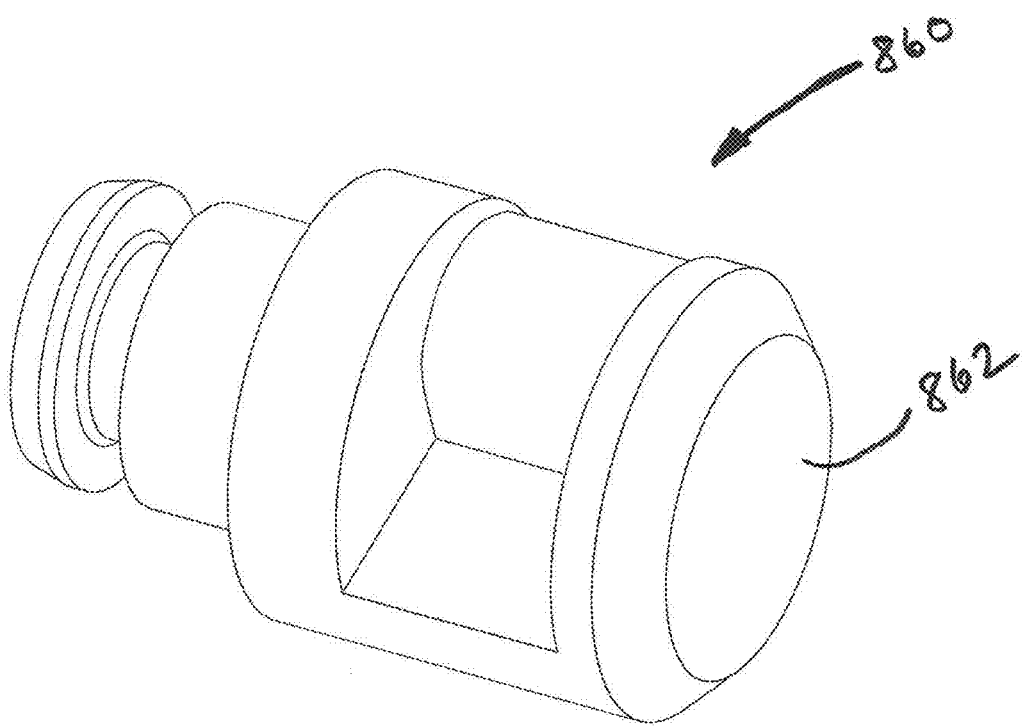
FIG. 31 depicts a perspective view of the valve spool portion of the flow control device of FIG. 28.

With reference to FIG. 31, the upper end (362) of rotating valve spool (860) is inserted into the open bottom end of stationary valve body (840). A cut-away portion (864) is located adjacent upper end (362) and is located so as to be rotatably positionable so as to block or open interior fluid aperture (848) on stationary valve body (840). Cut-away portion (864) generally defines an arcuate wedge shape, however interior edge surface (866) curves outwardly as it extends away from the center of cut-away portion (864). When positioned within stationary valve body (840) as shown in FIG. 30, cut-away portion completely exposes interior fluid aperture (848) and curved interior edge surface (866) partially limits the flow of fluid through fluid inlet (844), as seen in FIG. 28. When rotating valve spool (860) is rotated counterclockwise (e.g., by a servo motor or other actuator, under control of the system controller), curved interior edge surface (866) will further limit the ability of fluid to flow through fluid inlet (844) into cut-away portion (864). Applicants have found that this arrangement provides for linearly controllable fluid flow between fluid inlet (844) and fluid outlet (846), with the fluid flowing through cut-away portion (864) and the interior of stationary valve body (840).

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Versions of the devices described above may be actuated mechanically or electromechanically (e.g., using one or more electrical motors, solenoids, etc.). However, other actuation modes may be suitable as well including but not limited to pneumatic and/or hydraulic actuation, etc. Various suitable ways in which such alternative forms of actuation may be provided in a device as described above will be apparent to those of ordinary skill in the art in view of the teachings herein.

Versions of the devices described above may have application in other types of installations. For example, the fluid flow control systems described herein may be used in a faucet installation (e.g., a kitchen sink) rather than a shower installation. In such an embodiment, the operating frequency of the proximity sensor(s) may be increased (e.g., 200 kHz, 500 kHz or even 1 MHz) to accommodate the shorter working distances common in faucet installations. Also, alternative water conservation strategies may be utilized wherein the system can be optimized for hand washing, dish rinsing/washing, and other activities. As yet another alternative, the fluid flow control systems described herein may be used in conjunction with any of a variety of other water fixtures or applications.

As yet another alternative, the flow control system may be installed in a multi-shower head environment such as in a locker room, health club, or similar facility. The various temperature control systems and methods can be used to control water temperature to all of the shower heads, with individual proximity sensors associated with each shower head for independently regulating water flow rate (e.g., only provide flow when a bather is detected, and optionally with flow rate varied in relation to the bather's distance from the shower head or sensor).

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A fluid flow control system configured for installation between a water supply pipe and a shower head in a shower installation, comprising:
    (a) a fluid inlet configured to be operatively coupled to the water supply pipe;
    (b) a fluid outlet configured for delivering water to the shower head, said fluid outlet in fluid communication with the fluid inlet such that water may exit the system therethrough;
    (c) a proximity sensor for detecting the position of a bather within an interrogation region adjacent the sensor when the system is installed in a shower enclosure;
    (d) a flow control device comprising a control valve configured to regulate fluid flow between the inlet and outlet in response to bather detection by the proximity sensor within the interrogation region, wherein the flow control device comprises a disc valve which varies the fluid flow proportional to the detected distance of the bather from the proximity sensor by varying the control valve opening between a maximum and a minimum; and
    (e) a controller configured for controlling the operation of the flow control device in response to the location of the bather within the interrogation region, as detected by the proximity sensor;
wherein the system determines, throughout a shower session, a full flow portion of the interrogation region and a minimum flow portion of the interrogation region based on a bather's distance of closest approach to the sensor and distance of furthest approach to the sensor during the shower session, such that a maximum flow rate of water is delivered when the sensed distance of the bather from the sensor is within the full flow portion of the interrogation region, a minimum flow rate of water is delivered when the sensed distance of the bather from the sensor is within the minimum flow portion of the interrogation region, and an intermediate flow rate of water is delivered when the sensed distance of the bather from the sensor is between the minimum and maximum flow portions of the interrogation region.

2. The fluid flow control system of claim 1, wherein the disc valve comprises a first valve plate having a pair of circumferentially-spaced arcuate openings, and a second valve plate having first and second circumferentially-spaced openings;
wherein the first opening in the second valve plate has a first portion having a first width, and a tapered width portion having a width which is less than the width of the first portion;
wherein the second opening in the second valve plate has an area smaller than that of the first opening in the second valve plate; and
further wherein the first and second valve plates are located adjacent one another with at least one of the valve plates rotatable with respect to the other such that each of the first and second circumferentially-spaced openings in the second valve plate is selectively alignable with a corresponding one of the arcuate openings in the first valve plate in order to allow controlled fluid flow through aligned openings.

3. The fluid flow control system of claim 2, wherein the second opening in the second valve plate is located radially-opposite to the first portion of the first opening, and further wherein the second opening is sized and located such that when the first portion of the first opening in the second valve plate is not aligned with one of the arcuate openings in the first valve plate, the second opening will not be aligned with the other arcuate opening in the first valve plate.

4. The fluid flow control system of claim 1, further comprising a flow measurement device for measuring the flow rate of fluid through the outlet.

5. The fluid flow control system of claim 4, wherein the controller is further configured to control the operation of the flow control device in response to the measured flow rate of fluid.

6. The fluid flow control system of claim 4, further comprising a flow meter for measuring the flow rate of fluid through the outlet, wherein the flow meter is located upstream of the flow control device.

7. The fluid flow control system of claim 6, wherein the flow meter comprises a turbine flow meter.

8. The fluid flow control system of claim 6, further comprising a temperature sensor for sensing the temperature of water flowing through the system, and further wherein the system is configured to regulate fluid flow based on the sensed water temperature in relation to at least one preset temperature.

9. The fluid flow control system of claim 2, wherein said valve plates are configured such that at least one of the valve plates is rotatable with respect to the other from:
a closed position whereat neither of the openings in the second valve plate is aligned with a corresponding one of the arcuate openings in the first valve plate;
an intermediate position whereat at least part of the tapered width portion, but none of the first portion of the first opening in the second valve plate is aligned with the corresponding arcuate opening in the first valve plate, and none of the second opening in the second valve plate is aligned with the other arcuate opening in the first valve plate; and
a fully open position whereat the first portion and tapered width portion of the first opening in the second valve plate is aligned with the corresponding arcuate opening in the first valve plate, and the second opening in the second valve plate is aligned with the other arcuate opening in the first valve plate.

10. The fluid flow control system of claim 1, further comprising a temperature sensor for sensing the temperature of fluid flowing through the system, and further wherein the system is configured to regulate fluid flow based on the sensed water temperature in relation to at least one preset temperature.

11. A fluid flow control system configured for installation between a water supply pipe and a shower head in a shower installation, comprising:
(a) a fluid inlet configured to be operatively coupled to the water supply pipe;
(b) a fluid outlet configured for delivering water to the shower head, said fluid outlet in fluid communication with the fluid inlet such that water may exit the system therethrough;
(c) a proximity sensor for detecting the position of a bather within an interrogation region adjacent the sensor when the system is installed in the shower installation;
(d) a flow control device comprising a control valve configured to regulate fluid flow between the inlet and outlet in response to bather detection by the proximity sensor within the interrogation region, wherein the flow control device varies the fluid flow proportional to the detected distance of the bather from the proximity sensor; and
(e) a controller configured for controlling the operation of the flow control device in response to the location of the bather within the interrogation region, as detected by the proximity sensor;
wherein the system determines, throughout a shower session, a full flow portion of the interrogation region and a minimum flow portion of the interrogation region based on a bather's distance of closest approach to the sensor and distance of furthest approach to the sensor during the shower session, such that a maximum flow rate of water is delivered when the sensed distance of the bather from the sensor is within the full flow portion of the interrogation region, a minimum flow rate of water is delivered when the sensed distance of the bather from the sensor is within the minimum flow portion of the interrogation region, and an intermediate flow rate of water is delivered when the sensed distance of the bather from the sensor is between the minimum and maximum flow portions of the interrogation region.

12. The fluid flow control system of claim 11, further comprising a flow measurement device for measuring the flow rate of fluid through the outlet.

13. The fluid flow control system of claim 12, wherein the controller is further configured to control the operation of the flow control device in response to the measured flow rate of fluid.

14. The fluid flow control system of claim 12, further comprising a flow meter for measuring the flow rate of fluid through the outlet, wherein the flow meter is located upstream of the flow control device.

15. The fluid flow control system of claim 11, further comprising a temperature sensor for sensing the temperature of water flowing through the system, and further wherein the system is configured to regulate fluid flow based on the sensed water temperature in relation to at least one preset temperature.

* * * * *